United States Patent
Vaknin-Dembinsky et al.

(10) Patent No.: US 12,448,651 B2
(45) Date of Patent: Oct. 21, 2025

(54) MARKERS OF DISEASE PROGNOSIS IN MULTIPLE SCLEROSIS

(71) Applicant: HADASIT MEDICAL RESEARCH SERVICES AND DEVELOPMENT LTD., Jerusalem (IL)

(72) Inventors: Adi Vaknin-Dembinsky, Jerusalem (IL); Iris Lavon Ben Moshe, Kfar Saba (IL)

(73) Assignee: HADASIT MEDICAL RESEARCH SERVICES AND DEVELOPMENT LTD., Jerusalem (IL)

( * ) Notice: Subject to any disclaimer, the term of this patent is extended or adjusted under 35 U.S.C. 154(b) by 1087 days.

(21) Appl. No.: 17/413,480

(22) PCT Filed: Dec. 11, 2019

(86) PCT No.: PCT/IL2019/051353
§ 371 (c)(1),
(2) Date: Jun. 11, 2021

(87) PCT Pub. No.: WO2020/121305
PCT Pub. Date: Jun. 18, 2020

(65) Prior Publication Data
US 2022/0049309 A1  Feb. 17, 2022

Related U.S. Application Data

(60) Provisional application No. 62/778,325, filed on Dec. 12, 2018.

(51) Int. Cl.
*C12Q 1/6883* (2018.01)
(52) U.S. Cl.
CPC ...... *C12Q 1/6883* (2013.01); *C12Q 2600/118* (2013.01); *C12Q 2600/158* (2013.01)
(58) Field of Classification Search
None
See application file for complete search history.

(56) References Cited

U.S. PATENT DOCUMENTS

| | | | |
|---|---|---|---|
| 2004/0170996 A1* | 9/2004 | Yee | C12Q 1/6883 435/5 |
| 2008/0070797 A1 | 3/2008 | Mounts | |
| 2010/0062472 A1 | 3/2010 | Cook | |
| 2010/0074864 A1 | 3/2010 | Achiron | |
| 2012/0328567 A1 | 12/2012 | Bushnell | |
| 2014/0273033 A1 | 9/2014 | Somers | |

FOREIGN PATENT DOCUMENTS

| | | |
|---|---|---|
| WO | 2005027733 A2 | 3/2005 |
| WO | 2008125651 A2 | 10/2008 |
| WO | 2015035261 A1 | 3/2015 |
| WO | 2015140793 A1 | 9/2015 |

OTHER PUBLICATIONS

Kallaur et al. Molecular Medicine Reports. 2013. 7: 1010-1020 (Year: 2013).*
Haham et al. J Neuroimmunology. 338: 57289, p. 1-8 (Year: 2024).*
Wegler et al. NAR Genom Bioinform. 2(1): lqz010, 11 pages (Year: 2020).*
Chen et al Molecular & Cellular Proteomics. 1: 304-313 (Year: 2002).*
Vogel et al Nature Review Genet. 13(4): 227-232 (Year: 2012).*
Gurevich et al., (2009) Prediction of acute multiple sclerosis relapses by transcription levels of peripheral blood cells. BMC Med Genomics 2: 46.
Hecker et al., (2011) Reassessment of blood gene expression markers for the prognosis of relapsing-remitting multiple sclerosis. PLoS One 6(12): e29648.
Lopatinskaya et al., (2006) Mediators of apoptosis Fas and FasL predict disability progression in multiple sclerosis over a period of 10 years. Mult Scler 12(6): 704-709.
Mohammadzadeh et al., (2018) CTLA-4, PD-1 and TIM-3 expression predominantly downregulated in MS patients. J Neuroimmunol 323: 105-108.
Anderson et al., (2016) Lag-3, Tim-3, and TIGIT: Co-inhibitory Receptors with Specialized Functions in Immune Regulation. Immunity 44(5): 989-1004.
Backner et al., (2018) Anatomical Wiring and Functional Networking Changes in the Visual System Following Optic Neuritis. JAMA Neurol 75(3): 287-295.
Burton et al., (2014) Sequential transcriptional changes dictate safe and effective antigen-specific immunotherapy. Nat Commun 5: 4741; 13 pages.
Camisaschi et al., (2010) LAG-3 expression defines a subset of CD4(+)CD25(high)Foxp3(+) regulatory T cells that are expanded at tumor sites. J Immunol 184(11): 6545-6551.
Carter et al., (2007) PD-1/PD-L1, but not PD-1/PD-L2, interactions regulate the severity of experimental autoimmune encephalomyelitis. J Neuroimmunol 182(1-2): 124-134.
Chihara (2018) Dysregulated T cells in multiple sclerosis. Clinical and Experimental Neuroimmunology 9(S1): 20-29.
Gettings et al., (2015) Severe relapse in a multiple sclerosis patient associated with ipilimumab treatment of melanoma. Mult Scler 21(5): 670.
Gholipour et al., (2011) Demographic and clinical characteristics of malignant multiple sclerosis. Neurology 76(23): 1996-2001.
Healy et al., (2017) Characterizing Clinical and MRI Dissociation in Patients with Multiple Sclerosis. J Neuroimaging 27(5): 481-485.
Joller et al., (2011) Cutting edge: TIGIT has T cell-intrinsic inhibitory functions. J Immunol 186(3): 1338-1342.

(Continued)

*Primary Examiner* — Carla J Myers
(74) *Attorney, Agent, or Firm* — FULLER IP LAW LLC; Rodney J. Fuller

(57) ABSTRACT

Provided are methods and kits for early determination of disease outcome and prognosis of Multiple Sclerosis (MS) patients and for adjustment of suitable treatment.

10 Claims, 23 Drawing Sheets

Specification includes a Sequence Listing.

(56) References Cited

OTHER PUBLICATIONS

Kadowaki et al., (2016) Gut environment-induced intraepithelial autoreactive CD4(+) T cells suppress central nervous system autoimmunity via LAG-3. Nat Commun 7: 11639; 16 pages.

Koguchi et al., (2006) Dysregulated T cell expression of TIM3 in multiple sclerosis. J Exp Med 203(6): 1413-1418.

Kroner et al., (2005) A PD-1 polymorphism is associated with disease progression in multiple sclerosis. Ann Neurol 58(1): 50-57.

Lavon et al., (2019) Blood Levels of Co-inhibitory-Receptors: A Biomarker of Disease Prognosis in Multiple Sclerosis. Front Immunol 10: 835; 11 pages.

Monney L et al., (2002) Th1-specific cell surface protein Tim-3 regulates macrophage activation and severity of an autoimmune disease. Nature 415(6871): 536-541.

Nishimura et al., (2001) Autoimmune dilated cardiomyopathy in PD-1 receptor-deficient mice. Science 291(5502): 319-322.

Okazaki et al., (2011) PD-1 and LAG-3 inhibitory co-receptors act synergistically to prevent autoimmunity in mice. J Exp Med 208(2): 395-407.

Popescu et al., (2013) Brain atrophy and lesion load predict long term disability in multiple sclerosis. Manuscript; published in final version as: J Neurol Neurosurg Psychiatry 84(10): 1082-1091.

Roxburgh et al., (2005) Multiple Sclerosis Severity Score: using disability and disease duration to rate disease severity. Neurology 64(7): 1144-1151.

Tocut et al., (2018) Autoimmune phenomena and disease in cancer patients treated with immune checkpoint inhibitors. Autoimmun Rev 17(6): 610-616.

Yang et al., (2008) Lack of TIM-3 immunoregulation in multiple sclerosis. J Immunol 180(7): 4409-4414.

Yshii et al., (2017) Inflammatory CNS disease caused by immune checkpoint inhibitors: status and perspectives. Nat Rev Neurol 13(12): 755-763.

Zhang and Vignali (2016) Co-stimulatory and Co-inhibitory Pathways in Autoimmunity. Immunity 44(5): 1034-1051.

Ziemssen et al., (2016) Optimizing treatment success in multiple sclerosis. J Neurol 263(6): 1053-1065.

\* cited by examiner

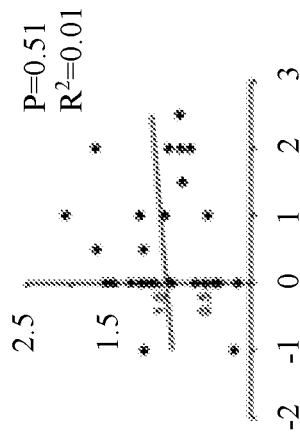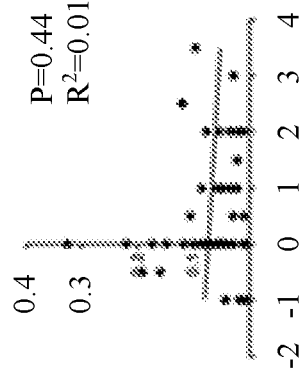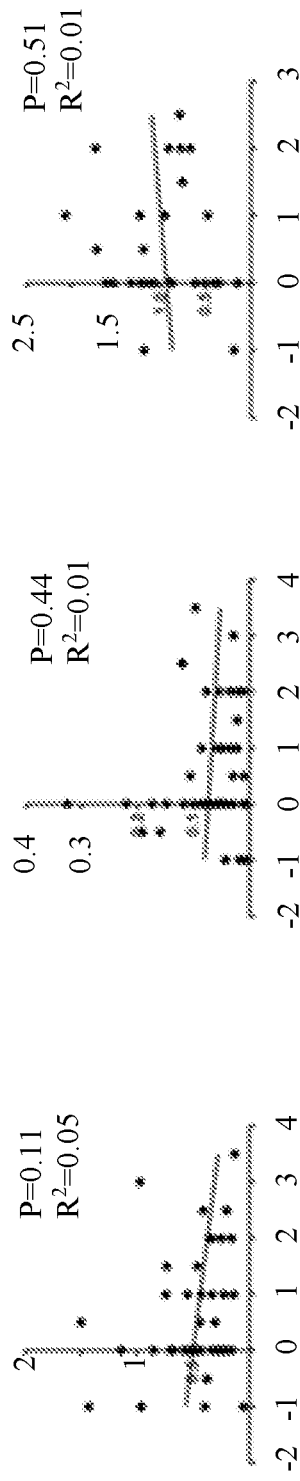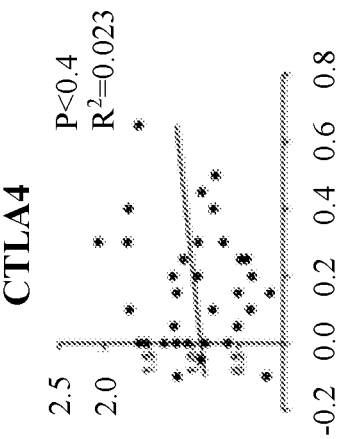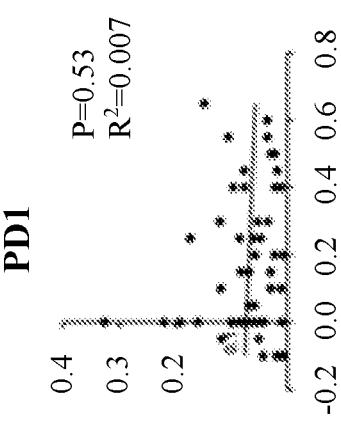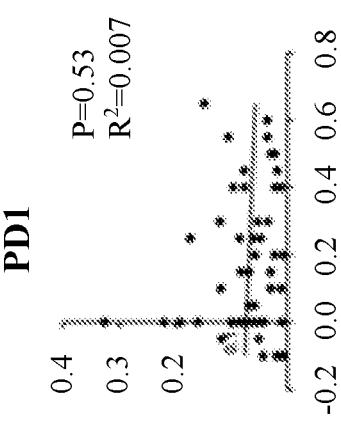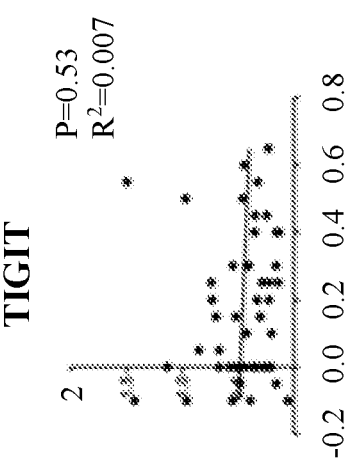
Figure 4B, Figure 4C, Figure 4D, Figure 4E, Figure 4F, Figure 4G

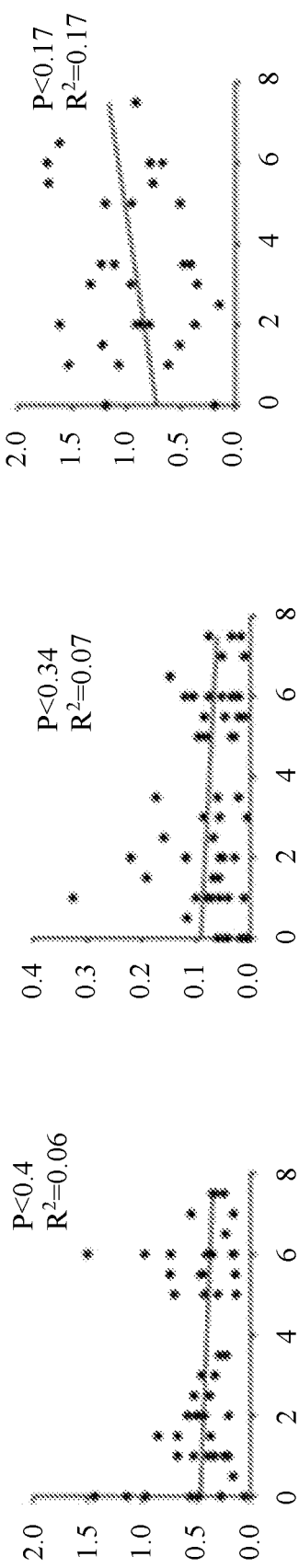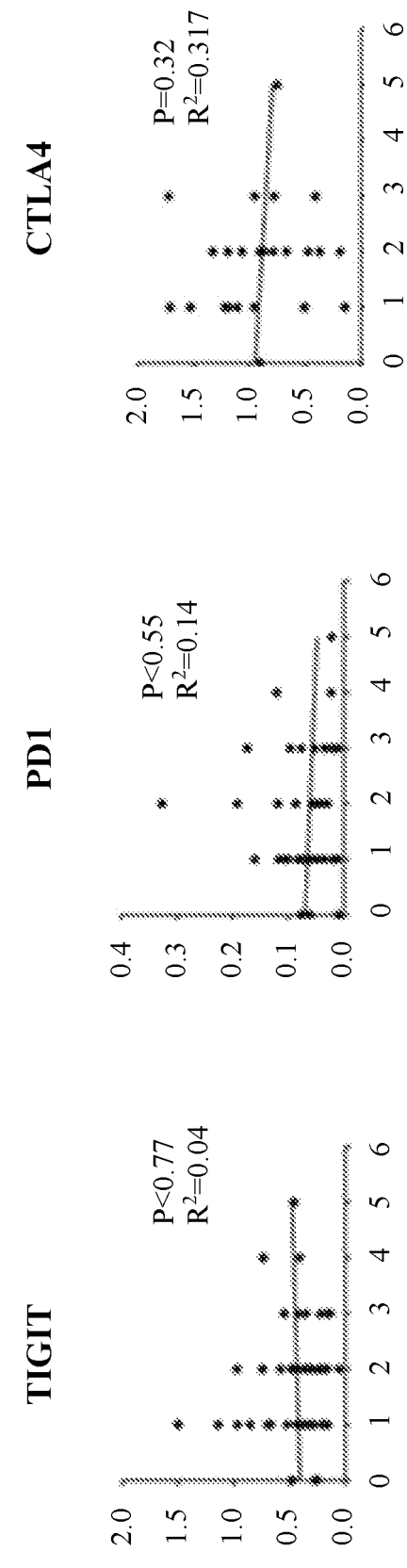

```
                        SEQUENCE LISTING

<160> NUMBER OF SEQ ID NOS: 17

<210> SEQ ID NO 1
<211> LENGTH: 19
<212> TYPE: DNA
<213> ORGANISM: Artificial
<220> FEATURE:
<223> OTHER INFORMATION: Synthetic oligonucleotide

<400> SEQUENCE: 1
tcctcctcag accgctttt                                                   19

<210> SEQ ID NO 2
<211> LENGTH: 21
<212> TYPE: DNA
<213> ORGANISM: Artificial
<220> FEATURE:
<223> OTHER INFORMATION: Synthetic oligonucleotide

<400> SEQUENCE: 2
cctggttcat catcgctaat c                                                21

<210> SEQ ID NO 3
<211> LENGTH: 23
<212> TYPE: DNA
<213> ORGANISM: Artificial
<220> FEATURE:
<223> OTHER INFORMATION: Synthetic oligonucleotide
```

<400> SEQUENCE: 3
tcacattggc aatcatcaca gtg                                    23

<210> SEQ ID NO 4
<211> LENGTH: 23
<212> TYPE: DNA
<213> ORGANISM: Artificial
<220> FEATURE:
<223> OTHER INFORMATION: Synthetic oligonucleotide

<400> SEQUENCE: 4
cgttcttgtc cagatactgg agt                                    23

<210> SEQ ID NO 5
<211> LENGTH: 24
<212> TYPE: DNA
<213> ORGANISM: Artificial
<220> FEATURE:
<223> OTHER INFORMATION: Synthetic oligonucleotide

<400> SEQUENCE: 5
ctgctgctgc tactacttac aagg                                   24

<210> SEQ ID NO 6
<211> LENGTH: 18
<212> TYPE: DNA
<213> ORGANISM: Artificial
<220> FEATURE:
<223> OTHER INFORMATION: Synthetic oligonucleotide

<400> SEQUENCE: 6
agacgggcac gaggttcc                                          18

<210> SEQ ID NO 7
<211> LENGTH: 22
<212> TYPE: DNA
<213> ORGANISM: Artificial
<220> FEATURE:
<223> OTHER INFORMATION: Synthetic oligonucleotide

<400> SEQUENCE: 7
ggaggtccta gaaagctcag tg                                     22

<210> SEQ ID NO 8
<211> LENGTH: 21
<212> TYPE: DNA
<213> ORGANISM: Artificial
<220> FEATURE:
<223> OTHER INFORMATION: Synthetic oligonucleotide

<400> SEQUENCE: 8
cgatgactgc tgtgcagatg a                                      21

<210> SEQ ID NO 9
<211> LENGTH: 23
<212> TYPE: DNA
<213> ORGANISM: Artificial
<220> FEATURE:
<223> OTHER INFORMATION: Synthetic oligonucleotide

<400> SEQUENCE: 9
catccctgtc ttctgcaaag caa                                    23

<210> SEQ ID NO 10
<211> LENGTH: 20

```
<212> TYPE: DNA
<213> ORGANISM: Artificial
<220> FEATURE:
<223> OTHER INFORMATION: Synthetic oligonucleotide

<400> SEQUENCE: 10
cagtggcttt gcctggagat                                                   20

<210> SEQ ID NO 11
<211> LENGTH: 21
<212> TYPE: DNA
<213> ORGANISM: Artificial
<220> FEATURE:
<223> OTHER INFORMATION: Synthetic oligonucleotide

<400> SEQUENCE: 11
cggccaggat ggttcttaga c                                                 21

<210> SEQ ID NO 12
<211> LENGTH: 20
<212> TYPE: DNA
<213> ORGANISM: Artificial
<220> FEATURE:
<223> OTHER INFORMATION: Synthetic oligonucleotide

<400> SEQUENCE: 12
gagaagctgc aggtgaaggt                                                   20

<210> SEQ ID NO 13
<211> LENGTH: 1995
<212> TYPE: DNA
<213> ORGANISM: Homo sapiens

<400> SEQUENCE: 13
acaggggtga aggcccagag accagcagaa cggcatccca gccacgacgg ccactttgct       60
ctgtctgctc tccgccacgg ccctgctctg ttccctggga cacccccgcc cccacctcct      120
caggctgcct gatctgccca gctttccagc tttcctctgg attccggcct ctggtcatcc      180
ctccccaccc tctctccaag gccctctcct ggtctccctt cttctagaac cccttcctcc      240
acctccctct ctgcagaact tctccttcac ccccaccccc caccactgc cccctttcct       300 tttctgacct ccttttggag ggctcagcgc tgcccagacc ataggagaga tgtgggaggc      360
tcagttcctg ggcttgctgt ttctgcagcc gctttgggtg gctccagtga agcctctcca      420
gccaggggct gaggtcccgg tggtgtgggc ccaggagggg gctcctgccc agctcccctg      480
cagccccaca atccccctcc aggatctcag ccttctgcga agagcagggg tcacttggca      540
gcatcagcca gacagtggcc cgcccgctgc cgccccggc catcccctgg ccccggccc        600 tcacccggcg gcgccctcct cctgggggcc caggcccgc cgctacacgg tgctgagcgt       660
gggtcccgga ggcctgcgca gcgggaggct gcccctgcag ccccgcgtcc agctggatga      720
gcgcggccgg cagcgcgggg acttctcgct atggctgcgc ccagcccggc gcgcggacgc      780
cggcgagtac cgcgccgcgg tgcacctcag ggaccgcgcc ctctcctgcc gcctccgtct      840
gcgcctgggc caggcctcga tgactgccag ccccccagga tctctcagag cctccgactg      900
ggtcattttg aactgctcct tcagccgccc tgaccgccca gcctctgtgc attggttccg      960
gaaccggggc cagggccgag tccctgtccg ggagtccccc catcaccact tagcggaaag     1020
cttcctcttc ctgccccaag tcagcccccat ggactctggg ccctggggct gcatcctcac     1080
ctacagagat ggcttcaacg tctccatcat gtataacctc actgttctgg gtctggagcc     1140
```

| | | |
|---|---|---|
| cccaactccc | ttgacagtgt acgctggagc aggttccagg gtggggctgc cctgccgcct | 1200 |
| gcctgctggt | gtggggaccc ggtctttcct cactgccaag tggactcctc ctggggagg | 1260 |
| ccctgacctc | ctggtgactg gagacaatgg cgactttacc cttcgactag aggatgtgag | 1320 |
| ccaggcccag | gctgggacct acacctgcca tatccatctg caggaacagc agctcaatgc | 1380 |
| cactgtcaca | ttggcaatca tcacagtgac tcccaaatcc tttgggtcac ctggatccct | 1440 |
| ggggaagctg | ctttgtgagg tgactccagt atctggacaa gaacgctttg tgtgagctc | 1500 |
| tctggacacc | ccatcccaga ggagtttctc aggaccttgg ctggaggcac aggaggccca | 1560 |
| gctcctttcc | cagccttggc aatgccagct gtaccagggg gagaggcttc ttggagcagc | 1620 |
| agtgtacttc | acagagctgt ctagcccagg tgcccaacgc tctgggagag ccccaggtgc | 1680 |
| cctcccagca | ggccacctcc tgctgtttct catccttggt gtcctttctc tgctcctttt | 1740 |
| ggtgactgga | gccttttggct ttcacctttg gagaagacag tggcgaccaa gacgattttc | 1800 |
| tgccttagag | caagggattc accctccgca ggctcagagc aagatagagg agctggagca | 1860 |
| agaaccggag | ccggagccgg agccggaacc ggagcccgag cccgagcccg agccggagca | 1920 |
| gctctgacct | ggagctgagg cagccagcag atctcagcag cccagtccaa ataaactccc | 1980 |
| tgtcagcagc | aaaaa | 1995 |

<210> SEQ ID NO 14
<211> LENGTH: 2448
<212> TYPE: DNA
<213> ORGANISM: Homo sapiens

<400> SEQUENCE: 14

| | | |
|---|---|---|
| agaacactta | caggatgtgt gtagtgtggc atgacagaga actttggttt cctttaatgt | 60 |
| gactgtagac | ctggcagtgt tactataaga atcactggca atcagacacc cgggtgtgct | 120 |
| gagctagcac | tcagtggggg cggctactgc tcatgtgatt gtggagtaga cagttggaag | 180 |
| aagtacccag | tccatttgga gagttaaaac tgtgcctaac agaggtgtcc tctgactttt | 240 |
| cttctgcaag | ctccatgttt tcacatcttc cctttgactg tgtcctgctg ctgctgctgc | 300 |
| tactacttac | aaggtcctca gaagtggaat acagagcgga ggtcggtcag aatgcctatc | 360 |
| tgccctgctt | ctacacccca gccgccccag ggaacctcgt gcccgtctgc tggggcaaag | 420 |
| gagcctgtcc | tgtgtttgaa tgtggcaacg tggtgctcag gactgatgaa agggatgtga | 480 |
| attattggac | atccagatac tggctaaatg gggatttccg caaggagat gtgtccctga | 540 |
| ccatagagaa | tgtgactcta gcagacagtg ggatctactg ctgccggatc caaatcccag | 600 |
| gcataatgaa | tgatgaaaaa tttaacctga agttggtcat caaaccagcc aaggtcaccc | 660 |
| ctgcaccgac | tcgcagaga gacttcactg cagcctttcc aaggatgctt accaccaggg | 720 |
| gacatggccc | agcagagaca cagacactgg ggagcctccc tgatataaat ctaacacaaa | 780 |
| tatccacatt | ggccaatgag ttacgggact ctagattggc caatgactta cgggactctg | 840 |
| gagcaaccat | cagaataggc atctacatcg gagcagggat ctgtgctggg ctggctctgg | 900 |
| ctcttatctt | cggcgcttta attttcaaat ggtattctca tagcaaagag aagatacaga | 960 |
| atttaagcct | catctctttg gccaacctcc ctccctcagg attggcaaat gcagtagcag | 1020 |
| agggaattcg | ctcagaagaa aacatctata ccattgaaga aacgtatat gaagtggagg | 1080 |
| agcccaatga | gtattattgc tatgtcagca gcaggcagca accctcacaa cctttggggtt | 1140 |
| gtcgctttgc | aatgccatag atccaaccac cttattttg agcttggtgt tttgtctttt | 1200 |
| tcagaaacta | tgagctgtgt cacctgactg gttttggagg ttctgtccac tgctatggag | 1260 |

```
cagagttttc ccattttcag aagataatga ctcacatggg aattgaactg ggacctgcac    1320
tgaacttaaa caggcatgtc attgcctctg tatttaagcc aacagagtta cccaacccag    1380
agactgttaa tcatggatgt tagagctcaa acgggctttt atatacacta ggaattcttg    1440
acgtggggtc tctggagctc caggaaattc gggcacatca tatgtccatg aaacttcaga    1500
taaactaggg aaaactgggt gctgaggtga aagcataact ttttggcac agaaagtcta    1560 aaggggccac tgattttcaa agagatctgt gatccctttt tgtttttgt ttttgagatg    1620 gagtcttgct ctgttgccca ggctggagtg caatggcaca atctcggctc actgcaagct    1680
ccgcctcctg ggttcaagcg attctcctgc ctcagcctcc tgagtggctg ggattacagg    1740
catgcaccac catgcccagc taatttgttg tattttagt agagacaggg tttcaccatg    1800
ttggccagtg tggtctcaaa ctcctgacct catgatttgc ctgcctcggc ctcccaaagc    1860
actgggatta caggcgtgag ccaccacatc cagccagtga tccttaaaag attaagagat    1920
gactggacca ggtctacctt gatcttgaag attcccttgg aatgttgaga tttaggctta    1980
tttgagcact gcctgcccaa ctgtcagtgc cagtgcatag cccttctttt gtctcccta    2040 tgaagactgc cctgcagggc tgagatgtgg caggagctcc cagggaaaaa cgaagtgcat    2100
ttgattggtg tgtattggcc aagttttgct tgttgtgtgc ttgaaagaaa atatctctga    2160
ccaacttctg tattcgtgga ccaaactgaa gctatatttt tcacagaaga agaagcagtg    2220
acggggacac aaattctgtt gcctggtgga agaaggcaa aggccttcag caatctatat    2280
taccagcgct ggatcctttg acagagagtg gtccctaaac ttaaatttca agacggtata    2340
ggcttgatct gtcttgctta ttgttgcccc ctgcgcctag cacaattctg acacacaatt    2400
ggaacttact aaaaattttt ttttactgtt aaaaaaaaaa aaaaaaaa                 2448
```

<210> SEQ ID NO 15
<211> LENGTH: 2033
<212> TYPE: DNA
<213> ORGANISM: Homo sapiens

<400> SEQUENCE: 15

```
cttctgtgtg tgcacatgtg taatacatat ctgggatcaa agctatctat ataaagtcct      60
tgattctgtg tgggttcaaa cacatttcaa agcttcagga tcctgaaagg ttttgctcta     120
cttcctgaag acctgaacac cgctcccata agccatggc ttgccttgga tttcagcggc     180
acaaggctca gctgaacctg gctaccagga cctggccctg cactctcctg ttttttcttc     240
tcttcatccc tgtcttctgc aaagcaatgc acgtggccca gctgctgtg gtactggcca     300 gcagccgagg catcgccagc tttgtgtgtg agtatgcatc tccaggcaaa gccactgagg     360
tccgggtgac agtgcttcgg caggctgaca gccaggtgac tgaagtctgt gcggcaacct     420
acatgatggg gaatgagttg accttcctag atgattccat ctgcacgggc acctccagtg     480
gaaatcaagt gaacctcact atccaaggac tgagggccat ggacacggga ctctacatct     540
gcaaggtgga gctcatgtac ccaccgccat actacctggg cataggcaac ggaacccaga     600
tttatgtaat tgatccagaa ccgtgcccag attctgactt cctcctctgg atccttgcag     660
cagttagttc ggggttgttt ttttatagct ttctcctcac agctgtttct ttgagcaaaa     720
tgctaaagaa aagaagccct cttacaacag gggtctatgt gaaaatgccc ccaacagagc     780
cagaatgtga aaagcaattt cagccttatt ttattcccat caattgagaa accattatga     840
agaagagagt ccatatttca atttccaaga gctgaggcaa ttctaacttt tttgctatcc     900
```

```
agctattttt atttgtttgt gcatttgggg ggaattcatc tctctttaat ataaagttgg      960
atgcggaacc caaattacgt gtactacaat ttaaagcaaa ggagtagaaa gacagagctg     1020
ggatgtttct gtcacatcag ctccactttc agtgaaagca tcacttggga ttaatatggg     1080
gatgcagcat tatgatgtgg gtcaaggaat taagttaggg aatggcacag cccaaagaag     1140
gaaaaggcag ggagcgaggg agaagactat attgtacaca ccttatattt acgtatgaga     1200
cgtttatagc cgaaatgatc ttttcaagtt aaattttatg ccttttatttt cttaaacaaa    1260
tgtatgatta catcaaggct tcaaaaatac tcacatggct atgttttagc cagtgatgct     1320
aaaggttgta ttgcatatat acatatatat atatatatat atatatatat atatatatat     1380
atatatatat atatatattt taatttgata gtattgtgca tagagccacg tatgttttttg    1440
tgtatttgtt aatggtttga atataaacac tatatggcag tgtcttttcca ccttgggtcc    1500
cagggaagtt ttgtggagga gctcaggaca ctaatacacc aggtagaaca caaggtcatt    1560
tgctaactag cttggaaact ggatgaggtc atagcagtgc ttgattgcgt ggaattgtgc    1620
tgagttggtg ttgacatgtg ctttgggggct tttacaccag ttccttttcaa tggtttgcaa   1680
ggaagccaca gctggtggta tctgagttga cttgacagaa cactgtcttg aagacaatgg    1740
cttactccag gagacccaca ggtatgacct tctaggaagc tccagttcga tgggcccaat    1800
tcttacaaac atgtggttaa tgccatggac agaagaaggc agcaggtggc agaatggggt    1860
gcatgaaggt ttctgaaaat taacactgct tgtgttttta actcaatatt ttccatgaaa    1920
atgcaacaac atgtataata ttttttaatta aataaaaatc tgtggtggtc gttttaaaaa   1980
aaaaaaaaaa aaaaaaaaaa aaaaaaaaaa aaaaaaaaaa aaaaaaaaaa aaa           2033

<210> SEQ ID NO 16
<211> LENGTH: 2115
<212> TYPE: DNA
<213> ORGANISM: Homo sapiens

<400> SEQUENCE: 16 agtttcccctt ccgctcacct ccgcctgagc agtggagaag gcggcactct ggtgggggctg    60
ctccaggcat gcagatccca caggcgccct ggccagtcgt ctgggcggtg ctacaactgg    120
gctggcggcc aggatggttc ttagactccc cagacaggcc ctggaacccc ccacccttct   180
ccccagccct gctcgtggtg accgaagggg acaacgccac cttcacctgc agcttctcca    240
acacatcgga gagcttcgtg ctaaactggt accgcatgag ccccagcaac cagacggaca    300
agctggccgc cttccccgag gaccgcagcc agcccggcca ggactgccgc ttccgtgtca    360
cacaactgcc caacgggcgt gacttccaca tgagcgtggt cagggcccgg cgcaatgaca    420
gcggcaccta cctctgtggg gccatctccc tggccccccaa ggcgcagatc aaagagagcc    480
tgcgggcaga gctcagggtg acagagagaa gggcagaagt gcccacagcc cacccccagcc   540
cctcacccag gccagccggc cagttccaaa ccctggtggt tggtgtcgtg gcggcctgc    600
tgggcagcct ggtgctgcta gtctgggtcc tggccgtcat ctgctcccgg gccgcacgag    660
ggacaatagg agccaggcgc accggccagc ccctgaagga ggacccctca gccgtgcctg    720
tgttctctgt ggactatggg gagctggatt tccagtggcg agagaagacc ccggagcccc    780
ccgtgccctg tgtccctgag cagacggagt atgccaccat tgtctttcct agcggaatgg    840
gcacctcatc ccccgccgc agggggctcag ctgacggccc tcggagtgcc cagccactga    900
ggcctgagga tggacactgc tcttggcccc tctgaccggc ttccttggcc accagtgttc    960
tgcagaccct ccaccatgag ccccgggtcag cgcatttcct caggagaagc aggcagggtg   1020
```

```
caggccattg caggccgtcc aggggctgag ctgcctgggg gcgaccgggg ctccagcctg   1080
cacctgcacc aggcacagcc ccaccacagg actcatgtct caatgcccac agtgagccca   1140
ggcagcaggt gtcaccgtcc cctacaggga gggccagatg cagtcactgc ttcaggtcct   1200
gccagcacag agctgcctgc gtccagctcc ctgaatctct gctgctgctg ctgctgctgc   1260
tgctgctgcc tgcggcccgg ggctgaaggc ccgtggccc tgcctgacgc cccggagcct   1320
cctgcctgaa cttgggggct ggttggagat ggccttggag cagccaaggt gccctggca   1380 gtggcatccc gaaacgccct ggacgcaggg cccaagactg gcacaggag tgggaggtac   1440 atggggctgg ggactcccca ggagttatct gctccctgca ggcctagaga agtttcaggg   1500
aaggtcagaa gagctcctgg ctgtggtggg cagggcagga aaccctcca cctttacaca   1560 tgcccaggca gcacctcagg cccttttgtgg ggcagggaag ctgaggcagt aagcgggcag   1620
gcagagctgg aggcctttca ggcccagcca gcactctggc ctcctgccgc cgcattccac   1680
cccagcccct cacaccactc gggagaggga catcctacgg tcccaaggtc aggagggcag   1740
ggctggggtt gactcaggcc cctcccagct gtggccacct gggtgttggg agggcagaag   1800
tgcaggcacc tagggccccc catgtgccca ccctgggagc tctccttgga acccattcct   1860
gaaattattt aaaggggttg gccgggctcc caccagggcc tgggtgggaa ggtacaggcg   1920
ttcccccggg gcctagtacc cccgccgtgg cctatccact cctcacatcc acacactgca   1980
cccccactcc tggggcaggg ccaccagcat ccaggcggcc agcaggcacc tgagtggctg   2040
ggacaaggga tcccccttcc ctgtggttct attatattat aattataatt aaatatgaga   2100
gcatgctaag gaaaa                                                   2115

<210> SEQ ID NO 17
<211> LENGTH: 2978
<212> TYPE: DNA
<213> ORGANISM: Homo sapiens

<400> SEQUENCE: 17
cgtcctatct gcagtcggct actttcagtg gcagaagagg ccacatctgc ttcctgtagg     60
ccctctgggc agaagcatgc gctggtgtct cctcctgatc tgggcccagg ggctgaggca    120
ggctcccctc gcctcaggaa tgatgacagg cacaatagaa acaacgggga acatttctgc    180
agagaaaggt ggctctatca tcttacaatg tcacctctcc tccaccacgg cacaagtgac    240
ccaggtcaac tgggagcagc aggaccagct tctggccatt tgtaatgctg acttggggtg    300
gcacatctcc ccatccttca aggatcgagt ggccccaggt cccggcctgg gcctcaccct    360
ccagtcgctg accgtgaacg atacagggga gtacttctgc atctatcaca cctaccctga    420
tgggacgtac actgggagaa tcttcctgga ggtcctagaa agctcagtgg ctgagcacgg    480
tgccaggttc cagattccat tgcttggagc catggccgcg acgctggtgg tcatctgcac    540
agcagtcatc gtggtggtcg cgttgactag aaagaagaaa gccctcagaa tccattctgt    600
ggaaggtgac ctcaggagaa aatcagctgg acaggaggaa tggagcccca gtgctccctc    660
acccccagga agctgtgtcc aggcagaagc tgcacctgct gggctctgtg gagagcagcg    720
gggagaggac tgtgccgagc tgcatgacta cttcaatgtc ctgagttaca gaagcctggg    780
taactgcagc ttcttcacag agactggtta gcaaccagag gcatcttctg aagatacac    840 ttttgtcttt gctattatag atgaatatat aagcagctgt actctccatc agtgctgcgt    900
gtgtgtgtgt gtgtgtatgt gtgtgtgtgt tcagttgagt gaataaatgt catcctcttc    960
```

```
tccatcttca tttccttggc cttttcgttc tattccattt tgcattatgg caggcctagg      1020
gtgagtaacg tggatcttga tcataaatgc aaaattaaaa aatatcttga cctggttta       1080 aatctggcag tttgagcaga tcctatgtct ctgagagaca cattcctcat aatggccagc      1140
attttgggct acaaggtttt gtggttgatg atgaggatgg catgactgca gagccatcct      1200
catctcattt tttcacgtca ttttcagtaa ctttcactca ttcaaaggca ggttataagt      1260
aagtcctggt agcagcctct atggggagat ttgagagtga ctaaatcttg gtatctgccc      1320
tcaagaactt acagttaaat ggggagacaa tgttgtcatg aaaaggtatt atagtaagga      1380
gagaaggaga catacacagg ccttcaggaa gagacgacag tttggggtga ggtagttggc      1440
ataggcttat ctgtgatgaa gtggcctggg agcaccaagg ggatgttgag gctagtctgg      1500
gaggagcagg agttttgtct agggaacttg taggaaattc ttggagctga aagtcccaca      1560
aagaaggccc tggcaccaag ggagtcagca aacttcagat tttattctct gggcaggcat      1620
ttcaagtttc cttttgctgt gacatactca tccattagac agcctgatac aggcctgtag      1680
cctcttccgg ccgtgtgtgc tggggaagcc ccaggaaacg cacatgccca cacagggagc      1740
caagtcgtag catttgggcc ttgatctacc ttttctgcat caatacactc ttgagccttt      1800
gaaaaaagaa cgtttcccac taaaaagaaa atgtggattt ttaaaatagg gactcttcct      1860
aggggaaaaa gggggctgg gagtgataga gggtttaaaa aataaacacc ttcaaactaa       1920
cttcttcgaa cccttttatt cactccctga cgactttgtg ctgggttgg ggtaactgaa       1980 ccgcttattt ctgtttaatt gcattcaggc tggatcttag aagacttta tccttccacc       2040 atctctctca gaggaatgag cggggaggtt ggatttactg gtgactgatt ttctttcatg      2100
ggccaaggaa ctgaaagaga atgtgaagca aggttgtgtc ttgcgcatgg ttaaaaataa      2160
agcattgtcc tgcttcctaa gacttagact ggggttgaca attgttttag caacaagaca      2220
attcaactat ttctcctagg attttttatta ttattatttt ttcacttttc taccaaatgg     2280
gttacatagg aagaatgaac tgaaatctgt ccagagctcc aagtcctttg gaagaaagat      2340
tagatgaacg taaaaatgtt gttgtttgct gtggcagttt acagcatttt tcttgcaaaa      2400
ttagtgcaaa tctgttggaa atagaacaca attcacaaat tggaagtgaa ctaaaatgta     2460
atgacgaaaa gggagtagtg ttttgatttg gaggaggtgt atattcggca gaggttggac      2520
tgagagttgg gtgttatta acataattat ggtaattggg aaacatttat aaacactatt      2580
gggatggtga taaaatacaa aagggcctat agatgttaga aatgggtcag gttactgaaa      2640
tgggattcaa tttgaaaaaa atttttttaa atagaactca ctgaactaga ttctcctctg      2700
agaaccagag aagaccattt catagttgga ttcctggaga catgcgctat ccaccacgta      2760
gccactttcc acatgtggcc atcaaccact taagatgggg ttagtttaaa tcaagatgtg      2820
ctgttataat tggtataagc ataaaatcac actagattct ggagatttaa tatgaataat      2880
aagaatacta tttcagtagt tttggtatat tgtgtgtcaa aaatgataat attttggatg      2940
tattgggtga aataaaatat taacattaaa aaaaaaaa                              2978
```

MARKERS OF DISEASE PROGNOSIS IN MULTIPLE SCLEROSIS

CROSS-REFERENCE TO RELATED APPLICATIONS

This application is the U.S. National Stage of International Patent Application No. PCT/IL2019/051353, filed on Dec. 11, 2019, which claims the benefit of and priority to U.S. Provisional Patent Application No. 62/778,325, filed on Dec. 12, 2018, the contents of each of which are hereby incorporated by reference in their entireties.

INCORPORATION-BY-REFERENCE OF MATERIAL ELECTRONICALLY FILED

Incorporated by reference in its entirety herein is a computer-readable nucleotide/amino acid sequence listing submitted concurrently herewith and identified as follows: One 18,162 byte ASCII (text) file named "Seq_List" created on Dec. 11, 2019.

FIELD OF THE INVENTION

The invention relates to biomarkers in blood sample of Multiple Sclerosis (MS) patients, for prediction of disease prognosis and outcome and for determining suitable treatment.

BACKGROUND

Multiple sclerosis (MS) is a chronic autoimmune demyelinating disease of the central nervous system (CNS) directed against myelin proteins. The pathological process is characterized by neuroinflammation, causing extensive demyelination, gliosis, and axonal damage. Over two million people are affected by the disease worldwide, making MS the leading cause of neurological disability in young adults. MS is highly heterogeneous, as reflected by large variability in its clinical course, timing of relapses, and rate of disability progression. Although 15% of patients remain disability-free even decades after diagnosis and are defined as benign MS, over 50% of patients will need assistance walking, and as many as 15% of patients with MS will have rapid progression, resulting in severe disability, and are referred to as a malignant disease course (Roxburgh et al., 2005). The heterogeneity of the disease process complicates MS management, as the individual patient's disease course cannot be anticipated at diagnosis.

Currently, there are more than 12 US Food and Drug Administration-approved MS drugs with varied clinical response rates and safety profiles. Despite the advances in treatment options and acknowledging the disease heterogeneity, there is presently no objective parameter for predicting the disease course in MS. This is of great importance because there is a limited time window for effective intervention in malignant MS. Intervention during this period appears to be critical for achieving favorable long-term outcomes and preventing permanent neurological disability (Ziemssen et al. 2016).

Co-inhibitory receptors such as CTLA-4 (cytotoxic T-lymphocyte—associated protein 4), LAG-3 (lymphocyte activation gene 3; or CD223), TIM-3 (T-cell immunoglobulin and mucin domain—containing 3), PD-1 (PDCD1; programmed cell death 1), and TIGIT (T cell immunoreceptor with Ig and ITIM domains) are key factors in maintaining immune homeostasis and play a central role in regulating autoimmune diseases (Zhang et al., 2016; Norio et al., 2018; Anderson et al., 2016). These receptors regulate T cell responses by inhibiting effector T cell activation directly by promoting the suppressive function of regulatory T cells (Tregs) and affecting antigen presentation. These cell surface molecules are expressed on activated immune cells (T cells, B cells, natural killer [NK] cells, some myeloid cells) that regulate the inflammatory and autoimmune responses through a negative feedback mechanism. Malfunction of their crucial role or decreased receptor levels can lead to excessive immune activation and autoimmunity (Zhang et al., 2016). While augmented effector T cell activation plays a major role in MS pathogenesis, insufficient co-inhibitory signals might promote MS development and progression. In mice, CTLA-4 and PD-1 deficiency result in the development of spontaneous autoimmunity (Nishimura et al., 2001; Okazaki et al., 2011). Recent studies have also shown that multiple co-inhibitory molecules, e.g., TIM-3, LAG-3, and TIGIT, predominantly regulate the effector T cell responses within the tissue where their responses are executed (Anderson et al, 2016). The role or involvement of co-inhibitory receptors was further investigated in various processes and models (Monney et al, 2002, Koguchi et al, 2006, Yang et al., 2008, Kadowaki et al, 2016, Joller et al, 2011, Burton et al, 2014, Camisaschi et al, 2010, Kroner et al, 2005, Carter et al, 2007, Tocut et al, 2018, Gettings et al, 2015, and Yshii et al, 2017).

Various methods and assays, employing the use of certain biomarkers and other diagnostic parameters, have been suggested to assist in the diagnosis of MS. These methods and assays may generally be divided into those suggested to differentiate MS patients form healthy subjects (or from subjects with other disorders), those evaluating a patient's predisposition to develop MS, and those suggested to assist in evaluating the status or form of the disease at the time of diagnosis.

For example, US 2010/062472 discloses small molecules or metabolites that are found to have significantly different abundances or intensities between clinically diagnosed MS or other neurological disorders, and normal patients. WO 2008/125651 discloses a biomarker panel that can be used to detect if a subject has MS. Also described are methods of identification of such biomarkers. Additional biomarkers are suggested in e.g. WO 2005/027733 and US 2014/273033.

Currently, no definite biomarker for predicting disease outcome is available for patients with MS, and no way of anticipating long-term disease course (for example, benign or malignant) can be provided at the time of diagnosis. In particular, early and accurate classification of MS patients is essential for providing the most suitable and personalized treatment during the critical time window for therapeutic efficacy.

Thus, there is a need in the art for biomarkers and corresponding methods that can be reliably used for monitoring and efficiently predicting disease outcome and prognosis in MS patients. There is a need in the art for biomarkers that can predict disease outcome so that the most suitable and personalized treatment can be provided to the patient, to result in improved prognosis and disease outcome, as the condition progresses over time. Such biomarkers should preferably be found in peripheral blood of patients and can be used as predictors for prognosis, for assisting in the individualized treatment and management of the disease.

SUMMARY OF THE INVENTION

According to some embodiments, there are provided methods and kits for determining or predicting the prognosis or outcome of Multiple Sclerosis (MS) in a subject afflicted with the disease. In further embodiments, the methods can allow differentiating between benign and malignant disease course and can assist in determining the most suitable treatment for the specific patient, based on the predicted course of the disease, wherein the treatment can be specifically adjusted (personalized) at an early stage of the disease, to thereby improve the condition's projected outcome. In some embodiments, the method include identification and/or quantification of specific biomarkers, such as, co-inhibitory receptors, in the peripheral blood of patients with MS, to indicate on the disease prognosis and predicted course and severity of the disease. In some embodiments, the methods and kits can be used for determining and predicting a MS state in a subject.

In contradistinction from hitherto suggested methods and assays, the teachings of the present invention provide for the first time a way to not merely evaluate MS in a subject at the time of diagnosis, but rather to evaluate the projected MS condition even many years following the time of diagnosis (e.g. after 5 or 10 years). For example, while individual patients may exhibit a similar disease course and degree of severity at the time of diagnosis (as determined by hitherto known clinical and para-clinical diagnostic parameters), they might ultimately exhibit a very different disease course and resulting disability in the years following diagnosis. The present invention allows for the first time to differentiate between these patients with a high degree of sensitivity and specificity, and to thereby assign the most effective and safe treatment for each patient. The invention further discloses unexpectedly methods and assays for predicting the disease course over time (for example, benign versus malignant MS) and the associated level of disability (outcome).

The present disclosure is based, in part, on the unexpected finding that expression levels of biomarkers in peripheral blood mononuclear cells (PBMCs) of MS patients, can predict disease outcome. In particular, LAG-3 and TIM-3 levels were unexpectedly discovered as highly discriminative markers between patients that would eventually develop marked disability within several years, and those that would remain disability free for ten years or more following the assay; additional co-inhibitory receptors, including TIGIT, CTLA-4, and PD-1, as well as other selected biomarkers identified in whole blood, further provided prognostic information characteristic of different populations of MS patients.

The disclosure is further based, in part, on the results of a multi-parameter assay performed using principal component analysis (PCA) on various clinical and para-clinical parameters characteristic of MS, with or without the biomarkers of the invention. Remarkably, a classifier combining LAG-3 and TIM-3 PBMC expression levels together with the clinical and para-clinical parameters, exhibited superior ability to identify the patients that would develop malignant disease, as compared to the para-clinical and clinical parameters, either alone or in combination.

In some embodiments, analysis of the levels (expression) of specific co-inhibitory receptor biomarkers in the blood of patients diagnosed with MS, at an early time point (for example, at the early diagnosis stage), can be used to determine the projected condition course or outcome (for example, to differentiate between benign and malignant disease course) at a later time point, and to thereby allow selecting or determining the most suitable treatment for the specific patient at an early stage.

According to some embodiments, there is thus provided a method for determining disease outcome of Multiple Sclerosis (MS) in a subject afflicted with MS, the method comprising determining at a first time point the blood levels of co-inhibitory receptors, whereby a modulation in the expression level of said co-inhibitory receptors compared to a control value, is indicative of the severity of MS at a second time point, wherein the second time point is at least six months after the first time point.

In some embodiment, a method is provided for determining, at a first time point, the projected severity of MS at a second, subsequent time point, comprising:
 a) obtaining, at the first time point, a peripheral blood mononuclear cells (PBMC)-containing sample from a subject afflicted with MS,
 b) determining the levels of one or more co-inhibitory receptors comprising at least one of TIM-3 and LAG-3, in the sample, and
 c) comparing the levels determined in b) to their respective levels corresponding to a negative control, whereby a statistically significant difference in the expression levels of said one or more co-inhibitory receptors compared to their respective control levels, comprising reduced levels of LAG-3 and/or TIM-3, is indicative of increased disease severity in said subject at the second time point compared to said first time point, wherein said second time point is at least one year after the first time point In another embodiment, said first time point is within one year of MS diagnosis in the subject and is prior to commencement of MS treatment in said subject. In another embodiment said second time point is 5 years to 15 years subsequent to said first time point. In another embodiment, said first time point is within one year of MS diagnosis in the subject and is prior to commencement of MS treatment in said subject, and said second time point is 5 years to 15 years subsequent to said first time point.

In another embodiment, reduced levels of LAG-3 and/or TIM-3 compared to said control levels are indicative of increased disease severity in said subject at the second time point compared to said first time point, wherein each possibility represents a separate embodiment of the invention.

In another embodiment, the method further comprises determining if the projected MS outcome is malignant or benign. In another embodiment the method comprises predicting a malignant MS outcome in said subject, characterized by an Expanded Disability Status Scale (EDSS) score of at least 6 after five years from the first time point, if the levels of LAG-3 and/or TIM-3 are significantly reduced compared to their respective control levels. In another embodiment the method comprises predicting a benign MS outcome in said subject, characterized by an EDSS score of up to 1.5 after 10 years from the first time point, if the levels of LAG-3 and/or TIM-3 are not significantly reduced compared to the control levels. Each possibility represents a separate embodiment of the invention.

In another embodiment, said subject is diagnosed with RRMS at said first time point, and reduced levels of LAG-3 and/or TIM-3 compared to said control levels are indicative of progression from RRMS to SPMS at said second time point, wherein each possibility represents a separate embodiment of the invention.

In another embodiment, said co-inhibitory receptors are selected from the group consisting of TIM-3, LAG-3, TIGIT, CTLA-4, PD-1, and combinations thereof, wherein each possibility represents a separate embodiment of the invention. In some embodiments, the co-inhibitory receptor is TIM-3 and reduced levels thereof compared to a control value are indicative of increased disease severity at the second time point. In some embodiments, the co-inhibitory receptor is LAG-3 and reduced levels thereof compared to a control value are indicative of increased disease severity at the second time point. In some embodiments, the co-inhibitory receptors are TIM-3 and LAG-3 and reduced levels thereof compared to a control value are indicative of increased disease severity at the second time point. Each possibility represents a separate embodiment of the invention.

In another embodiment, step c) is performed using a learning and pattern recognition algorithm or analyzer. In another embodiment the algorithm or analyzer compares the levels determined in c) to their respective control levels, to thereby compare the prognostic pattern of said subject to the pattern corresponding to the negative control. In another embodiment the prognostic pattern further comprises the levels of one or more additional parameters characteristic of MS, and said algorithm or analyzer further compares the levels of said parameters in said subject to their respective levels characteristic of said negative control. In another embodiment said parameters comprise clinical and/or paraclinical parameters providing clinical evaluation of the level of MS severity or disability in said subject and/or magnetic resonance imaging (MRI) evaluation of brain lesions in said subject. In another embodiment said parameters are selected from the group consisting of: MRI baseline T2 hyperintense lesion volume (T2LV), EDSS score at diagnosis, and MS one-year progression index. In another embodiment said clinical and/or paraclinical parameters comprise one or more biomarkers selected from the group consisting of: CSF1R, PTAFR, PSMB10, TAP2, RAF1, NFKB1, IFIT2, MAPKAPK2, NT5E, CTNNB 1, IRF1, BST2, ICAM2, XBP1, NFKBIA, NFKB2, TFRC, STAT2, IL32, IRF7, TNFAIP3, and STAT5A, wherein each possibility represents a separate embodiment of the invention. In another embodiment said algorithm or analyzer is selected from the group consisting of artificial neural network algorithms, principal component analysis (PCA), multi-layer perception (MLP), generalized regression neural network (GRNN), fuzzy inference systems (FIS), self-organizing map (SOM), radial bias function (RBF), genetic algorithms (GAS), neuro-fuzzy systems (NFS), adaptive resonance theory (ART), partial least squares (PLS), multiple linear regression (MLR), principal component regression (PCR), discriminant function analysis (DFA), linear discriminant analysis (LDA), cluster analysis, and nearest neighbor, wherein each possibility represents a separate embodiment of the invention. In a particular embodiment, said algorithm or analyzer comprises PCA.

In another embodiment the sample is a PBMC sample and step b) comprises determining the respective levels of mRNA of said one or more co-inhibitory receptors in said sample.

In another embodiment, said control levels correspond to a healthy subject, not afflicted with MS.

In another embodiment, the method further comprises the step of providing a suitable treatment to said subject after said first time point, based on the projected severity at said second time point. In another embodiment the treatment comprises administration of natalizumab, alemtuzumab, ocrelizumab, and/or cladribine if the predicted MS outcome is malignant. In another embodiment the treatment comprises administration of natalizumab, alemtuzumab, ocrelizumab, and/or cladribine if said subject is diagnosed with RRMS at the first time point and is predicted to progress to SPMS at said second time point. Each possibility represents a separate embodiment of the invention.

In another aspect, there is provided a kit for determining disease outcome MS in a subject afflicted with MS, the kit comprising means for determining the levels of co-inhibitory receptors selected from TIM-3, LAG-3, TIGIT, CTLA-4, and/or PD-1, in a blood sample of a subject, the sample obtained at a first time point; and instructions for using the kit in the determining the disease outcome at a second time point, whereby modulation in the expression level of said co-inhibitory receptors compared to a control value is indicative of the disease outcome.

In some embodiments, there is provided a kit for evaluating, at a first time point, the projected severity of MS at a second, subsequent time point, the kit comprising means for determining the levels of co-inhibitory receptors selected from TIM-3, LAG-3, TIGIT, CTLA-4, and/or PD-1, in a PBMC-containing sample of a subject, and instructions for using the kit in the evaluation of said projected severity, wherein said kit further comprises means for comparing the determined levels to their respective levels corresponding to a negative control, and optionally means for obtaining the PBMC-containing sample from a subject afflicted with MS. In another embodiment, the co-inhibitory receptors are TIM-3 and/or LAG-3, and said kit comprises instructions for use thereof in the methods of the invention.

In one embodiment, the means for comparing the determined levels to their respective levels corresponding to a negative control comprise control samples or values corresponding to the levels of said co-inhibitory receptors in in healthy subjects. In another embodiment the kit further comprises means for isolating PBMC and/or RNA (e.g. mRNA) from said sample.

In another embodiment the kit comprises means for specifically determining the expression levels of TIM-3 and LAG-3 in PBMC in said sample. In another embodiment said kit comprises means for determining the levels of TIM-3, LAG-3, TIGIT, CTLA-4, and PD-1 in said sample. In another embodiment, the kit further comprises means for determining the levels of one or more additional biomarkers selected from the group consisting of: CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3, and STAT5A in said sample. Each possibility represents a separate embodiment of the invention.

In another embodiment, the means comprises specific nucleic acid molecules for identification of mRNA of said co-inhibitory receptors in the samples. In various embodiments, the nucleic acid molecules comprise specific primers for identification of the mRNAs in an amplification reaction performed on RNA isolated from the blood sample, and/or specific probes for identification of said mRNAs in a sequencing reaction performed on RNA isolated from the blood sample. Exemplary nucleic acid molecules that may be used in connection with the methods and kits of the invention are selected from the group consisting of SEQ ID NOs: 3-4, 5-6, 7-8, 9-10, 11-12 and combinations thereof, as set forth in the Examples section herein. Non-limitative examples for using such nucleic acid molecules for evaluating gene expression levels using real-time PCR amplification and relative quantification, are provided in the Examples section hereinbelow.

In another embodiment, there is provided a system for determining disease outcome of MS in a subject afflicted with MS, comprising a kit as disclosed herein, and a processing unit comprising a learning and pattern recognition analyzer, wherein the analyzer compares the collective levels determined in b) to stored data corresponding to a control sample, to thereby compare the prognostic pattern of said subject to a prognostic pattern corresponding to a negative control (e.g. healthy subject). In another embodiment, the pattern recognition analyzer comprises at least one algorithm selected from the group consisting of artificial neural network algorithms, PCA, MLP, GRNN, FIS, SOM, RBF, GAS, NFS, ART, PLS, MLR, PCR, DFA, LDA, cluster analysis, and nearest neighbor.

In another embodiment, there is provided a method of determining disease outcome of MS in a subject afflicted with MS, the method comprising determining at a first time point the blood levels of biomarkers, selected from one or more of: CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3, STAT5A, whereby a modulation in the expression level of said biomarkers compared to a control value, is indicative of the severity of Multiple Sclerosis at a second time point, wherein the second time point is at least six months after the first time point. In various embodiments, the method is performed according to the principles and exemplary embodiments as disclosed herein.

In another embodiment there is provided a method of evaluating, at a first time point, the projected severity of MS at a second, subsequent time point, the method comprising determining at the first time point the blood levels of biomarkers, selected from one or more of: CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3, STAT5A, whereby a statistically significant difference in the expression levels of said biomarkers compared to a control value, is indicative of the severity MS at the second time point, wherein the second time point is at least six months after the first time point.

In addition to the exemplary aspects and embodiments described above, further aspects and embodiments will become apparent by reference to the figures and by study of the following detailed description.

BRIEF DESCRIPTION OF THE FIGURES

In addition to the exemplary aspects and embodiments described above, further aspects and embodiments will become apparent by reference to the figures and by study of the following detailed description.

FIG. 1A—results of RT-PCR for determining the Fold change (FC) of TIGIT, LAG-3, TIM-3, PD-1, and CTLA4 mRNA in peripheral blood mononuclear cells (PBMCs) of MS patients (n=57) compared to HCs (n=12). (**P<0.0003). FIG. 1B—Graphs showing decreased TIGIT expression in OligoClonal bands (OCB)-positive ("Positive") versus OCB-negative ("Negative") patients (P=0.06); top left—TIGIT, top middle—PD-1, top right—CTLA-4, bottom left—TIM-3, bottom right—LAG-3.

FIG. 2A—FC in MS patients with the worst outcome ("malignant") as compared to the "benign" MS group (*P<0.02); FIG. 2B—FC in malignant disease compared to all other MS types ("MS") (*P<0.02); FIG. 2C—FC in benign MS compared to all other MS types (*P<0.05). FIG. 2D—FC in patients that still had RRMS after 10 years ("RRMS", n=37) as compared to patients that progressed to SPMS ("SPMS", n=20) (*P<0.02).

FIG. 3A—Correlation of TIM-3 with 1-year progression indexes (PI); FIG. 3B—Correlation of LAG-3 with 1-year PI; FIG. 3C—Correlation of TIM-3 with 10-year PI; FIG. 3D—Correlation of LAG-3 with 10-year PI; FIG. 3E—Correlation of TIM-3 with Expanded Disability Status Scale (EDSS) score at final visit; FIG. 3F—Correlation of LAG-3 with EDSS score at final visit; FIG. 3G—Correlation of TIM-3 with the number of Disease Modifying Therapy (DMTs) used by each patient, FIG. 3H—Correlation of LAG-3 with the number of DMTs, FIG. 3I—Correlation of TIM-3 with MRI T2 Lesion Volume (T2LV) at baseline; FIG. 3J—Correlation of LAG-3 with T2LV at baseline.

FIGS. 4A-4P. Graphs showing additional correlation analyses of co-inhibitory receptors with clinical and para-clinical variables. FIG. 4A—Correlation of TIGIT, TIM-3, LAG-3, PD-1, and CTLA-4 expression levels (top left, top middle, top right, bottom left and bottom right panels, respectively), with the number of relapses during 10 years follow-up. FIGS. 4B-4D—Correlation of TIGIT, PD1 and CTLA4, respectively, with 1-year progression indexes; FIGS. 4E-4G—Correlation of TIGIT, PD1 and CTLA4, respectively with 10-year progression indexes; FIGS. 4H-4J—Correlation of TIGIT, PD1 and CTLA4, respectively with EDSS score at final visit, FIGS. 4K-4M—Correlation of TIGIT, PD1 and CTLA4, respectively with number of DMTs used by each patient; FIGS. 4N-4P—Correlation of TIGIT, PD1 and CTLA4, respectively with T2LV at baseline.

FIG. 5A—Unsupervised heatmap analysis on the raw data of 1-year progression index (1 year PI), baseline MRI lesion volume (Les), EDSS at diagnosis (EDSS), combined with LAG-3 and TIM-3 expression levels. The distinct clusters are marked as "Diag 1" or "Diag 3". FIG. 5B—Unsupervised PCA analysis; Dark lines and circles (1, originally Red) represent benign outcome; bright lines and circles (3, originally blue) represent malignant outcome. FIG. 5C—Unsupervised heatmap analysis separating patients that remained in RRMS (RR) from those who eventually progressed to SPMS (SP) according to the parameters described in FIG. 5A. FIG. 5D—Unsupervised PCA analysis. Dark dots (RR)—RRMS, light dots (SP)—SPMS.

FIG. 6B—IRF1 expression (Average 2-' $C_T$ Mean) in the HC, benign and malignant groups; FIG. 6C—XBP1 expression in HC vs. malignant MS; FIG. 6D—XBP1 expression in HC vs. all MS patients; FIG. 6E—TFRC expression in HC vs. benign MS; FIG. 6F—TFRC expression in HC vs. all MS patients; FIG. 6G—TFRC expression in HC vs. malignant MS.

DETAILED DESCRIPTION OF THE INVENTION

Figure 1A:
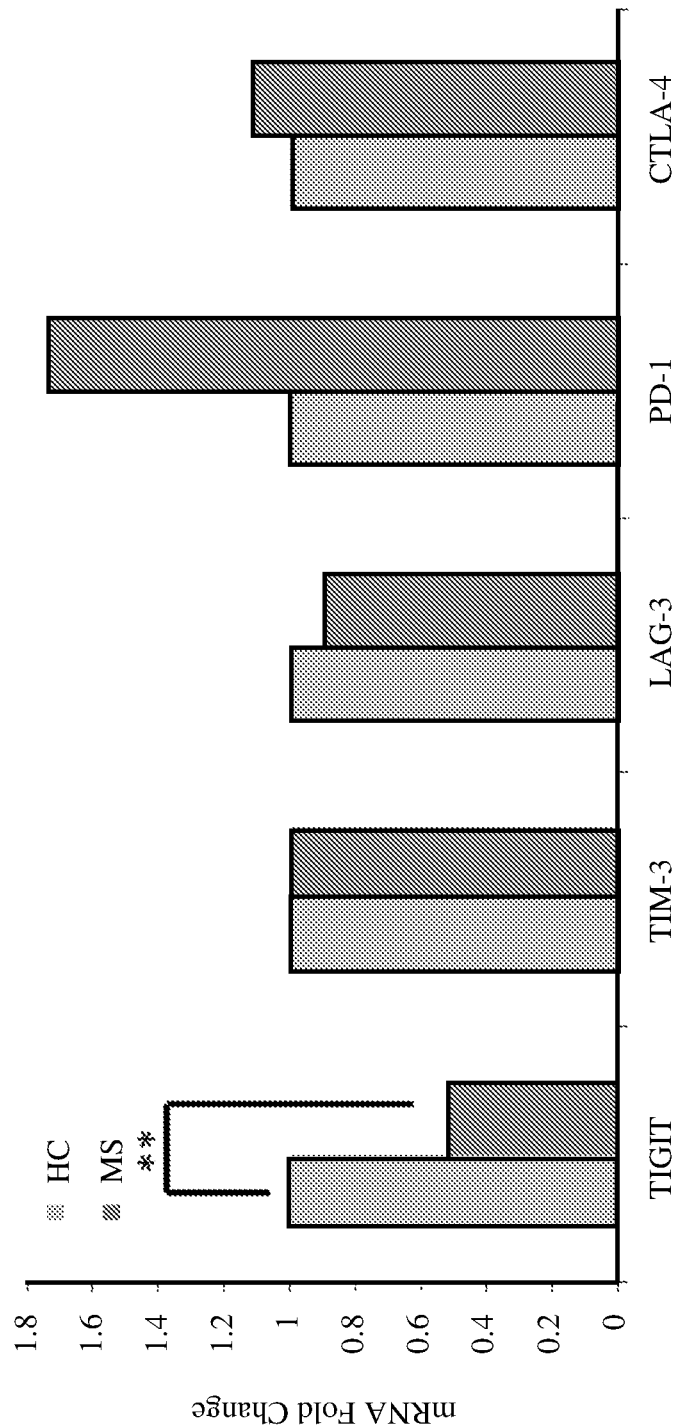
FIGS. 1A-B. Graphs showing co-inhibitory receptor levels in healthy controls (HC) and MS Patients.

According to some embodiments, there are provided methods and kits for determining or predicting the prognosis or outcome of Multiple Sclerosis (MS) in a subject afflicted with the disease. In further embodiments, without wishing to be bound to any theory or mechanism, the methods can allow differentiating between benign and malignant disease course and can assist in determining the most suitable treatment for the specific patient, based on the predicted course of the disease, wherein the treatment can be specifically adjusted (personalized) at an early stage of the disease, to thereby improve the projected outcome.

In some embodiments, the provided methods and kits are advantageous as they provide objective circulating biomarkers for predicting disease severity and prognosis and for aiding the physician in optimizing therapy for the individual patient.

In some embodiments, the present disclosure is based on the unexpected finding that identification and/or quantification of specific biomarkers, such as, co-inhibitory receptors, in blood samples of patients with MS (for example, PBMC samples), at an early time point, can indicate the disease prognosis and predicted course and severity of the disease.

The present invention discloses for the first time the unexpected discovery that co-inhibitory receptors, such as, CTLA-4, PD-1, TIM-3, LAG-3, and TIGIT can be used as prognostic indicators in patients with untreated early MS.

In some embodiments, the present disclosure is further based on the unexpected finding that expression levels of biomarkers such as LAG-3 and TIM-3 in the PBMCs of MS patients can predict disease outcome.

In some embodiments, decreased PBMC expression levels of TIM-3 and LAG-3 at MS diagnosis is an unfavorable prognostic factor, indicative of projected enhancement or exacerbation in disease severity. In some embodiments, decreased PBMC expression levels of TIM-3 and LAG-3 at MS diagnosis (or within two years thereof) is indicative of accelerated deterioration from relapsing-remitting MS (RRMS) to secondary progressive MS (SPMS).

In some embodiments, lower LAG-3 and TIM-3 expression (e.g. compared to a healthy control) is associated with the worst outcome, while increased expression is significantly correlated with benign prognosis and lower Expanded Disability Status Scale (EDSS) score (e.g. 0-1.5) at 10 years after obtaining the first sampling. In some embodiments, analysis of the para-clinical and clinical parameters including baseline brain MRI T2LV, EDSS at diagnosis and 1-year progression index (1-year PI), combined with LAG-3 and TIM-3 expression levels resulted in superior ability to identify the patients that would develop malignant disease as compared to the para-clinical and clinical parameters alone. In some embodiments, decreased LAG-3 and TIM-3 levels affect MS outcome. In some embodiments, PBMCs of patients have significantly lower TIGIT expression compared to that of the healthy controls. In some embodiments, patients with oligoclonal band (OCB)-positive cerebrospinal fluid (CSF) had lower TIGIT levels compared to patients with OCB-negative CSF.

According to some embodiments, and without wishing to be bound to any theory or mechanism, the analysis of baseline T2LV, EDSS at diagnosis and 1-year progression index (1-year PI) combined with LAG-3 and TIM-3 expression levels, which may advantageously be done using principle component analysis (PCA) or other suitable learning and pattern recognition algorithms, results in a superior ability to identify patients with poor outcome as compared to baseline T2LV, EDSS at diagnosis and 1-year PI alone.

In some embodiments, the present invention discloses for the first time the unexpected discovery that modulation in expression of biomarkers such as, CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3, STAT5A, or any combination thereof in whole blood of MS patients can predict disease outcome. Each possibility is a separate embodiment.

In some embodiments, the biomarkers may be selected from one or more of: IRF-1, CTLA-4, PD-1, TIM-3, LAG-3, and TIGIT. Each possibility is a separate embodiment.

Definitions

To facilitate an understanding of the present invention, a number of terms and phrases are defined below. It is to be understood that these terms and phrases are for the purpose of description and not of limitation, such that the terminology or phraseology of the present specification is to be interpreted by the skilled artisan in light of the teachings and guidance presented herein, in combination with the knowledge of one of ordinary skill in the art.

As referred to herein, the terms "polynucleotide molecules", "oligonucleotide", "polynucleotide", "nucleic acid" and "nucleotide" sequences may interchangeably be used. The terms are directed to polymers of deoxyribonucleotides (DNA), ribonucleotides (RNA), and modified forms thereof in the form of a separate fragment or as a component of a larger construct, linear or branched, single stranded (ss), double stranded (ds), triple stranded (ts), or hybrids thereof. The term also encompasses RNA/DNA hybrids. The polynucleotides may be, for example, sense and antisense oligonucleotide or polynucleotide sequences of DNA or RNA. The DNA or RNA molecules may be, for example, but are not limited to: complementary DNA (cDNA), genomic DNA, synthesized DNA, recombinant DNA, or a hybrid thereof or an RNA molecule such as, for example, mRNA, shRNA, siRNA, miRNA, and the like. Accordingly, as used herein, the terms "polynucleotide molecules", "oligonucleotide", "polynucleotide", "nucleic acid" and "nucleotide" sequences are meant to refer to both DNA and RNA molecules. The terms further include oligonucleotides composed of naturally occurring bases, sugars, and covalent inter nucleoside linkages, as well as oligonucleotides having non-naturally occurring portions, which function similarly to respective naturally occurring portions.

As referred to herein, the term "Treating a disease", "treating a condition", or "treating MS" is directed to administering a composition, which comprises at least one reagent (which may be, for example, one or more polynucleotide molecules, one or more expression vectors, one or more substance/ingredient, and the like), effective to ameliorate symptoms associated with a disease, to lessen the severity or cure the disease. With respect to MS, treatment may include in particular administration of available disease modifying therapies, e.g. immunomodulatory therapy and immunosuppressants.

As used herein the terms "diagnosing" or "diagnosis" refer to the process of identifying/detecting/assessing MS in a subject. In some embodiments, the MS is diagnosed at a first time point.

As used herein the terms "prognosis" and "outcome" refer to determining or predicting the disease condition or severity, including the level of disability, at a later time point, which can be, for example, 1 month to 20 years from the first (reference) time point. More typically, the later time point may be 1-15 years or 5-10 years.

As used herein, the term "subject" is interchangeable with an individual or patient. According to some embodiments, the subject is symptomatic. According to other embodiments, the subject is asymptomatic. According to some embodiments, the subject may be treated with one or more drugs or other suitable treatment.

The term "circulating" with respect to biomarker molecules is directed to the presence of the molecules in circulating blood (or a portion thereof such as serum or blood cells) and not localized to a specific organ (such as the brain). In particular, the biomarkers according to various embodiments of the invention are circulating biomarkers identified in blood cells such as PBMC or in whole blood (comprising PBMC and neutrophils). Determining the expression levels of such biomarkers, including co-inhibitory receptors as disclosed herein, in blood cells or samples as disclosed herein, is further referred to herein as determining the blood levels of the respective co-inhibitory receptors.

As used herein the term "biological sample" refers to any sample obtained from the subject being tested. According to some embodiments, the biological sample is selected from: cells, tissue and bodily fluid. Each possibility represents a separate embodiment of the invention. According to some embodiments, the biological sample is a fluid sample. Exemplary fluid samples are e.g. whole blood, plasma, serum, and the like. Each possibility represents a separate embodiment of the invention. In some embodiments, the biological sample is obtained or collected from the subject in any method known in the art. The sample may be collected from the subject by noninvasive, invasive or minimal invasive means. Each possibility represents a separate embodiment of the invention. According to some embodiments, the sample may be treated prior to being subjected to the methods of the present invention. For example blood cells may be lysed, or mRNA may be isolated from PBMC or whole blood cells obtained from a blood sample. According to some embodiments, the sample is a fluid sample and is substantially free of residual cells or debris of cells (e.g. following such treatments). According to some embodiments, the sample is a fluid sample and is obtained from peripheral blood mononuclear cells (PBMC). In some embodiments, the sample is whole blood. As used herein, a PBMC-containing sample is a blood-derived biological sample comprising, or obtained from, PBMC.

As used herein the term "elevation" or "increase" of circulating levels of biomarkers refers, according to some embodiments, to a statistically significant elevation. As used herein the term "decrease" or "reduction" of circulating levels of biomarkers refers, according to some embodiments, to a statistically significant decline. As disclosed herein in the methods of the invention, the elevation or decrease of a respective biomarker is determined compared to its levels in a control sample. In some embodiments, the control sample corresponds to a healthy subject, whereby a "healthy subject" is a subject not diagnosed with MS. According to some embodiments, level is amount. In some embodiments, expression levels may be determined by the respective levels of mRNA and/or protein levels of the biomarker in the sample. According to some embodiments, levels of mRNAs reflect the expression, secretion and/or presence of the biomarkers in a sample of a subject.

As used herein the term "modulation" of circulating levels of specific biomarkers refer to the change in the expression levels of the biomarkers. In some embodiments, modulation is increase in the levels. In some embodiments, modulation is a decrease in the levels. In some embodiments, the changes may be between various measurements obtained at different time points. In some embodiments, the changes may be between consecutive measurements. In some embodiments, the changes may be between various measurements obtained from different subjects (for example, MS patient and healthy control). Thus, modulation as referred to in embodiments of the invention relates to a statistically significant increase or decrease as defined herein.

The term "severity" (or "disease severity") as used herein with respect to MS generally refers to the pace of deterioration and in particular to the rate at which a patient accumulates disability. According to some embodiments, the MS condition may be at a very severe form, referred to herein as "malignant", at a less severe form (which may be referred to as moderate or standard MS), and mild form, referred to herein as "benign". The classification to severity of the condition may be performed by any of the tests mentioned above herein, for example, based on Expanded Disability Status Scale (EDSS), or disease progression over the years. In some embodiments, benign MS is a mild course of MS seen in 5-10% of MS patients. In people affected by benign MS, there is no worsening of functional ability even after 15 years of diagnosis. In some embodiments, "malignant MS" is used to describe MS patients who reach significant level of disability in a short period of time. In some embodiments, benign form may be defined herein by EDSS score ≤1.5, 10 years following MS diagnosis. In some embodiments, malignant form may be defined herein by EDSS score of at least 6 in <5 years from diagnosis.

As used herein, the term EDSS (Expanded Disability Status Scale) is known in the art as a method of quantifying disability in multiple sclerosis and monitoring changes in the level of disability over time. It is widely used in clinical trials and in the assessment of people with MS. The EDSS scale ranges from 0 to 10 in 0.5 unit increments that represent higher levels of disability. Scoring is based on an examination by a neurologist. EDSS steps 1.0 to 4.5 refer to people with MS who are able to walk without any aid and is based on measures of impairment in eight functional systems (FS) (pyramidal, cerebellar, brainstem, sensory, bowel and bladder function, visual function, cerebral (or mental) functions). Each functional system is scored on a scale of 0 (no disability) to 5 or 6 (more severe disability). EDSS steps 5.0 to 9.5 are defined by the impairment to walking.

As used herein, the term oligoclonal bands (OCBs) refers to bands of immunoglobulins that are identified when a patient's blood serum, or cerebrospinal fluid (CSF) and are used in the diagnosis of multiple sclerosis. The amount or degree of bands is indicative of disease condition.

As used herein, the term "progression index" (or PI) is used to quantify the progression of MS in the subject, presented as the degree of clinically evaluated disability divided by the duration of the disease. For example, the progression index may be determined by dividing the change in the subject's EDSS from the initial EDSS evaluated at diagnosis, by the years since their clinical diagnosis. Accordingly, the one-year PI as referred to herein corresponds to the change in the subject's EDSS after one year from the time MS was diagnosed in the subject, from the EDSS evaluated at their initial MS diagnosis.

As used herein, MRI baseline T2 hyperintense lesion volume, or "baseline T2LV", is known in the art as a quantitative measurement of MS-associated white matter lesions, evaluated by magnetic resonance imaging (MM).

Brain MRI may be used by clinicians to predict future accumulation of disability, and T2LV in particular may be used as a prognostic factor. Nevertheless, MRI findings and disease severity are not correlated in many patients with MS. This is known as the clinico-radiological paradox or dissociation (Healy et al, 2017).

Subjects and Samples

According to embodiments of the invention, subjects to be evaluated by the methods and assays of the invention include subjects afflicted with MS. These subjects are typically human subjects diagnosed with MS at, or prior to, a first time point, in which a sample to be evaluated in accordance with the methods and assays of the invention is collected.

Multiple sclerosis is characterized by varied CNS deficits, with remissions and recurring exacerbations. Exacerbations average about 1 every 2 years, but frequency varies greatly. Although MS may progress and regress by a manner hitherto considered to be unpredictable, there are typical patterns of progression:

Relapsing-remitting pattern (RRMS): Exacerbations alternate with remissions, when partial or full recovery occurs or symptoms are stable. Remissions may last months or years. Exacerbations can occur spontaneously or can be triggered by an infection such as influenza.

Primary progressive pattern (PPMS): The disease progresses gradually with no remissions, although there may be temporary plateaus during which the disease does not progress. Unlike in the relapsing-remitting pattern, there are no clear exacerbations.

Secondary progressive pattern (SPMS): This pattern begins with relapses alternating with remissions (relapsing-remitting pattern), followed by gradual progression of the disease.

Progressive relapsing pattern (PRMS): The disease progresses gradually, but progression is interrupted by sudden, clear relapses. This pattern is rare.

Approximately 85-90% of patients begin with a relapsing-remitting (RRMS) course and 40% eventually become progressive (secondary progressive MS, SPMS); in 10%, MS presents a primary progressive course (PPMS).

In some embodiments, a sample is collected from a subject at the first time point, in order to evaluate the blood levels of co-inhibitory receptors or other biomarkers according to the methods of the invention.

According to some embodiments, the sample is a fluid sample, such as, whole blood, and the expression of the biomarker molecules within said fluid sample are analyzed. According to some embodiments, the sample is a fluid sample obtained from blood cells, and the expression of the biomarker molecules within said fluid sample are analyzed. In accordance with some embodiments, the sample is collected, centrifuged, and the supernatant or cellular fraction are removed and analyzed for specific biomarker molecules. According to some embodiments, the sample is reconstituted (e.g. with fluids, such as, PBS or media). According to alternative embodiments the fluid sample is analyzed together with the cells present therein without prior separation. According to additional embodiments, the sample may conveniently be frozen after being collected from the subject and thawed before use. In some embodiments, the biological sample may also optionally comprise a sample that has not been physically removed from the subject.

According to some embodiments, the methods of the invention encompass determining the expression levels of biomarkers in blood samples of a subject afflicted with MS, wherein the samples are obtained at a first time point, which may be at diagnosis of the condition or at an early onset of the condition, or at close proximity thereto. In some embodiments, the samples may be obtained at various time points before commencement of treatment. In some embodiments, the time points before commencement of treatment may be any time point of between 1 hour to 6 months. In some embodiments, the time points before commencement of treatment may be any time point of between 6 months to 1 year. In some embodiments, the time points before commencement of treatment may be any time point of between 6 months to five years.

In some embodiments, the first time point is a time point at which the subject is diagnosed with MS. In some embodiments, the subject is not treated at the first time point. The subject is typically a human subject that has been diagnosed with MS. Typically, the subject has been diagnosed with MS for less than two years and has not been treated for MS at the first time point. For example, a blood sample taken from the subject at the time of diagnosis, in which said subject is not treated for MS, may be used for determining the levels of biomarkers and predicting disease outcome by the methods of the invention. In another embodiment, said subject is disability free (EDSS≤1.5) at the first time point.

The sample to be used by the methods according to advantageous embodiments of the invention is a PBMC-containing sample, e.g. a peripheral blood sample or a purified PBMC sample. In other embodiments, the sample consists of, or consists essentially of, PBMC. The sample may be further processed for determining the expression levels of the biomarkers at the mRNA level or at the protein level. For example, the cells may be lysed, and RNA or polypeptides may be isolated therefrom, according to well-known procedures.

Diagnostic Assays and Methods

According to some embodiments, the results presented herein demonstrate for the first time that a set of biomarkers with modulated expression in the blood of MS patients compared to healthy control subjects, are indicative of the expected (future) disease prognosis. In other words, the diagnostic assays and methods of the invention provide for evaluating not merely the current state, stage or grade of MS in the subject (at the time point at which the assays and methods are performed, referred to in some embodiments as a first time point), but rather for predicting the subsequent outcome of the disease in the subject at a second, subsequent time point, which may be many years later.

According to some embodiments, there is thus provided a method of determining disease outcome of MS in a subject afflicted with MS, the method comprising determining at a first time point the blood levels of co-inhibitory receptors, whereby a modulation in the expression level of said co-inhibitory receptors compared to a control value, is indicative of the severity of MS at a second time point, wherein the second time point is at least six months after the first time point.

According to some embodiments, there is thus provided a method of determining disease outcome of MS in a subject afflicted with MS, the method comprising determining at a first time point the blood levels of co-inhibitory receptors, whereby a modulation in the expression level of said co-inhibitory receptors compared to a control value, is indicative of the outcome of MS at a second time point, wherein the second time point is at least six months after the first time point.

In some embodiments, the invention refers to a method of determining disease outcome of MS in a subject afflicted (and typically diagnosed) with MS, comprising determining at a first time point the blood levels of co-inhibitory receptors comprising at least one of TIM-3 and LAG-3, whereby reduction in the expression level of said co-inhibitory receptors compared to a control value, is indicative of increased disease severity at a second time point, wherein the second time point is at least six months after the first time point.

In some embodiments, determining the outcome comprises predicting the severity and/or the level of disability at said second time point. In a particular embodiment, predicting the disability comprises predicting a malignant or benign outcome as defined herein. In another embodiment determining the outcome further comprises predicting a deterioration from a milder form of MS such as RRMS into a more progressive form such as SPMS at the second time point.

In some embodiments, the method further includes a step of comparing the levels of the biomarkers in the biological sample from the MS patient to the corresponding levels of the biomarkers obtained from biological samples of healthy control subjects.

In some embodiments, a method of determining disease outcome of MS in a subject afflicted with MS comprises:
  a) collecting a blood sample from the subject at a first time point,
  b) determining the expression levels of one or more co-inhibitory receptors, selected from the group consisting of TIM-3 and LAG-3, in the sample, and
  c) comparing the determined levels to their respective levels corresponding to a healthy control subject, whereby reduction in the expression level of said one or more co-inhibitory receptors compared to the control levels, is indicative of increased disease severity in said subject at a second time point, wherein the second time point is at least one year after the first time point.

In other embodiments, a method for evaluating, at a first time point, the projected severity of MS at a second, subsequent time point, comprises:
  a) obtaining a PBMC-containing sample from a subject afflicted with MS at the first time point,
  b) determining the levels of one or more co-inhibitory receptors comprising at least one of TIM-3 and LAG-3, in the sample, and
  c) comparing the levels determined in b) to their respective levels corresponding to a negative control, whereby a statistically significant difference in the expression levels of said one or more co-inhibitory receptors compared to their respective control levels, comprising reduced levels of LAG-3 and/or TIM-3, is indicative of increased disease severity in said subject at the second time point compared to said first time point, wherein said second time point is at least one year after the first time point.

In another embodiment said first time point is within one year of MS diagnosis in the subject and is prior to commencement of MS treatment in said subject, and said second time point is 5 years to 15 years subsequent to said first time point.

In some embodiments, the method comprises determining if the projected MS disease outcome is malignant or benign.

In another embodiment, reduction in the expression level of said one or more co-inhibitory receptors compared to the control levels, is indicative of a malignant MS condition, characterized by an EDSS score of at least 6 after five years from the first time point.

Thus, in some embodiments, the method comprises predicting a malignant disease course in the subject if the level of said one or more co-inhibitory receptors is reduced compared to the control levels. In other embodiments, the method comprises predicting a malignant MS outcome in the subject, characterized by an EDSS score of at least 6 after five years from the first time point, if the level of said one or more co-inhibitory receptors is reduced compared to the control levels. In other embodiments, the method comprises predicting a malignant MS outcome in the subject, characterized by an EDSS score higher than 6 (e.g., 6.5, 7, 7.5, 8, 8.5, 9, 9.5 or 10) after five years from the first time point, if the level of said one or more co-inhibitory receptors is reduced compared to the control levels. Thus, for example, the method may comprise predicting that said subject will manifest a significant level of disability, characterized in that said subject is incapable at the second time point of walking 20 meters without resting, in the absence of at least two walking aids (e.g. pair of canes or crutches), wherein said second time point is within 5 years of said first time point, if the level of said one or more co-inhibitory receptors is reduced compared to the control levels.

In another embodiment, lack of reduction in TIM-3 and LAG-3 expression levels compared to said control levels are indicative of a benign MS condition, characterized by an EDSS score of less or equal to 1.5 even after 10 years from the first time point. In another embodiment, enhancement of expression, and in particular of LAG-3 levels, compared to said control levels, is indicative of a benign MS condition.

Thus, in some embodiments, the method comprises predicting a benign disease course in the subject if the level of said one or more co-inhibitory receptors is not significantly reduced (to a statistically significant extent), or, in other embodiments, enhanced, compared to the control levels. Thus, in some embodiments, the method comprises predicting a benign disease course in the subject if the level of said one or more co-inhibitory receptors is enhanced compared to the control levels. In other embodiments, the method comprises predicting a benign MS outcome in the subject, characterized by an EDSS score of up to 1.5 after 10 years from the first time point, if the level of said one or more co-inhibitory receptors is not reduced compared to the control levels. In other embodiments, the method comprises predicting a benign MS outcome in the subject, characterized by an EDSS score of up to 1.5 after 10 years from the first time point, if the level of said one or more co-inhibitory receptors is enhanced compared to the control levels. In other embodiments, the method comprises predicting a benign MS outcome in the subject, characterized by an EDSS score of less than 1.5 (e.g. 1 or 0) after 10 years from the first time point, if the level of said one or more co-inhibitory receptors is not reduced compared to the control levels. In other embodiments, the method comprises predicting a benign MS outcome in the subject, characterized by an EDSS score of less than 1.5 after 10 years from the first time point, if the level of said one or more co-inhibitory receptors is enhanced compared to the control levels. Thus, for example, the method may comprise predicting that said subject will be free of disability within 10 years from the first time point, if the level of said one or more co-inhibitory receptors is not reduced, or, in other embodiments, enhanced, compared to the control levels. In other embodiments, the method may comprise predicting that said subject will be free of disability by 10 years or more (e.g. 15 years) from the first time point, if the level of said one or more co-inhibitory receptors is not reduced, or, in other embodiments, enhanced, compared to the control levels.

In other embodiments, reduction in TIM-3 and/or LAG-3 expression at the first time point compared to their respective levels at a time point preceding said first time point is indicative of enhanced severity of MS at said second time point.

In some embodiments, the methods and kits of the invention include determining the levels of a plurality of parameters (e.g. 2, 3, 4, 5 or 6 co-inhibitory receptors or other biomarkers as disclosed herein). In some embodiments, the method may further include evaluating the disease status by clinical parameters.

According to some embodiments, the severity or the MS condition may be determined by one or more tests and/or paraclinical measures used in the art to determine or assess the severity of the disease. In some embodiments, the tests may include one or more of: Progression index, Expanded Disability Status Scale (EDSS), number of relapses, number of disease modifying therapies (DMTs), baseline brain MRI T2 lesion volume (T2LV), Oligoclonal bands (OCB), or combinations thereof. The test may be performed at various time points, for example, at 1 year and 10 year, to determine disease progression, severity and/or outcome.

In other embodiments, step c) is performed using a learning and pattern recognition algorithm or analyzer. For example, the algorithm may comprise, without limitation, artificial neural network algorithms, principal component analysis (PCA), multi-layer perception (MLP), generalized regression neural network (GRNN), fuzzy inference systems (FIS), self-organizing map (SOM), radial bias function (RBF), genetic algorithms (GAS), neuro-fuzzy systems (NFS), adaptive resonance theory (ART), partial least squares (PLS), multiple linear regression (MLR), principal component regression (PCR), discriminant function analysis (DFA), linear discriminant analysis (LDA), cluster analysis, and nearest neighbor. Thus, step c) may further comprise in some embodiments determining the prognostic signature or pattern of the subject and comparing said signature or pattern to a control signature or pattern, e.g. using such algorithms. In some embodiments, the algorithm or analyzer compares the collective levels determined in c) to their respective control levels, to thereby compare the prognostic pattern of said subject to the prognostic pattern corresponding to the negative control subject. In other embodiments, the prognostic signature further reflects other markers or parameters used in MS evaluation, for example the level of disability (e.g. according to the EDSS scale) at the time of diagnosis or the nature (e.g. volume) of demyelinating brain lesions (e.g. measured by MRI). Thus, in some embodiments the prognostic pattern further comprises the levels of one or more additional parameters characteristic of MS, and said algorithm or analyzer further compares the levels of said parameters in said subject to their respective levels characteristic of said negative control subject. In various embodiments, said parameters comprise clinical and/or paraclinical parameters providing clinical evaluation of the level of MS severity or disability in said subject and/or magnetic resonance imaging (MRI) evaluation of brain lesions in said subject. In some embodiments said parameters are selected from the group consisting of: MRI baseline T2 hyperintense lesion volume (T2LV), EDSS score at diagnosis, and MS one-year progression index. In other embodiments said parameters comprise one or more biomarkers selected from the group consisting of: CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3, and STAT5A. In another embodiment, step c) is conveniently performed using a computer implemented system.

In some embodiments, said control levels correspond to a healthy subject, not afflicted with MS. In some embodiments, the control value is zero (i.e., non-detectable level). In some embodiments, the control value is any predetermined value. In some embodiments, the methods are qualitative. In some embodiments, the methods are quantitative.

In some embodiments, the methods of the invention comprise detecting and quantifying biomarker expression at the transcript (mRNA) level. In other embodiments, said methods comprise detecting and quantifying biomarker expression at the gene product (protein) level.

In some embodiments, the method may further include a step of isolating mRNA from the subject blood sample at a first time point to determine the levels of the biomarkers in the blood sample. In some embodiments, the level of the biomarker in the biological sample may be determined by a method selected from: amplification reaction, sequencing reaction, microarray, or combinations thereof.

In some embodiments, identification and/or quantification of the specific biomarkers in the sample may be performed by use of specific probes or tags capable of specifically interacting with the mRNA molecules encoding for the biomarkers, by quantitative amplification of selected mRNA regions, or by specific antibodies capable of interacting with the biomarkers. In some embodiments, such tags or probes may include nucleic acid molecules. In some embodiments, such tags or probes may include nucleic acid probe, nucleic acid primers, peptidic-tags, and the like.

According to some embodiments, suitable methods to detect and/or quantify mRNA of the biomarkers may include such methods as, but not limited to: amplification reaction, comprising, e.g., polymerase chain reaction (PCR), reverse-transcriptase PCR (RT-PCR, e.g. quantitative or semi-quantitative), real time PCR, and the like; Gene expression microarrays, such as Affymetrix, Agilent, and Illumina microarray platforms; NanoString technology, Sequencing, such as, next Generation Sequencing (NGS) using specific adaptors and/or probes; and the like, or combinations thereof.

For example, real time quantitative PCR (RT-qPCR) allows amplification and simultaneous quantification of a target DNA molecule. To analyze gene expression levels using RT-qPCR, the total mRNA of a blood sample (e.g. PBMCs or whole blood) may first be isolated and reverse transcribed into cDNA using reverse transcriptase. For example, mRNA levels can be determined using e.g. TaqMan Gene Expression Assays (Applied Biosystems) on an ABI PRISM 7900HT instrument according to the manufacturer's instructions. Transcript abundance can then be calculated by comparison to a standard curve.

Digital PCR is a new approach to nucleic acid detection and quantification that offers an alternate method to conventional real-time quantitative PCR for absolute quantification and rare allele detection. Digital PCR works by partitioning a sample of DNA or cDNA into many individual, parallel PCR reactions; some of these reactions contain the target molecule (positive) while others do not (negative). A single molecule can be amplified a million-fold or more. During amplification, TaqMan chemistry with dye-labeled probes is used to detect sequence-specific targets. When no target sequence is present, no signal accumulates. Following PCR analysis, the fraction of negative reactions is used to generate an absolute count of the number of target molecules in the sample, without the need for standards or endogenous controls. The use of a nanofluidic chip provides a convenient and straightforward mechanism to run thousands of PCR reactions in parallel. Each well is loaded with a mixture of sample, master mix, and TaqMan Assay reagents, and individually analyzed to detect the presence (positive) or absence (negative) of an endpoint signal. To account for wells that may have received more than one molecule of the target sequence, a correction factor is applied using the Poisson model.

RNA-SEQ uses next-generation sequencing (NGS) for the detection and quantification of RNA in a biological sample at a given moment in time. An RNA library is prepared, transcribed, fragmented, sequenced, reassembled and the sequence or sequences of interest quantified.

NanoString technology uses unique color-coded molecular barcodes that can hybridize directly to many different types of target nucleic acid molecules, and offers a cost-effective way to analyze the expression levels of up to 800 genes simultaneously, with sensitivity comparable to qPCR.

Microarrays allow gene expression in two samples to be compared. Total RNA is first isolated from, e.g. PBMCs or whole blood using, for example, Trizol or an RNeasy mini kit (Qiagen). The isolated total RNA is then reverse transcribed into double-stranded cDNA using reverse transcriptase and polyT primers and labelled using e.g. Cy3- or Cy5-dCTP. Appropriate Cy3- and Cy5-labelled samples are then pooled and hybridized to custom spotted oligonucleotide microarrays comprised of probes representing suitable genes and control features. Samples may be hybridized in duplicate, using a dye-swap strategy, against a common reference RNA derived from pooled PBMC or whole blood samples. Following hybridization, arrays are washed and scanned on e.g. an Agilent G2565B scanner. Suitable alternatives to the steps described above are well known in the art and would be apparent to the skilled person. The raw microarray data obtained can then be analyzed using suitable methods to determine the relative expression of genes of interest, as applicable.

In certain embodiments, methods of the invention are performed by an immunoassay, using antibodies specific to one or more markers of the invention.

An antibody directed (or specific) to an antigen, as used herein is an antibody which is capable of specifically binding the antigen. The term "specifically bind" as used herein means that the binding of an antibody to an antigen is not competitively inhibited by the presence of non-related molecules. It should be understood that when the terms "antibody" or "antibodies" are used, this is intended to include intact antibodies, such as polyclonal antibodies or monoclonal antibodies (mAbs), as well as proteolytic fragments thereof such as the Fab or F(ab')$_2$ fragments. Further included within the scope of the invention are chimeric antibodies; recombinant and engineered antibodies, single-chained antibodies (e.g. single-chain Fv) and fragments thereof.

The term "antigen" as used herein is a molecule or a portion of a molecule capable of being bound by an antibody. The antigen is typically capable of inducing an animal to produce antibody capable of binding to an epitope of that antigen. An antigen may have one or more epitopes. The specific reaction referred to above is meant to indicate that the antigen will react, in a highly selective manner, with its corresponding antibody and not with the multitude of other antibodies which may be evoked by other antigens.

In various embodiments, the immunoassay is selected from the group consisting of dipstick, ELISA (including various multiplexed ELISA technologies), an antibody array, an antibody chip, a lateral flow test, and multiplex bead immunoassay. In another embodiment determining the levels of said gene products is performed by mass spectrometry or using a micro-spectrometer.

For example, enzyme-linked immunosorbent assays (ELISAs) allow the relative amounts of proteins present in a sample to be detected. The sample is first immobilized on a solid support, such as a polystyrene microtiter plate, either directly or via an antibody specific for the protein of interest. After immobilization, the antigen is detected using an antibody specific for the target protein. Either the primary antibody used to detect the target protein may be labelled to allow detection, or the primary antibody can be detected using a suitably labelled secondary antibody. For example, the antibody may be labelled by conjugating the antibody to a reporter enzyme. In this case, the plate developed by adding a suitable enzymatic substrate to produce a visible signal. The intensity of the signal is dependent on the amount of target protein present in the sample.

Protein chips, also referred to as protein arrays or protein microarrays, allow the relative amounts of proteins present in a sample to be detected. Different capture molecules may be affixed to the chip. Examples include antibodies, antigens, enzymatic substrates, nucleotides and other proteins. Protein chips can also contain molecules that bind to a range of proteins. Protein chips are well known in the art and many different protein chips are commercially available.

In some embodiments, determining the blood levels of one or more markers of the invention, include determining their respective levels in a sample, by a process comprising contacting the sample, under conditions such that a specific antigen-antibody complex may be formed, with antibodies directed to the one or more markers of interest, and quantifying the amount of antigen-antibody complex formed for each marker.

In some embodiments, the method is performed so as to determine the prognostic signature of the subject with respect to said one or more markers. In another embodiment, the prognostic signature comprises the respective level measured for each marker. In another embodiment, the prognostic signature further comprises the respective level measured for one or more additional markers, such as the clinical and paraclinical parameters disclosed herein. In another embodiment, the prognostic signature of the subject is compared to a prognostic signature corresponding to a healthy control. In another embodiment, the prognostic signature is produced and/or compared to the control prognostic signature using a learning and pattern recognition algorithm.

According to some embodiments, the method of assessing MS disease outcome may encompass, apart for the determining the levels of the indicated circulating biomarkers, any known methodologies used to assess the respective condition and/or treatment efficacy.

Biomarkers

As used herein, the term co-inhibitory receptors relates to cell surface receptors that regulate T cell responses by inhibiting effector T cell activation directly, e.g. by promoting the suppressive function of regulatory T cells (Tregs) and affecting antigen presentation. Exemplary co-inhibitory receptors include, for example:

Lymphocyte activating gene 3—LAG-3, CD223 (for example, accession number NM_002286.5, SEQ ID NO: 13 (human LAG-3 transcript));

T-cell immunoglobulin and mucin domain-containing 3—TIM-3 (for example, accession number NM_032782.4, SEQ ID NO: 14 (human TIM-3, also known as HAVCR2, transcript));

Cytotoxic T-lymphocyte—associated protein 4—CTLA-4 (for example, accession number NM_005214.4, SEQ ID NO: 15 (human CTLA-4 variant 1 transcript));

Programmed cell death 1—PD-1 (for example, accession number NM_005018.2, SEQ ID NO: 16 (human PD-1 transcript)); and T cell immunoreceptor with Ig and ITIM domains—TIGIT (for example, accession number NM_173799.3, SEQ ID NO: 17 (human TIGIT transcript)).

As disclosed herein, particularly advantageous biomarkers that may be used in embodiments of the invention are LAG-3, TIM-3 and combinations thereof, wherein each possibility represents a separate embodiment of the invention.

Additional biomarkers that may be used in accordance with embodiments of the invention include e.g. other leukocyte-expressed markers such as: colony stimulating factor 1 receptor (CSF1R), platelet-activating factor receptor (PTAFR), Proteasome Subunit Beta 10 (PSMB10), Transporter 2, ATP Binding Cassette Subfamily B Member (TAP2), Raf-1 Proto-Oncogene, Serine/Threonine Kinase (RAF1), Nuclear Factor Kappa B Subunit 1 (NFKB1), Interferon Induced Protein With Tetratricopeptide Repeats 2 (IFIT2), MAPK Activated Protein Kinase 2 (MAPKAPK2), Ecto-5'-Nucleotidase (NT5E), Catenin Beta 1 (CTNNB1), Interferon regulatory factor 1 (IRF1), Bone Marrow Stromal Cell Antigen 2 (BST2), Intercellular adhesion molecule 2 (ICAM2), X-Box Binding Protein 1 (XBP1), NFKB Inhibitor Alpha (NFKBIA), Nuclear Factor Kappa B Subunit 2 (NFKB2), Transferrin Receptor (TFRC), Signal Transducer And Activator of Transcription 2 (STAT2), Interleukin-32 (IL-32), Interferon regulatory factor 7 (IRF7), TNF Alpha Induced Protein 3 (TNFAIP3), and Signal Transducer and Activator of Transcription 5A (STAT5A).

In another embodiment, the blood levels of one or more biomarkers selected from the group consisting of TIM-3, LAG-3, TIGIT, CTLA-4 (canonical—variant 1 and/or alternatively spliced variant—soluble CTLA-4 isoform, sCTLA4), PD-1, CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3, and STAT5A, are determined and used for assessing MS prognosis in a subject, wherein each possibility represents a separate embodiment of the invention.

In other embodiments, combinations of biomarkers are used, as disclosed herein. In other embodiments, combinations of leukocyte-expressed biomarkers and clinical and/or para-clinical parameters are used, as disclosed herein.

Therapeutic Use

In some embodiments, the methods of the invention are useful for managing the subject treatment by the clinician or physician subsequent to the determination of disease prognosis. According to some embodiments, based on the determination of the disease prognosis, treatment regime may be adjusted or modulated. Adjustment of treatment regime may include, for example, but not limited to: adjustment of dosage (reducing or increasing dosage), ceasing treatment, replacing or adding a drug, and the like.

According to some embodiments, it is highly beneficial to be able to predict the MS condition outcome (for example, benign, severe or malignant) as early as possible, to allow the adjustment of the most suitable treatment based on the predicted outcome, such that the suited treatment can results in improving the patient's condition. The current MS treatment recommendations are that disease modifying therapies (DMTs, also referred to in some embodiments as "treatments") should be initiated at an early disease stage because they are likely to influence future disease outcome. There are currently more than a dozen DMTs available for MS, with different modes of action, adverse effects profiles, and response rates, making differential therapy protocol possible for patients with mild disease as opposed to those with probable worse disease outcome. Thus, a biomarker that enables the clinician to identify which patients will need a more effective DMT is crucial for providing more individualized treatment. For example, starting with third line/more effective therapies, such as, for example, Tysabri (natalizumab), Lemtrada (Alemtuzumab), Ocrelizumab, and Cladribine in patients with predicted severe (e.g. malignant) prognosis or starting with safe first line therapies such as, for example: Copaxone, Avonex, Plegridy, Rebif, Betaferon, Aubagio, and/or Tecfidera in patients with a predicted benign prognosis, would be highly advantageous from the clinical viewpoint. Such treatment assignments and adjustments may now be performed in accordance with the teachings of the present invention at an early time point, thereby improving safety and efficacy in the treatment of MS.

Doses and treatment regimens for MS treatment may be employed and adjusted by the skilled artisan (e.g. the treating physician). For example, the following treatments for patients determined by the methods and assays of the invention to exhibit a malignant disease outcome (e.g. predicted to exhibit marked disability characterized as EDSS score of at least 6 within 5 years of diagnosis), may be employed as first-line therapies:

Natalizumab is a recombinant humanized anti-α4-integrin monoclonal antibody, acting as an integrin receptor antagonist. The drug is marketed under the tradename TYSABRI as a solution [300 mg per 15 mL vial] for dilution prior to infusion. Treatment of MS patients typically includes administration of a 300 mg dose by intravenous infusion once every 4 weeks.

Alemtuzumab is a CD52-directed cytolytic monoclonal antibody. The drug is marketed under the tradename Lemtrada for the treatment of MS as a 12 MG/1.2 ML (10 MG/ML) dosage form for injection. The drug is typically administered by intravenous infusion over 4 hours for 2 treatment courses: first course—12 mg/day on 5 consecutive day; second course—12 mg/day on 3 consecutive days 12 months after first treatment course. Subsequent treatment courses of 12 mg per day on 3 consecutive days (36 mg total dose) may be administered, as needed, at least 12 months after the last dose of any prior treatment course Ocrelizumab is a CD20-directed cytolytic antibody. Ocrelizumab is marketed under the tradename OCREVUS as a 30 MG/1 ML dosage form for injection. The drug is typically administered by intravenous infusion according to the following regime: start dose—300 mg intravenous infusion, followed two weeks later by a second 300 mg intravenous infusion; subsequent doses: 600 mg intravenous infusion every 6 months.

Cladribine (2-chloro-2'-deoxyadenosine (2CdA)) is a purine antimetabolite. The drug is marketed under the tradename MAVENCLAD for the treatment of MS as a 10 mg oral tablet. The drug is typically used at a cumulative dosage of 3.5 mg/kg administered orally and divided into two treatment courses (1.75 mg/kg per treatment course). Each treatment course is typically divided into 2 treatment cycles.

In other embodiments, other drugs classified as e.g. third-line MS DMTs due to high toxicity or adverse events, including other immunosuppressive DMTs and additional drugs indicated for the treatment of progressive forms of MS, may be used as first-line treatment of patients determined by the methods and assays of the invention to exhibit a malignant disease outcome.

In other embodiments, patients predicted by the methods and assays of the invention to exhibit a benign disease course, may be treated by various first-line treatments known in the art, e.g. immunomodulatory agents as disclosed herein. In some embodiments, the following exemplary therapies may be used:

Glatiramer acetate (copaxone) contains the acetate salts of synthetic polypeptides, containing four naturally occurring amino 8 acids: L-glutamic acid, L-alanine, L-tyrosine, and L-lysine with an average molar fraction of 0.141, 0.427, 0.095, and 0.338, respectively. The average molecular weight of glatiramer acetate is 5,000-9,000 daltons. The drug is marketed under the tradename COPAXONE as a 1 mL solution with 20 mg of glatiramer acetate for injection. The drug is typically administered by subcutaneous injection at a dose of 20 mg/day.

In another embodiment, the treatment is an interferon beta. For example, Interferon beta-1A (Avonex) is marketed as a 30 micrograms (µg) dosage form for the treatment of MS. The drug is available as a 30 µg lyophilized powder in a single-use vial, as 30 µg per 0.5 mL solution in single-use prefilled syringe, or as a single-use prefilled autoinjector containing 0.5 mL solution with 30 µg drug. The drug is typically administered at a recommended dose of 30 µg once a week by intramuscular injection, wherein the dosing may be titrated, starting with 7.5 µg for first week, to reduce flu-like symptoms, and increased by 7.5 µg each week for next 3 weeks until recommended dose of 30 µg is achieved. Betaferon (also known as Betaseron) is an interferon beta-1b for subcutaneous injection. The recommended dose is 0.25 mg every other day. Rebif is a further form of commercially available interferon beta-la for subcutaneous injection. The recommended dose is either 22 µg or 44 µg injected subcutaneously three times per week. Plegridy is a peginterferon beta-la for subcutaneous injection. Recommended dose is 125 µg every 14 days.

Teriflunomide (Aubagio) is an immunomodulatory pyrimidine synthesis inhibitor of the chemical formula (Z)-2-cyano-alpha, alpha, alpha-trifluoro-3-hydroxy-p-crotonotoluidide. The drug is available as 7 mg and 14 mg film-coated tablets. The drug is typically administered as 7 mg or 14 mg orally once daily.

Tecfidera (dimethyl fumarate) is available as 120 mg and 240 mg delayed-release capsules, for oral use. Tecfidera exerts immunomodulatory effects without significant immune suppression. The drug is typically administered at a starting dose of 120 mg twice a day, orally, for 7 days, followed by a maintenance dose of 240 mg twice a day, orally after 7 days.

In another embodiment the diagnostic methods of the invention further comprise the step of providing a suitable treatment to said subject after said first time point, based on the projected severity at said second time point. In another embodiment the treatment comprises administration of natalizumab, alemtuzumab, ocrelizumab, and/or cladribine if the projected disease severity at said second time point is increased compared to said first time point. In another embodiment the treatment comprises administration of natalizumab, alemtuzumab, ocrelizumab, and/or cladribine if the predicted MS outcome is malignant. In another embodiment the treatment comprises administration of natalizumab, alemtuzumab, ocrelizumab, and/or cladribine if said subject is diagnosed with RRMS at the first time point and is predicted to progress from to SPMS at the second time point. In various embodiments, the use of combinations or equivalents of the specific treatments disclosed herein is contemplated. In other embodiments, the use of additional drugs indicated for the treatment of progressive MS, is contemplated.

In some embodiments, the treatment regime using a suitable selected treatment is adjusted based on the determined prognosis.

Thus, in another embodiment, there is provided a method treating a subject diagnosed as having MS, comprising:
a) obtaining a peripheral blood mononuclear cells (PBMC)-containing sample from a subject afflicted with MS at the first time point,
b) determining the levels of one or more co-inhibitory receptors comprising at least one of TIM-3 and LAG-3, in the sample,
c) comparing the levels determined in b) to their respective levels corresponding to a negative control subject,
d) determining MS prognosis in said subject, whereby a statistically significant difference in the expression levels of said one or more co-inhibitory receptors compared to their respective control levels, is indicative of a malignant MS prognosis in said subject, and lack of a statistically significant difference in the expression levels of said one or more co-inhibitory receptors compared to their respective control levels, is indicative of a benign MS prognosis in said subject,
e) treating the subject with a disease modifying treatment for MS based on the prognosis determined in d),
wherein the treatment comprises administration of natalizumab, alemtuzumab, ocrelizumab, and/or cladribine (or combinations or equivalents thereof, or other drugs indicated for the treatment of progressive forms of MS) if the predicted MS outcome is malignant.

Kits and Systems

In some embodiments, there is provided a kit for determining prognosis of MS disease condition, comprising means for determining the levels of specific biomarkers in blood samples of a subject obtained at a first time point, preferably before treatment, and instructions for using the kit in determining disease outcome (prognosis).

In some embodiments, there is provided a kit for determining prognosis of MS disease condition, comprising means for determining the levels of one or more biomarkers in a blood sample of the subject, the biomarkers are selected from said samples obtained at a first time point, and instructions for using the kit in the determining disease outcome.

According to some embodiments, there is provided a kit for determining disease outcome of MS in a subject afflicted with MS, the kit comprising means for determining the levels of one or more biomarkers selected from TIGIT, CTLA-4, PD-1, TIM-3, LAG-3, CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3 and STAT5A in blood sample of a subject, said sample is obtained at a first time point; and instructions for using the kit in the determining the disease outcome at a second time point, whereby modulation in the expression level of said co-inhibitory receptors compared to a control value is indicative of the disease outcome.

According to some embodiments, there is provided a kit for determining disease outcome of MS in a subject afflicted with MS, the kit comprising means for determining the levels of one or more co-inhibitory receptors selected from TIGIT, CTLA-4, PD-1, TIM-3 and LAG-3, in blood sample of a subject, said sample is obtained at a first time point; and instructions for using the kit in the determining the disease outcome at a second time point, whereby modulation in the expression level of said co-inhibitory receptors compared to a control value is indicative of the disease outcome.

According to some embodiments, there is provided a kit for determining disease outcome of MS in a subject afflicted with MS, the kit comprising means for determining the levels of one or more biomarkers selected from CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3 and STAT5A, in blood sample of a subject, said sample is obtained at a first time point; and instructions for using the kit in the determining the disease outcome at a second time point, whereby modulation in the expression level of said co-inhibitory receptors compared to a control value is indicative of the disease outcome.

In another embodiment, there is provided a kit for evaluating, at a first time point, the projected severity of MS at a second, subsequent time point, the kit comprising means for determining the levels of co-inhibitory receptors selected from TIM-3, LAG-3, TIGIT, CTLA-4, and/or PD-1, in a PBMC-containing sample of a subject, and instructions for using the kit in the evaluation of said projected severity, wherein said kit further comprises means for comparing the determined levels to their respective levels corresponding to a negative control, and optionally means for obtaining the PBMC-containing sample from a subject afflicted with MS.

In some embodiments, the means for comparing the determined levels to their respective levels corresponding to a negative control comprise control samples or values corresponding to the levels of said co-inhibitory receptors in healthy subjects. In various embodiments, the negative control is selected from the group consisting of a sample from at least one healthy individual, a panel of control samples from a set of healthy individuals, and a stored set of data from healthy individuals. Typically, a healthy individual is a subject not afflicted with MS. In some embodiments, the individual is not afflicted with an autoimmune disease. In another embodiment, said individual is afflicted with a non-autoimmune neurological disease. In another embodiment, said kit may comprise further control sample or values, e.g. corresponding to or obtained from subjects afflicted with a known stage, grade or prognosis of MS.

In some embodiments, the means for determining the levels of co-inhibitory receptors in the kit may include specific nucleic acid molecules for identification of mRNA of said co-inhibitory receptors in the samples. In some embodiments, the nucleic acid molecules may include specific primers for identification of the mRNAs in an amplification reaction performed on RNA (or derived cDNA) isolated from the blood sample. In some embodiments, the nucleic acid molecules comprise specific probes for identification of the mRNAs in a sequencing reaction performed on RNA (or cDNA) isolated from the blood sample. In another embodiment the nucleic acid molecules comprise specific primers for identification of the mRNAs in an amplification reaction performed on RNA isolated from the blood sample, and/or specific probes for identification of said mRNAs in a sequencing reaction performed on RNA isolated from the blood sample. According to particular examples, said nucleic acid molecules may be selected from the group consisting of: SEQ ID NOs: 3-4, 5-6, 7-8, 9-10, 11-12, and combinations thereof. In other embodiments, the use of homolog nucleic acid molecules, exhibiting e.g. 90-99% sequence identity, is contemplated.

In another embodiment the kit further comprising means for isolating PBMC and/or RNA from said sample, wherein each possibility represents a separate embodiment of the invention. In another embodiment the kit comprises means for specifically determining the expression levels of TIM-3 and LAG-3 in PBMC in said sample.

According to some embodiments, the biological sample of the patient is taken at a first time point. The first time point can preferably be as close as possible to the first diagnosis of the MS condition. In some embodiments, the first time point may be at 1 day to 1 year after diagnosis (e.g. prognosis). In some embodiments, the closer the first time point to the diagnosis or onset of the MS condition, the better the prediction thus obtained. In some embodiments, the first time point is prior to commencement of treatment.

In some embodiments, the prediction of the disease outcome or prognosis is for a later time point (second time point), which can be any selected time point, such as, in the range of 4 years to 15 years or 5 years to 15 years. For example, the second time point may be 1 year after the first time point. For example, the second time point may be 5 years after the first time point. For example, the second time point may be 10 years after the first time point.

In another embodiment, the means are amenable for use in a method including, but not limited to: amplification reactions (e.g. PCR, RT-PCR, real time PCR, and the like); Gene expression microarrays (e.g. Affymetrix, Agilent, and Illumina microarray platforms); NanoString technology, sequencing, such as, next Generation Sequencing (NGS) using specific adaptors and/or probes; and the like, and combinations thereof.

In some embodiments, the methods and kits of the invention are useful for managing the subject treatment by the clinician or physician subsequent to the determination of disease prognosis. According to some embodiments, based on the determination of the disease prognosis, treatment regime may be adjusted or modulated. Adjustment of treatment regime may include, for example, but not limited to: adjustment of dosage (reducing or increasing dosage), ceasing treatment, replacing or adding a drug, and the like. Thus, for example, the kit may further include a disease modifying treatment and/or instructions for using same in accordance with the diagnostic methods of the invention.

In some embodiments, the instructions may further include comparing the expression levels of the mRNAs in the blood samples of said subject to corresponding expression levels obtained from healthy control subjects. In other embodiments the kit further comprises means for comparing the expression levels of the mRNAs in the blood samples of said subject to corresponding expression levels obtained from healthy control subject.

In another embodiment, the invention relates to a system for determining disease outcome of MS in a subject afflicted with MS, comprising a kit as disclosed herein, and further comprising a processing unit comprising a learning and pattern recognition analyzer, wherein the analyzer compares the collective levels determined in b) to stored data corresponding to a control sample, to thereby compare the prognostic pattern of said subject to a prognostic pattern corresponding to a negative control subject. After analysis is completed, the resulting information can, for example, be displayed on a display, transmitted to a host computer, or stored on a storage device for subsequent retrieval.

In various embodiments, the pattern recognition analyzer comprises at least one algorithm selected from the group consisting of artificial neural network algorithms, principal component analysis (PCA), multi-layer perception (MLP), generalized regression neural network (GRNN), fuzzy inference systems (FIS), self-organizing map (SOM), radial bias function (RBF), genetic algorithms (GAS), neuro-fuzzy systems (NFS), adaptive resonance theory (ART), partial least squares (PLS), multiple linear regression (MLR), principal component regression (PCR), discriminant function analysis (DFA), linear discriminant analysis (LDA), cluster analysis, and nearest neighbor, wherein each possibility represents a separate embodiment of the invention.

In some embodiments, principal component analysis is used. Principal component analysis (PCA) involves a mathematical technique that transforms a number of correlated variables into a smaller number of uncorrelated variables. The smaller number of uncorrelated variables is known as principal components. The first principal component or eigenvector accounts for as much of the variability in the data as possible, and each succeeding component accounts for as much of the remaining variability as possible. The main objective of PCA is to reduce the dimensionality of the data set and to identify new underlying variables.

Principal component analysis compares the structure of two or more covariance matrices in a hierarchical fashion. For instance, one matrix might be identical to another except that each element of the matrix is multiplied by a single constant. The matrices are thus proportional to one another. More particularly, the matrices share identical eigenvectors (or principal components), but their eigenvalues differ by a constant. Another relationship between matrices is that they share principal components in common, but their eigenvalues differ. The mathematical technique used in principal component analysis is called eigenanalysis. The eigenvector associated with the largest eigenvalue has the same direction as the first principal component. The eigenvector associated with the second largest eigenvalue determines the direction of the second principal component. The sum of the eigenvalues equals the trace of the square matrix and the maximum number of eigenvectors equals the number of rows of this matrix.

In another embodiment, the processing unit (also referred to as a processor) is operatively connected to a memory, wherein the processor when executing is configured to determine disease outcome of MS in a subject afflicted with MS as disclosed herein. In some embodiments, said processor is configured to acquire the levels of one or more biomarkers of the invention (e.g. co-inhibitory receptors comprising at least one of TIM-3 and LAG-3), and compare the acquired levels to their respective levels corresponding to control values stored in the memory.

ADDITIONAL EMBODIMENTS

In some embodiments, one or more biomarkers, or a set of biomarkers having reduced expression in the blood of MS patients compared to a control at a first (early) time point is indicative of an expected severe MS condition outcome at a later time point. In some embodiments, a set of biomarkers having increased expression in the blood of MS patients compared to a control at a first (early) time point is indicative of an expected severe MS condition outcome at a later time point. In some embodiments, the biomarkers are obtained from blood samples. In some embodiments, the blood sample may include peripheral blood (whole) and/or peripheral blood mononuclear cells (PBMCs). In some embodiments, the biomarkers may be selected from, but not limited to: CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3, STAT5A, TIGIT, TIM-3, LAG-3, PD-1, CTLA4, or combinations thereof. Each possibility is a separate embodiment. In some embodiments, the biomarkers obtained from whole peripheral blood may be selected from, but not limited to: CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3, STAT5A, or any combination thereof. Each possibility is a separate embodiment.

In some embodiments, the biomarkers obtained from whole peripheral blood may be selected from, but not limited to: IRF1, XBP1, TFRC or combinations thereof. Each possibility is a separate embodiment. In some embodiments, the biomarkers obtained from whole peripheral blood may be selected from, but not limited to: IL32, sCTLA4, IRF1, XBP1, TFRC or combinations thereof. Each possibility is a separate embodiment. In some embodiments, the biomarkers obtained from peripheral mononuclear cells (PBMCs) may be selected from, but not limited to: TIM-3, LAG-3, TIGIT, PD-1, CTLA4, or combinations thereof. Each possibility is a separate embodiment. In some embodiments, the biomarkers are co-inhibitory receptors. In some embodiments, the co-inhibitory receptors may be selected from: TIM-3, LAG-3, TIGIT, PD-1 and CTLA-4. In some embodiments, the biomarkers are co-inhibitory receptors, selected from: TIM-3, LAG-3 and TIGIT, or combinations thereof. Each possibility is a separate embodiment. In some embodiments, as further exemplified herein, patients with MS had significantly lower TIGIT levels than healthy controls (HC). In some embodiments, as further exemplified hereinbelow, is patients with MS, TIM-3 and LAG-3 expression levels correlated significantly with MS outcome measures, and decreased PBMC levels of TIM-3 and LAG-3 correlated with accelerated disease progression.

According to some embodiments, there is thus provided a method of determining disease outcome of MS in a subject afflicted with MS, the method including determining at a first time point the blood levels of co-inhibitory receptors, whereby a modulation in the expression level of said co-inhibitory receptors compared to a control value, is indicative of the severity of MS at a second time point, wherein the second time point is at least six months after the first time point. In some embodiments, the first time point is a time point in which the subject is diagnosed with MS. In some embodiments, the subject is not treated at the first time point. In some embodiments, the second time point is at least 1 year after the first time point. In some embodiments, the second time point is at least 5 years after the first time point. In some embodiments, the second time point is at least 10 years after the first time point. In some embodiments, the co-inhibitory receptors are selected from: TIM-3, LAG-3, TIGIT, CTLA-4, PD-1, and combinations thereof. In some embodiments, the co-inhibitory receptor is TIM-3 and reduced levels thereof compared to a control value are indicative of increased disease severity at the second time point. In some embodiments, the co-inhibitory receptor is LAG-3 and reduced levels thereof compared to a control value are indicative of increased disease severity at the second time point. In some embodiments, the co-inhibitory receptors are TIM-3 and LAG-3 and reduced levels thereof compared to a control value are indicative of increased disease severity at the second time point. In some embodiments, the severity of MS is determined based on EDSS score. In some embodiments, the method may further include determining if the MS condition outcome is malignant or benign. In some embodiments, benign MS condition is determined if the EDSS score is lower than 1.5 after 10 years from the first time point. In some embodiments, a malignant MS condition is determined if the EDSS score is higher than 6 after five years from the first time point. In some embodiments, the method may further include a step of providing a suitable treatment to said subject, based on expected prognosis of the MS condition at the second time point, wherein the treatment is initiated after the first time point. In some embodiments, the treatment may include administration of Tysabri, Lemtrada, Ocrelizumab, Cladribine or any of a suitable FDA approved MS medications, if the expected prognosis of the subject is malignant MS. In some embodiments, the control value is obtained from a healthy subject, not afflicted with MS. In some embodiments, the blood sample comprises PBMC.

According to some embodiments, there is provided a method of determining disease outcome of MS in a subject afflicted with MS, the method comprising determining at a first time point the blood levels of biomarkers, selected from one or more of: CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3, STAT5A, whereby a modulation in the expression level of said biomarkers compared to a control value, is indicative of the severity of MS at a second time point, wherein the second time point is at least six months after the first time point. In some embodiments, the biomarkers are selected from: IL32, sCTLA4, IRF1, XBP1 and TFRC. In one embodiment, the biomarkers are selected from IRF1, IL32, TFRC, XBP1 and sCTLA4. In another embodiment the first time point is a time point in which the subject is diagnosed with MS. In another embodiment the subject is not treated at the first time point. In another embodiment the second time point is at least 1 year after the first time point. In another embodiment the second time point is at least 5 years after the first time point. In another embodiment the second time point is at least 10 years after the first time point. In another embodiment the severity of MS is determined based on EDSS score. In another embodiment, the method further comprises determining if the MS condition outcome is malignant or benign. In another embodiment a benign MS condition is determined if the EDSS score is lower than 1.5 after 10 years from the first time point. In another embodiment a malignant MS condition is determined if the EDSS score is higher than 6 after five years from the first time point. In another embodiment, the method further comprises a step of providing a suitable treatment to said subject, based on expected prognosis of the MS condition at the second time point, wherein the treatment is initiated after the first time point. In another embodiment the treatment comprises administration of Tysabri (natalizumab), Lemtrada, Ocrelizumab, Cladribine in patients with predicted sever prognosis. In another embodiment the control value is obtained from a healthy subject, not afflicted with MS.

According to some embodiments, there is provided a kit for determining disease outcome of MS in a subject afflicted with MS, the kit comprising means for determining the levels of co-inhibitory receptors selected from TIGIT, CTLA-4, PD-1, TIM-3 and LAG-3, in blood sample of a subject, said sample is obtained at a first time point; and instructions for using the kit in the determining the disease outcome at a second time point, whereby modulation in the expression level of said co-inhibitory receptors compared to a control value is indicative of the disease outcome. In some embodiments, the means in the kit may include specific nucleic acid molecules for identification of mRNA of said co-inhibitory receptors in the samples. In some embodiments, the nucleic acid molecules may include specific primers for identification of the mRNAs in an amplification reaction performed on RNA or DNA isolated from the blood sample. In some embodiments, the nucleic acid molecules comprise specific probes for identification of the mRNAs in a sequencing reaction performed on RNA or DNA isolated from the blood sample. In some embodiments, the instructions may further include comparing the expression levels of the mRNAs in the blood samples of said subject to corresponding expression levels obtained from healthy control subjects.

According to some embodiments, there is provided a method of determining disease outcome of MS in a subject afflicted with MS, the method including determining at a first time point the blood levels of biomarkers, whereby a modulation in the expression level of said co-inhibitory receptors compared to a control value, is indicative of the severity of MS at a second time point, wherein the second time point is at least six months after the first time point. In some embodiments, the biomarkers may be selected from: TIGIT, CTLA-4, PD-1, TIM-3, LAG-3, IRF1, CSF1R, PTAFR, PSMB10, TAP2, RAF1, NFKB1, IFIT2, MAPKAPK2, NT5E, CTNNB1, BST2, ICAM2, XBP1, NFKBIA, NFKB2, TFRC, STAT2, IL32, IRF7, TNFAIP3, STAT5A, or any combination thereof. Each possibility is a separate embodiment. In some exemplary embodiments, the biomarkers may be selected from: TIGIT, CTLA-4, PD-1, TIM-3, LAG-3, IRF1, or any combination thereof. Each possibility is a separate embodiment.

The terms "comprises", "comprising", "includes", "including", "having" and their conjugates mean "including but not limited to". The terms "comprises" and "comprising" are limited in some embodiments to "consists" and "consisting", respectively. The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein the term "about" in reference to a numerical value stated herein is to be understood as the stated value +/−10%.

As used herein, the singular form "a", "an" and "the" include plural references unless the context clearly dictates otherwise. For example, the term "a compound" or "at least one compound" may include a plurality of compounds, including mixtures thereof.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

The following examples are presented in order to more fully illustrate certain embodiments of the invention. They should in no way, however, be construed as limiting the broad scope of the invention. One skilled in the art can readily devise many variations and modifications of the principles disclosed herein without departing from the scope of the invention.

Examples

Materials and Methods

Subjects. Patients: MS patients who had been diagnosed with new-onset of MS and followed for at least 9 years were included. Their blood samples were collected and they were followed since diagnosis at the Hadassah MS Center and Department of Neurology at least twice annually. Of 141 patients, 57 (40%; 41 women, 16 men; average age, 36.6±10.8 years) were eligible for analysis. The inclusion criteria were: untreated MS, diagnosis of not more than 2 years, and clinical data set accessibility throughout the follow-up period (brain magnetic resonance imaging (MRI) at diagnosis, ≥6 visits with Expanded Disability Status Scale (EDSS), including 10-year visit post-diagnosis. A control group included 12 healthy individuals was used as a reference (6 women, 6 men; average age, 29.4±11.8 years).

Clinically meaningful events and paraclinical data EDSS score at final visit 9-10 years after biological sample collection, number of relapses, number of disease modifying drugs, oligoclonal bands (OCBs), were obtained. During the initial diagnosis procedure, the cerebrospinal fluid (CSF) was analyzed for the presence of OCBs via agarose gel isoelectric focusing. Of the patients, 72% had positive OCBs. Baseline MRI was carried out after a mean period of 4.7±4.3 months from onset (range, 0-12), and the patients' baseline brain MRI T2 mean lesion volume (T2LV) at the initial study visit was 20.6 cm$^3$. Diagnoses were made in accordance to 2011 diagnostic criteria.

Blood samples drawn and frozen at the first time point (9-11 years ago), from 57 patients with newly diagnosed MS were diagnosed: 22 were diagnosed with benign disease (defined by EDSS score ≤1.5, 10 years following MS diagnosis, low disability index) and 17 were diagnosed with a malignant outcome (defined by EDSS score of at least 6 in <5 years from diagnosis (Gholipour et al, 2011), high disability index). The rest of the cohort comprised 18 patients (medium disability index, standard MS). All patients in our cohort were diagnosed at first visit with relapsing remitting disease (RRMS). At the final visit, 37 patients still had RRMS, and 20 patients were diagnosed with SPMS.

Collection of Peripheral Blood. Peripheral blood samples were obtained from the patients and healthy controls (HCs). Peripheral blood mononuclear cells (PBMCs) were isolated from freshly drawn heparinized whole blood by Ficoll-Paque (Amersham Pharmacia Biotech, Uppsala, Sweden) gradient centrifugation according to the manufacturer's protocol. The PBMCs were stored in TRI Reagent® (Sigma-Aldrich, Rehovot, Israel) at −80° C.

Gene Expression Analysis. Total RNA was extracted from the PBMCs using TRI Reagent® (Sigma-Aldrich) according to the manufacturer's instructions. Briefly, 5×10$^6$ cells were lysed in 1 ml TRI Reagent. TRI Reagent solution solubilizes biological material and denatures protein. After solubilization, chloroform was added for phase separation. Protein was extracted to the organic phase, DNA resolved at the interface, and RNA remaining in the aqueous phase was collected.

Real-time Reverse Transcription PCR. Complementary DNA (cDNA) was produced from 250 ng total RNA using a qScript cDNA synthesis kit (Quanta Biosciences, Gaithersburg, MD, USA) according to the manufacturer's instructions. Real-time PCR amplification and relative quantification of the co-inhibitory receptors were analyzed with a StepOne Real Time PCR System (Thermo Fisher Scientific, Waltham, MA, USA). The 10 µl reaction mix included 1 µl cDNA, 300 nmol/l of each primer (below, Syntezza Bioscience, Jerusalem, Israel), and 5 µl PerfeCTa SYBR Green FastMix, ROX (Quanta Biosciences). The fold changes (FCs) of the target mRNAs were normalized to HPRT (hypoxanthine phosphoribosyltransferase 1). Then, the FCs of each mRNA were calculated based on the ratio between the patient groups and HCs as indicated. The experiment was repeated three times in triplicate; the threshold cycle value (2-ACT) was used for statistical analysis and the results are presented as FC. The following primers were used:

```
HPRT:
forward (F),
                              (SEQ ID NO: 1)
5'-TCCTCCTCAGACCGCTTTT-3';

reverse (R),
                              (SEQ ID NO: 2)
5-CCTGGTTCATCATCGCTAATC-3'

LAG-3:
F,
                              (SEQ ID NO: 3)
5'-TCACATTGGCAATCATCACAGTG-3';

R,
                              (SEQ ID NO: 4)
5'-CGTTCTTGTCCAGATACTGGAGT-3'

TIM-3:
F,
                              (SEQ ID NO: 5)
5'-CTGCTGCTGCTACTACTTACAAGG-3'

R,
                              (SEQ ID NO: 6))
5'-AGACGGGCACGAGGTTCC-3'

TIGIT
F,
                              (SEQ ID NO: 7)
5'-GGAGGTCCTAGAAAGCTCAGTG-3';

R,
                              (SEQ ID NO: 8)
5'-CGATGACTGCTGTGCAGATGA-3'

CTLA4:
F,
                              (SEQ ID NO: 9)
5'-CATCCCTGTCTTCTGCAAAGCAA-3';

R,
                              (SEQ ID NO: 10)
5'-CAGTGGCTTTGCCTGGAGAT-3'

PD-1 (PDCD1):
F,
```

-continued

```
                                       (SEQ ID NO: 11)
5-CGGCCAGGATGGT TCTTAGAC-3';

R,
                                       (SEQ ID NO: 12)
5'-GAGAAGCTGCAGGTGAAGGT-3'.
```

MRI Lesion Volume Analysis. Lesion volume was analyzed using the open source mrVista package (http://vistalab.standford.edu/software). For each patient, white matter lesions were manually segmented on fluid-attenuated inversion recovery (FLAIR)-weighted images and their volume was extracted (Backner et al., 2018).

Statistical, Heat map and PCA analysis. The data was analyzed using Student's t-test, one-way analysis of variance, and Spearman's correlation. P<0.05 was considered statistically significant. To reveal potential unsupervised clustering of the gene expression data, image analysis algorithms principle component analysis (PCA) and heat map analysis using ClustVis software were performed as demonstrated by Metsalu T et. al. Briefly, Principal components were calculated using one of the methods in pcaMethods R package. The default method is Singular Value Decomposition (SVD). Heatmap was plotted using pheatmap R package (version 0.7.7).

Example 1—Co-Inhibitory Receptor Levels in HCs and MS Patients

The expression levels (mRNA levels) of co-inhibitory receptors were tested in MS patients and in healthy controls. As shown in FIG. 1A, MS patients had significantly decreased TIGIT expression levels (0.51 Fold change (FC)) as compared to control HCs (1 FC) (P<0.0003). In a separate analysis, statistically significant reduction in both TIGIT and LAG-3 expression levels was revealed, as MS patients had significantly decreased TIGIT and LAG-3 expression levels (0.68 and 0.65 FC) as compared to the HCs (1 FC) (P<0.02 and P<0.04). The TIM-3, PD-1, and CTLA-4 levels between the MS patients and HCs were not statistically significantly different.

Figure 1B:
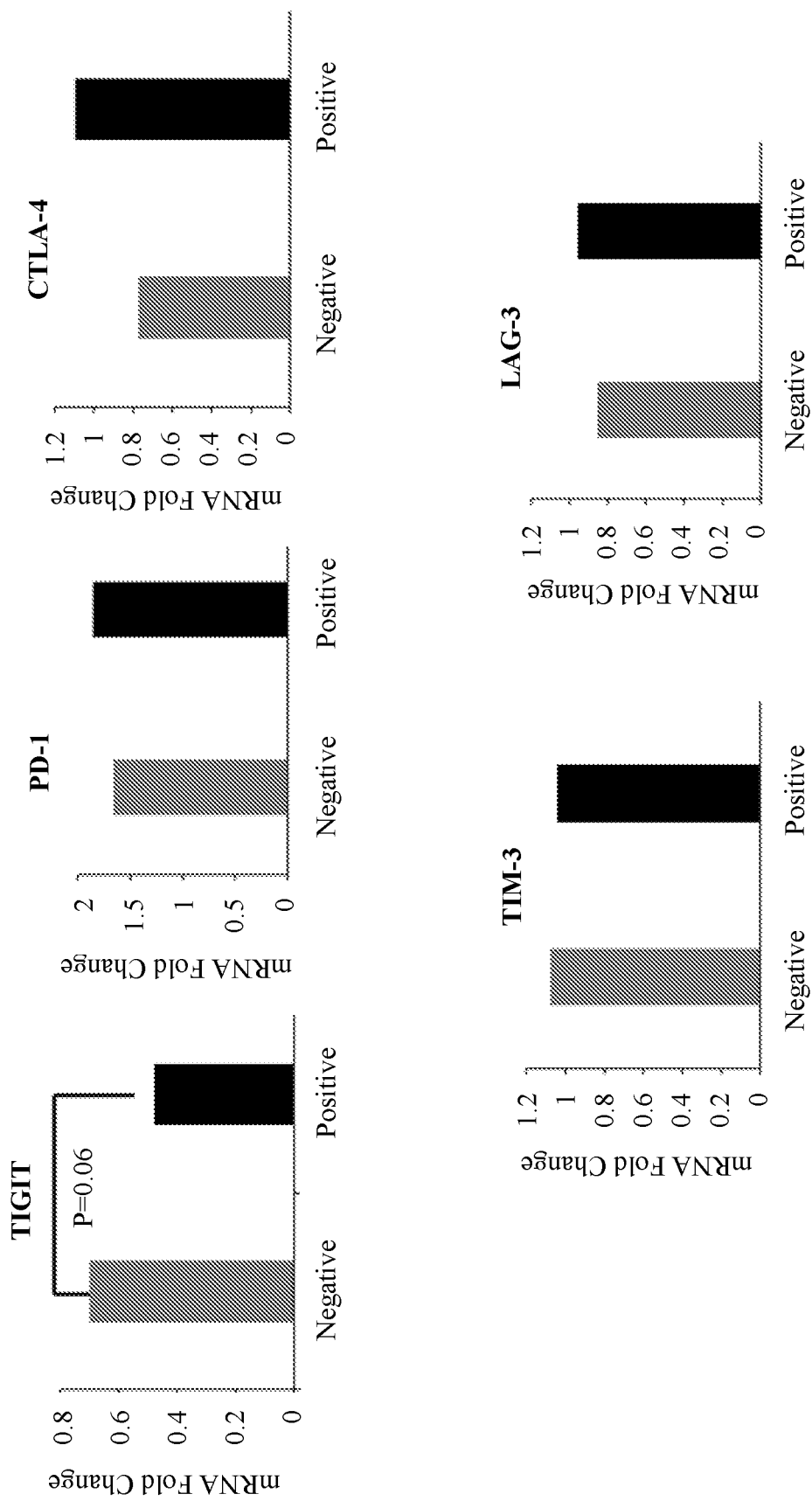

As shown in FIG. 1B, when the MS patients were grouped according to OCB status, there was a trend toward decreased TIGIT expression in OCB-positive patients (0.48 FC) compared to OCB-negative patients (0.70 FC) (P=0.06, FIG. 1B).

Figure 1C:
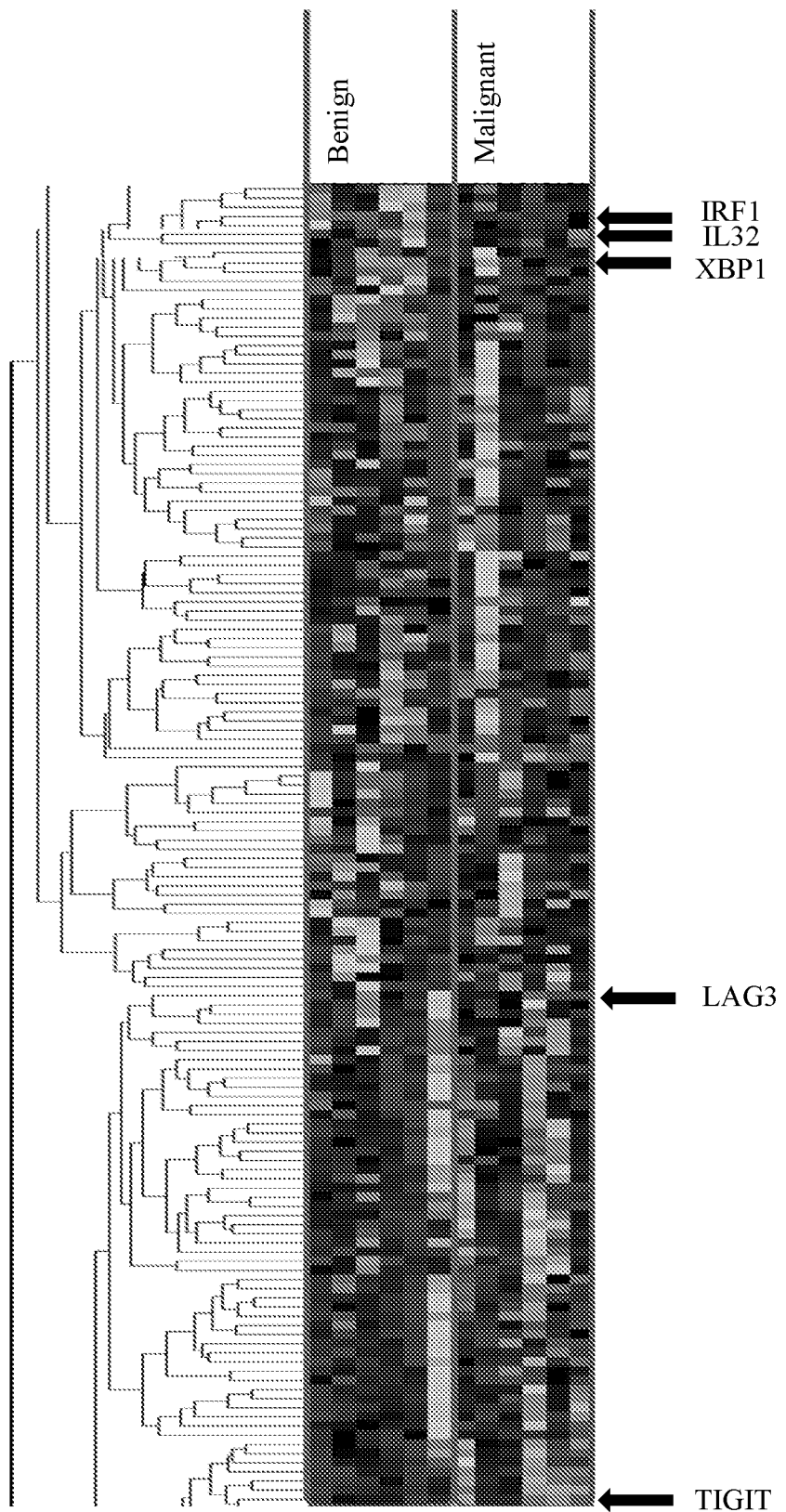
FIG. 1C. Heatmap analysis of various gene expression in PBMC of MS patients. The darker the shades (originally red), the higher the expression. Arrows indicate candidate markers identified.

FIG. 1C shows a heatmap analysis of various gene expression in PBMC of MS patients. The darker the shades (originally red), the higher the expression. In this analysis, the genes IL32, IRF1, XBP, LAG3 and TIGIT are identified (marked by arrows) as markers. Each column represent a subject. T-test analysis identified genes TIGIT, sCTLA4 and IRF-1 as statistically significant markers between the groups (benign and malignant (P=0.01, P=0.06 and P=0.03, respectively).

Example 2—LAG-3 and TIM-3 Levels Predicted Disease Course

Figure 2A:
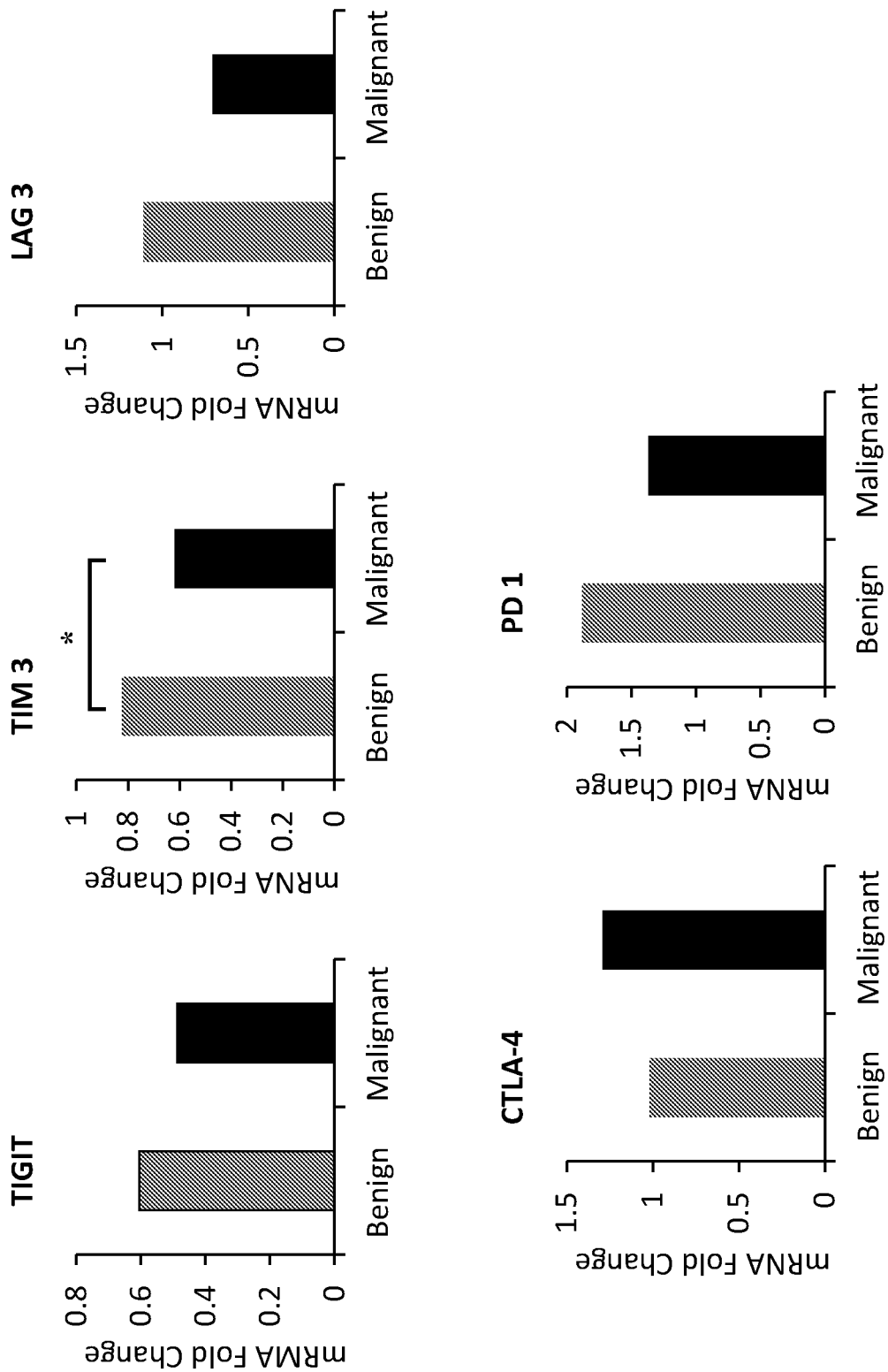
FIGS. 2A-D. Graphs showing that LAG-3 and TIM-3 levels predict MS disease course. Fold change (FC) of expression of TIGIT, TIM-3, LAG-3, CTLA4, and PD-1 mRNA in PBMC are shown at the top left, top middle, top right, bottom left, and bottom right panels of each figure, respectively.
Figure 2B:
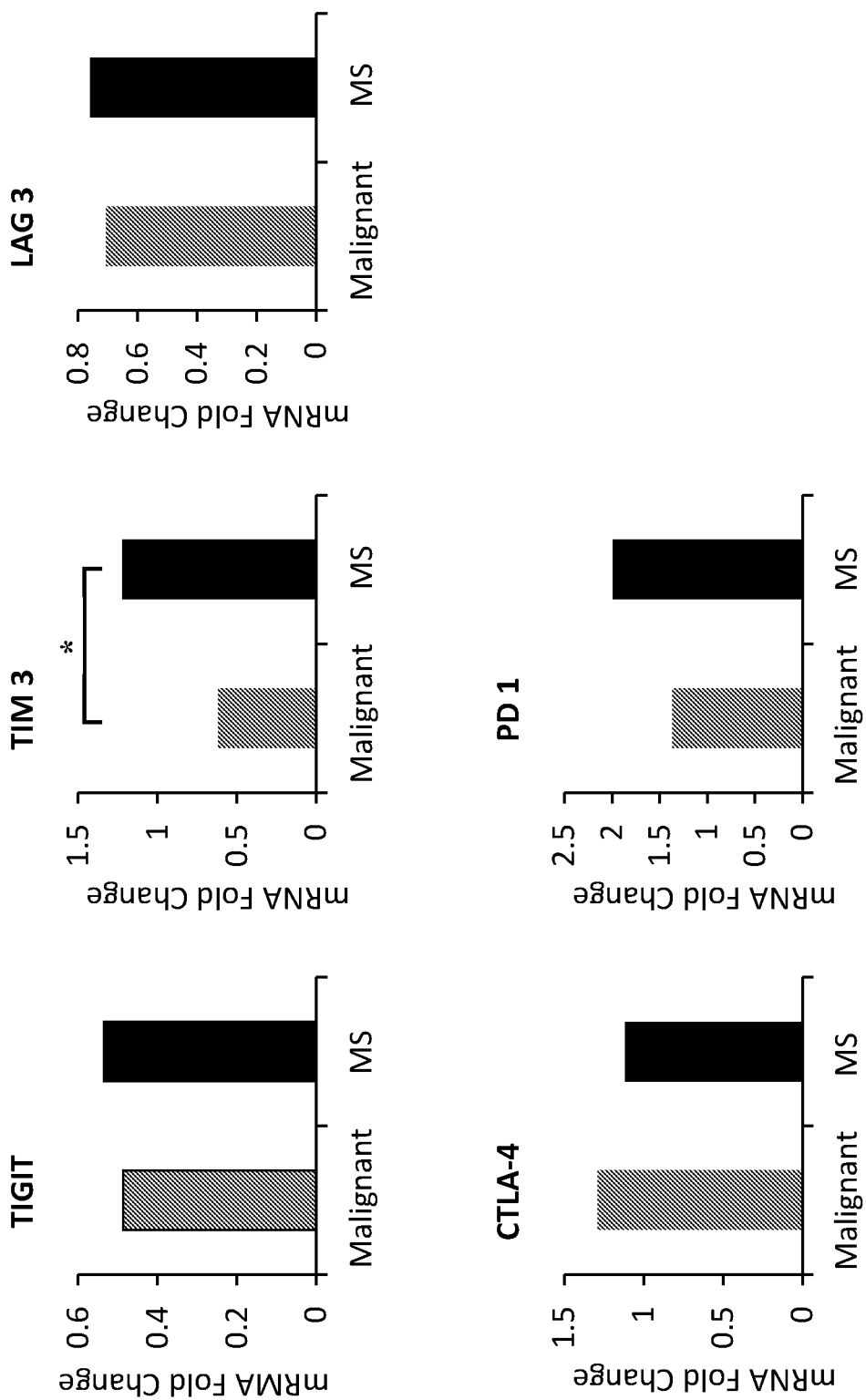
Figure 2C:
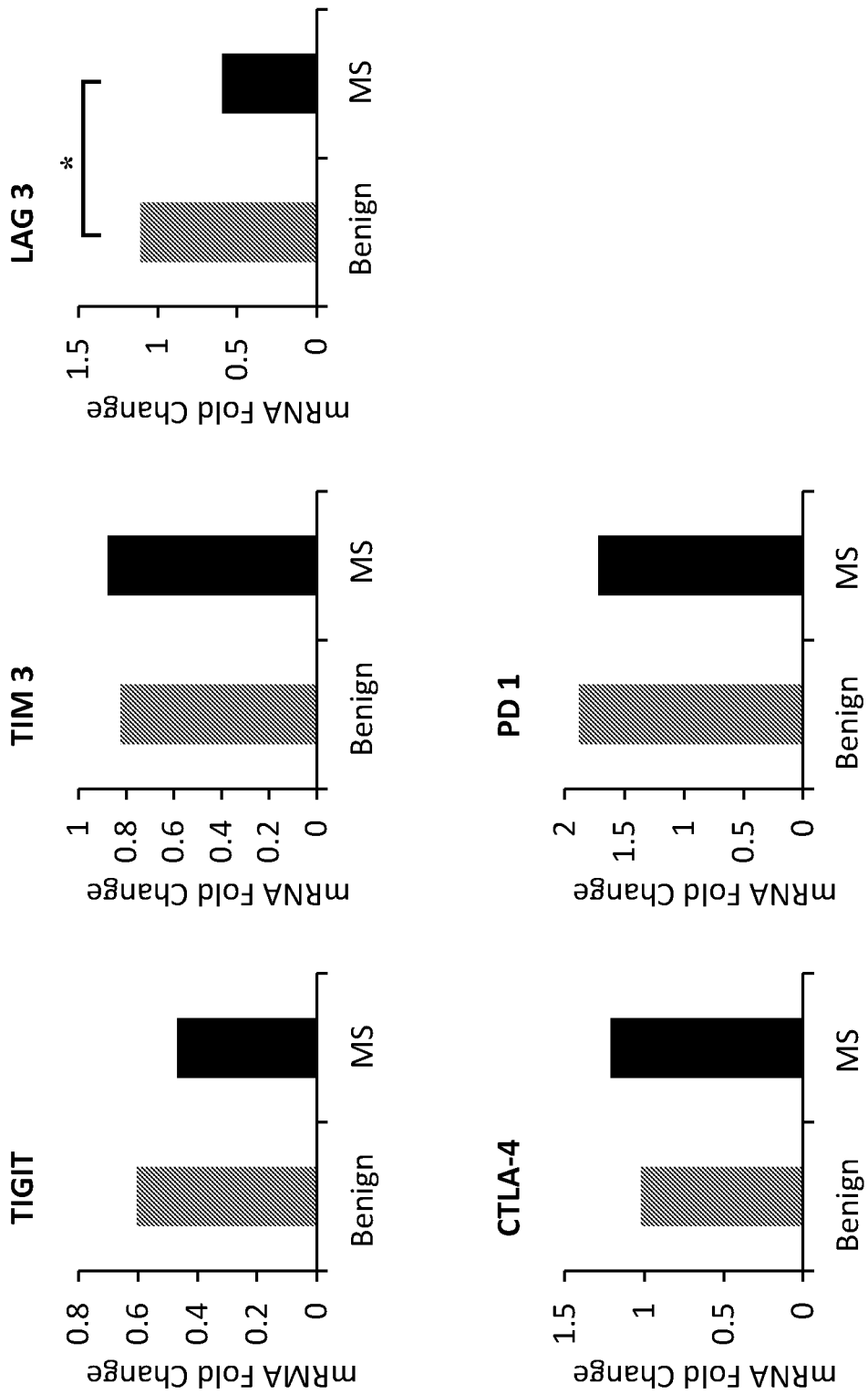

Next, it was tested whether co-inhibitory receptor expression levels in MS patient PBMCs that were measured approximately at around the time of diagnosis can predict the disease outcome. The relative expression (Fold change, FC) of TIGIT, PD-1, CTLA4, LAG-3, and TIM-3 in the worst MS outcome (malignant disease) was compared to that of benign MS. As shown in FIG. 2A, patients with malignant MS had significantly lower TIM-3 levels and a trend for lower LAG-3 levels compared to patients with benign MS (malignant vs. benign MS: TIM-3: 0.61 FC vs. 0.82 FC, P<0.02; LAG-3: 0.7 FC vs. 1.1 FC, P<0.07). As shown in FIG. 2B, patients with malignant MS had significantly lower levels of TIM-3 compared to patients with all other forms of MS (malignant vs. all other MS: 0.61 FC vs. 1.15 FC, P<0.02). Moreover, as shown in FIG. 2C, LAG-3 levels were significantly higher in benign MS versus the other forms of MS (benign vs. all other MS forms: 1.1 FC vs. 0.77 FC, P<0.05).

Figure 2D:
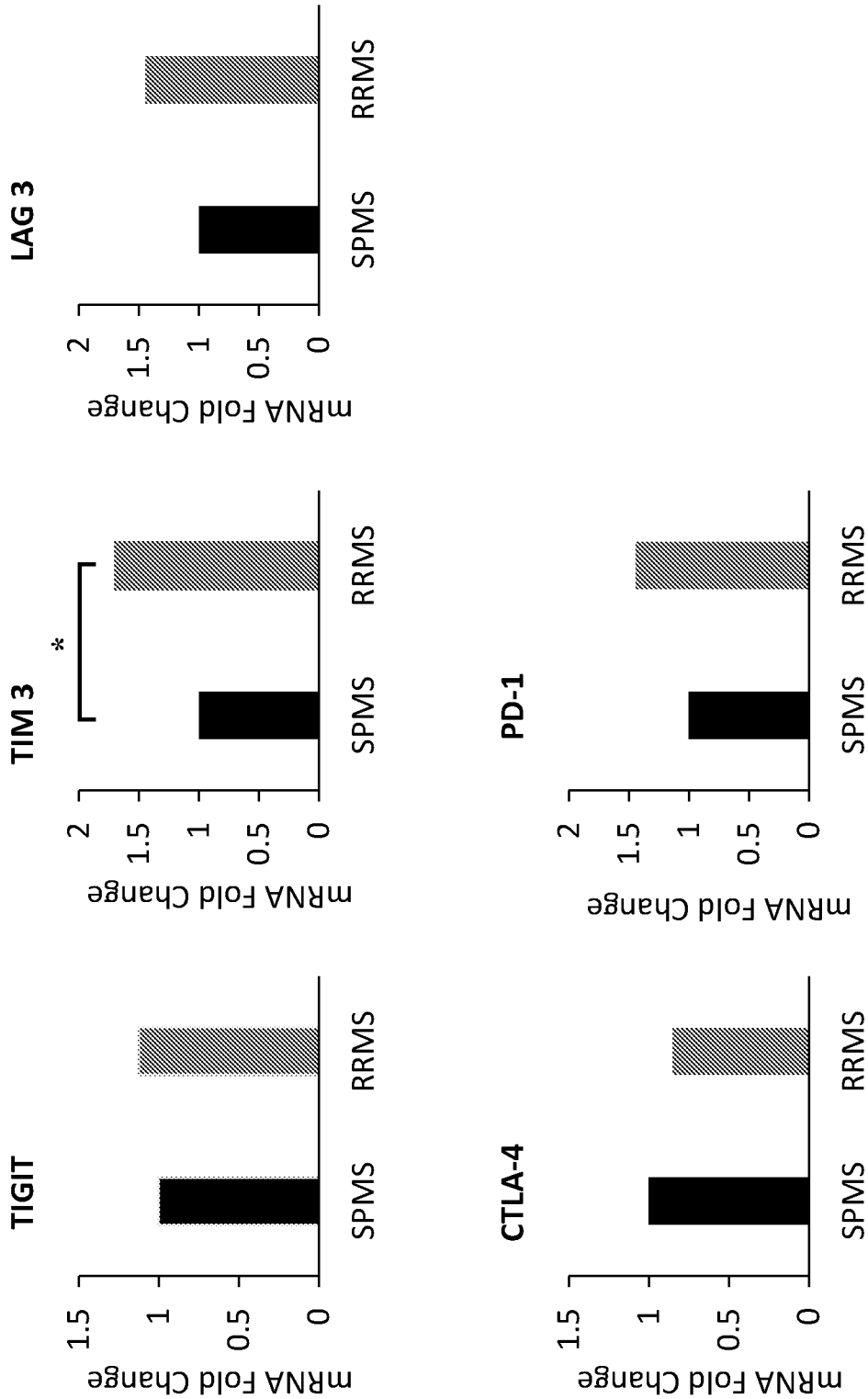
Figure 2E:
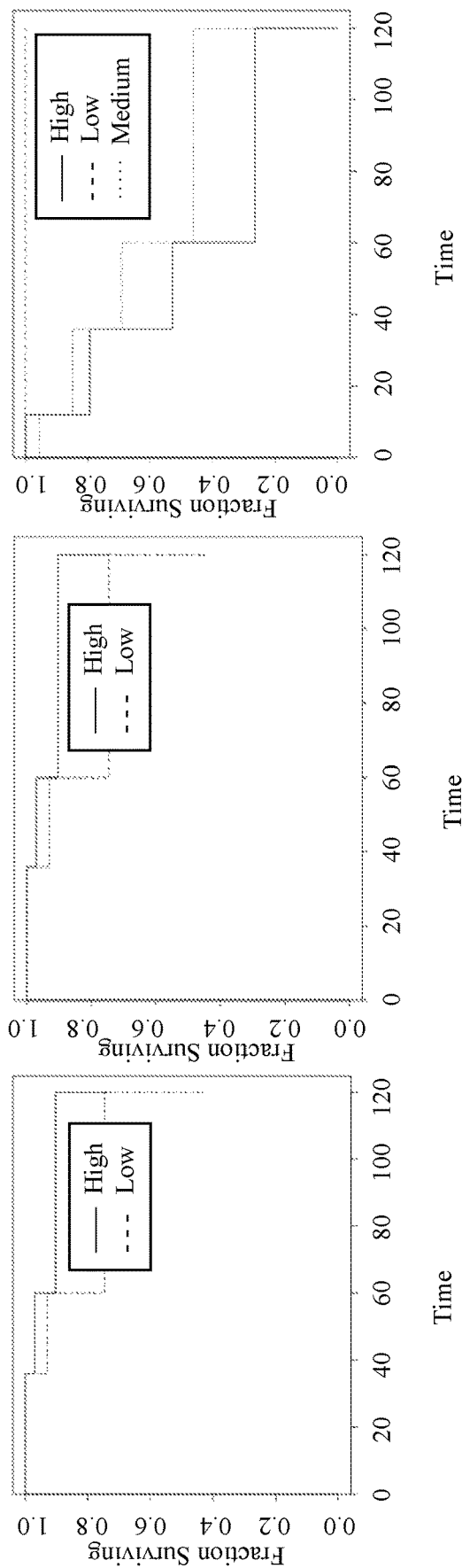
FIG. 2E—Kaplan-Meier curves showing time to reach a specific EDSS score. Patients with low expression levels of TIM-3 or LAG-3, indicated by dashed lines in the left and middle panels, respectively, were compared with patients with high TIM-3 and LAG-3 levels (bolded lines in the left and middle panels, respectively) (P<0.005); Right panel shows—Kaplan-Meier curves of the three groups in the study: benign patients with low disability index ("Low", dashed line), patients with medium disability index ("Medium", dotted line), and malignant patients with high disability index ("High", bolded line).

All patients in the cohort were diagnosed at the first study visit with RRMS. It was investigated whether the expression levels of co-inhibitory receptors measured around the time of diagnosis could differentiate between patients who, after 10 years, remained in the relapsing remitting stage (RRMS, n=37) and those who progressed to the secondary progressive stage (SPMS, n=20). It was surprisingly found that patients with SPMS at the final visit had significantly lower levels of TIM-3 and a trend toward lower LAG-3 levels compared to patients who remained in the relapsing stage (SPMS vs. RRMS: 1 FC vs. 1.7 FC, P<0.02, 1 FC vs. 1.45 FC, P<0.06 TIM-3 and LAG-3, respectively, FIG. 2D). The Kaplan-Meier method was used to study the distributions of time to reach an EDSS score of 6, stratified by high (higher than average) expression levels of TIM-3 and LAG-3 as compared to low expression levels. Patients with lower, as opposed to higher, TIM-3 or LAG-3 expression reached an EDSS score of 6 significantly earlier (both, P<0.005) (FIG. 2E).

Example 3—Co-Inhibitory Receptors and Clinical and Paraclinical Variables

Next, it was tested whether the co-inhibitory receptor expression levels are associated with clinical disease progression measurements [1- and 10-year progression index, EDSS score at final visit, number of disease-modifying therapy (DMT) switches during the 10-year follow-up, number of relapses, baseline brain MRI T2 lesion volume (T2LV)] The results are presented in FIGS. 3A-J and FIGS. 4A-P.

Figure 3A:
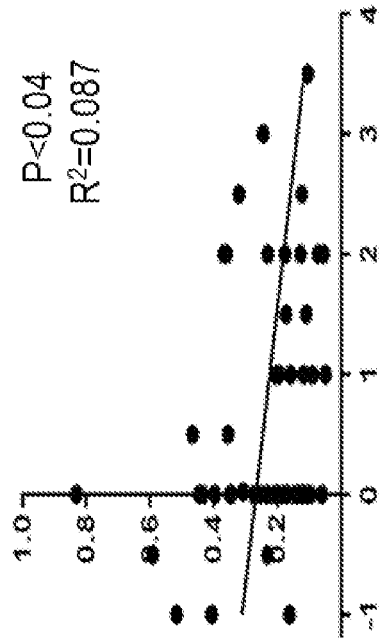
FIGS. 3A-J. Graphs showing correlation analyses of co-inhibitory receptors TIM-3 and LAG-3 expression levels, with clinical and para-clinical variables.
Figure 3B:
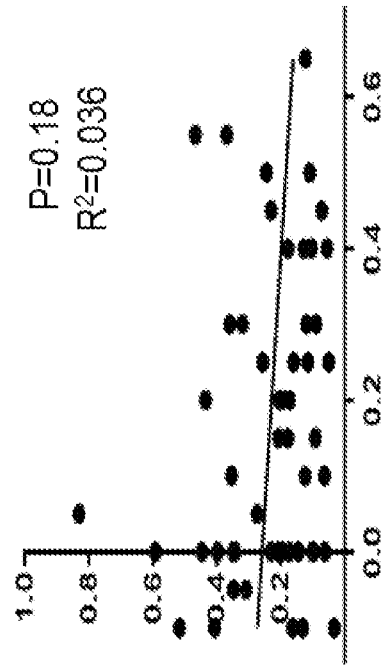
Figure 3C:
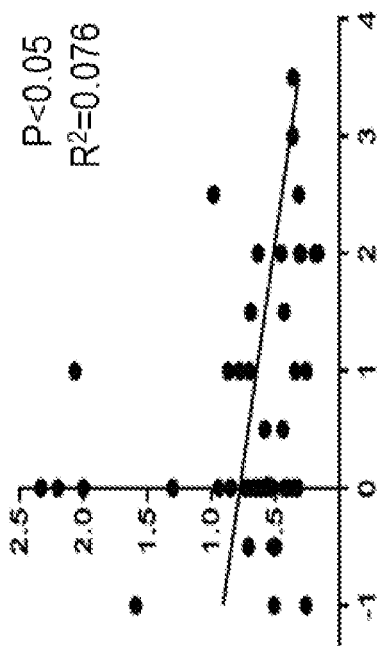
Figure 3D:
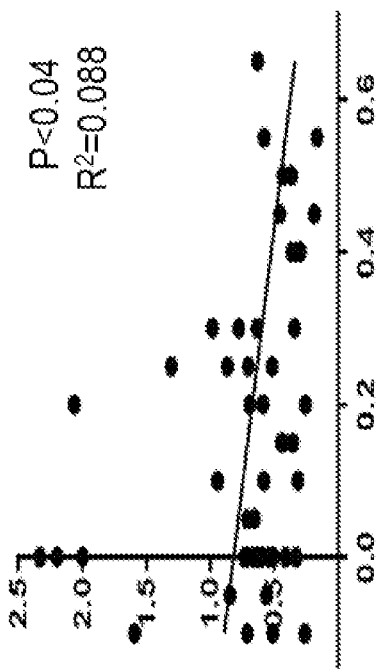
Figure 3E:
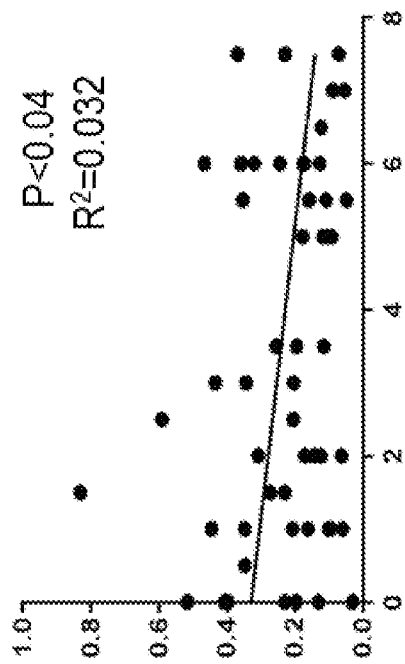
Figure 3F:
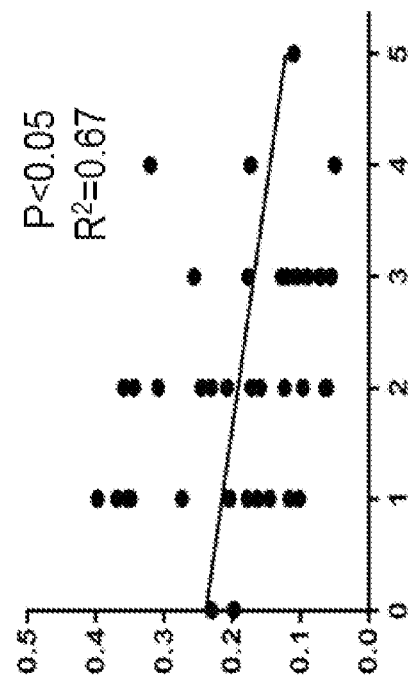
Figure 3G:
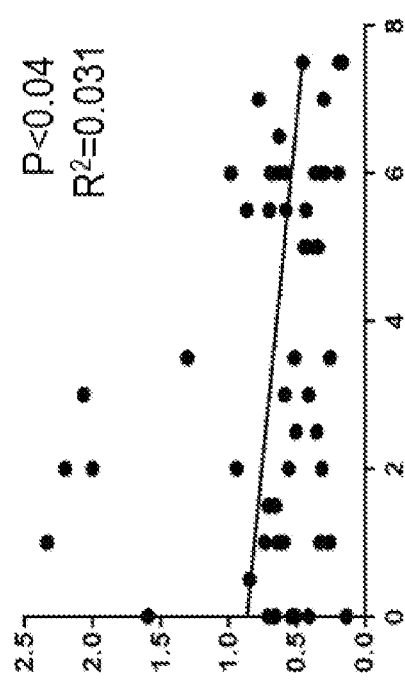

As shown in FIGS. 3A-C, the 1-year progression indexes correlated significantly with TIM-3 ($r^2$=0.076, P<0.05) and LAG-3 ($r^2$=0.087, P<0.04) expression levels; the 10-year progression indexes correlated significantly with TIM-3 expression levels ($r^2$=0.088, P<0.04). As shown in FIGS. 3E-F, TIM-3 and LAG-3 expression levels and EDSS score at final visit were also significantly correlated ($r^2$=0.31, 0.32; both, P<0.04).

Figure 3H:
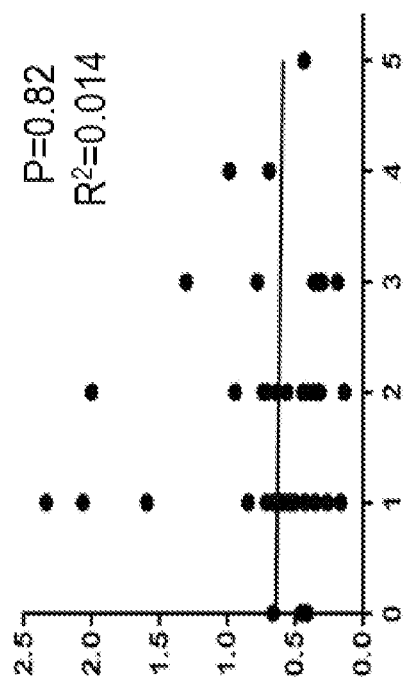
Figure 3J:
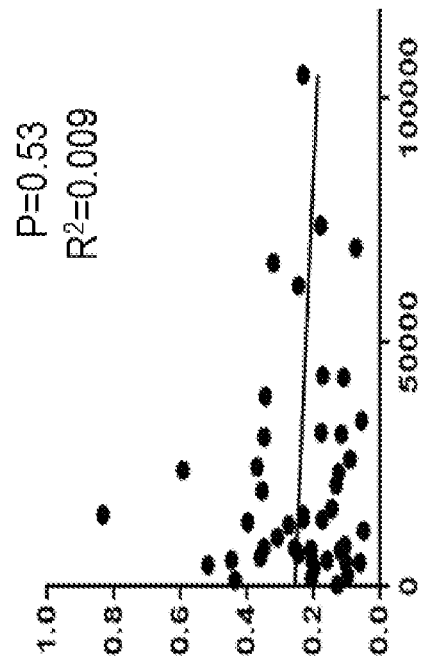
Figure 3I:
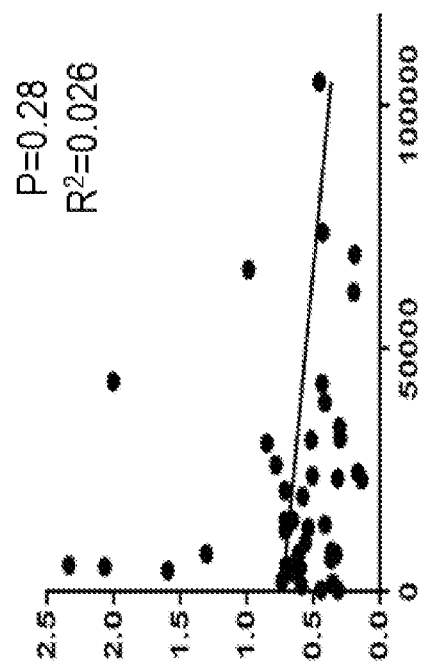
Figure 4A:
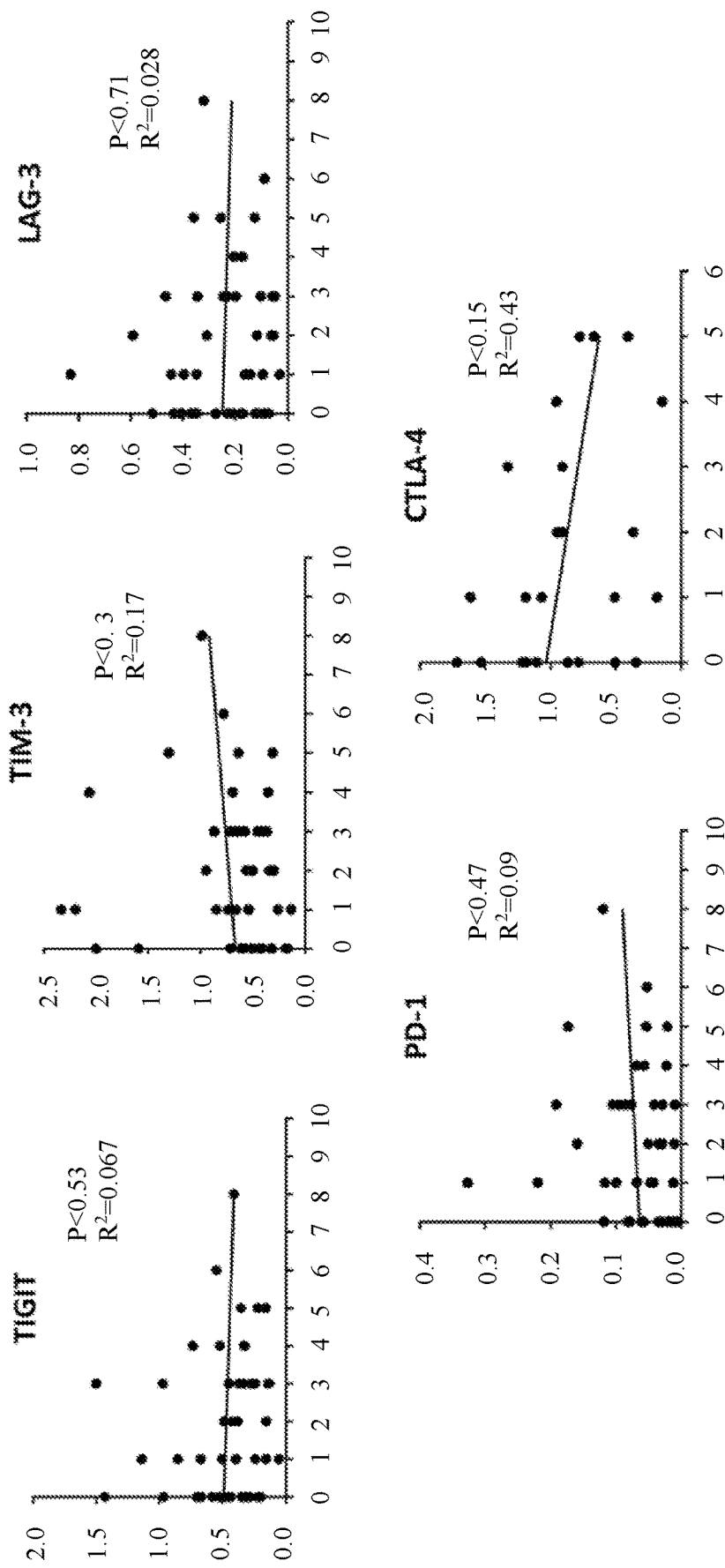
Figures 4N, 4O, 4P:
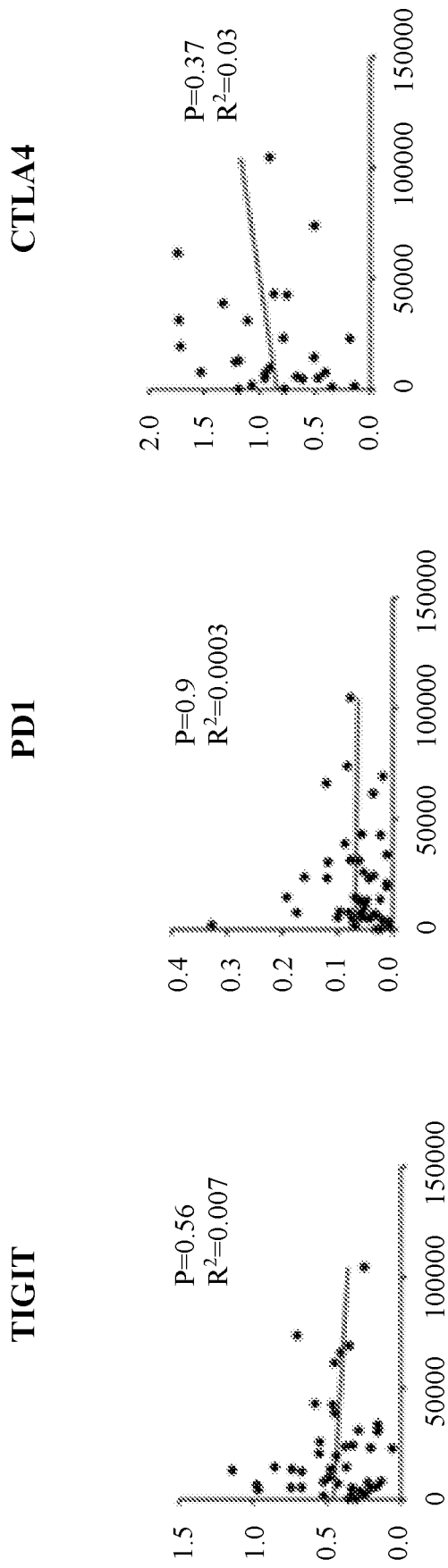

The cohort included newly diagnosed patients who were followed for 8-10 years. Most patients started therapy shortly after the baseline blood sample had been obtained (i.e., first time point), and several switched therapy during the follow-up. Each patient's number of DMTs correlated to the expression levels of the co-inhibitory receptors. As shown in FIG. 3H, a significant negative correlation between LAG-3 expression and the number of DMTs was identified. Lower LAG-3 levels were associated with higher DMT switching ($r^2$=0.67, P<0.05).

The baseline MRI T2 Lesion Volume (T2LV) was analyzed for correlations with the co-inhibitory receptor expression levels. In the MS patients, there was no association between baseline T2LV and the individual co-inhibitory receptor expression level (FIGS. 3I-3J and 4N-4P). In addition, no association was found between the number of relapses during the follow-up and the co-inhibitory receptor expression levels in the patients. Also, no association between co-inhibitory receptor expression levels and age or sex was identified.

Example 4—Baseline LAG-3 and TIM-3 Expression Levels are Predictive of Malignant Versus Benign Outcome To reveal unsupervised clustering, heat-map analysis and principle component analysis (PCA) using ClustVis software was performed on the raw data available early in the disease course, i.e., 1-year progression index, EDSS at diagnosis and baseline MRI lesion volume, combined with LAG-3 and TIM-3 expression levels. The data were transformed into a set of uncorrelated variables, ordered in descending manner by the variance explained. This allows to interpret first few components that often explain large amount of the variation.

Figure 5A:
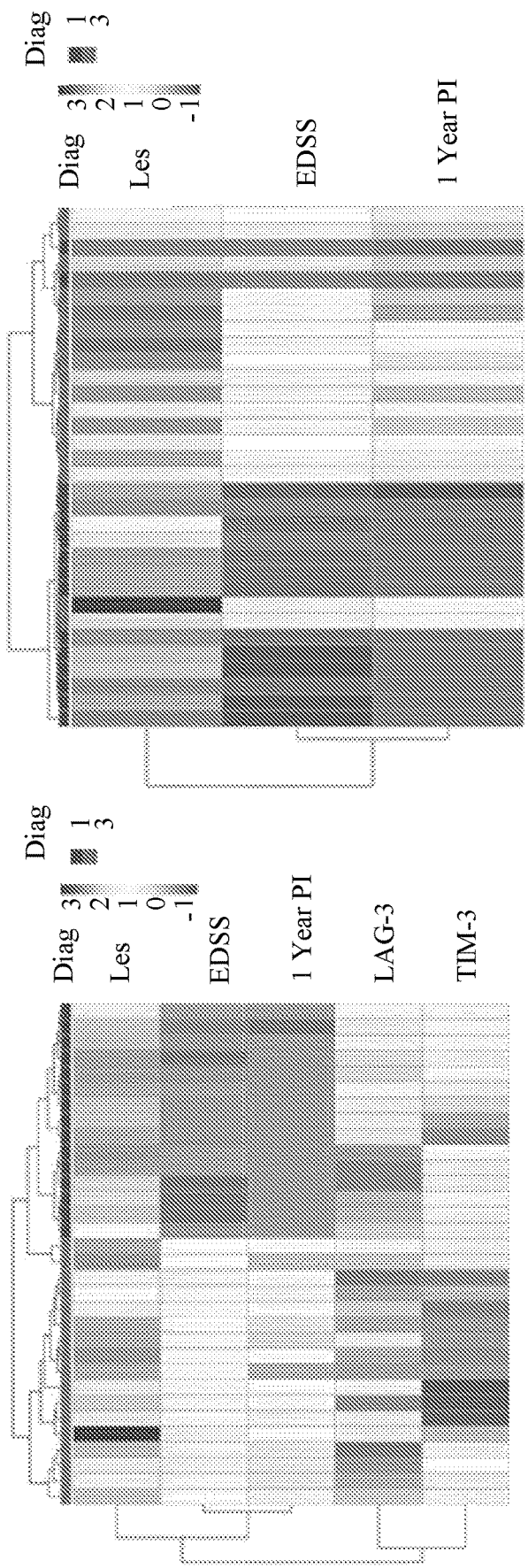
FIGS. 5A-5D. Baseline LAG-3 and TIM-3 expression levels combined with paraclinical and clinical data predicted malignant versus benign outcome (FIGS. 5A-5B) and conversion from RRMS to SPMS (FIGS. 5C-5D).
Figure 5B:
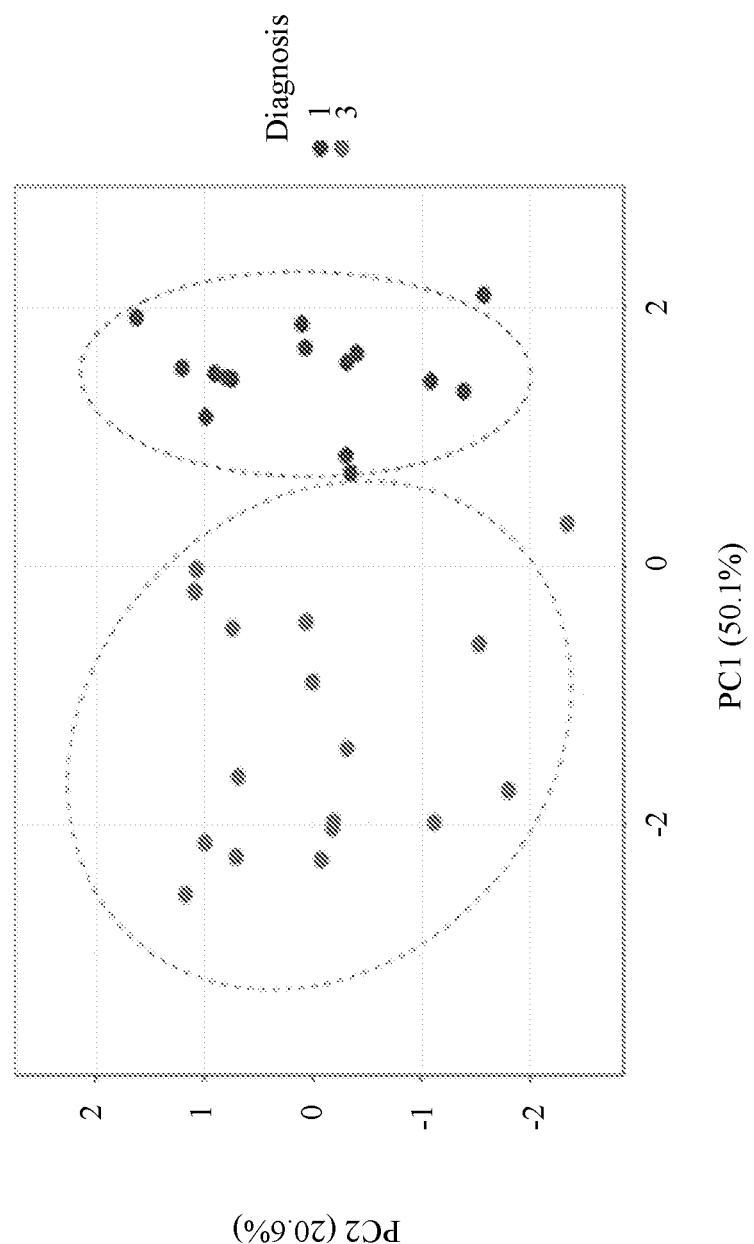

Data obtained from all patients with benign and malignant MS phenotypes was analyzed. The results are shown in FIG. 5A-5B. The results of patients remaining as RRMS (RR) and those who eventually progressed to SPMS (SP) are shown in FIG. 5C-5D.

Figure 5C:
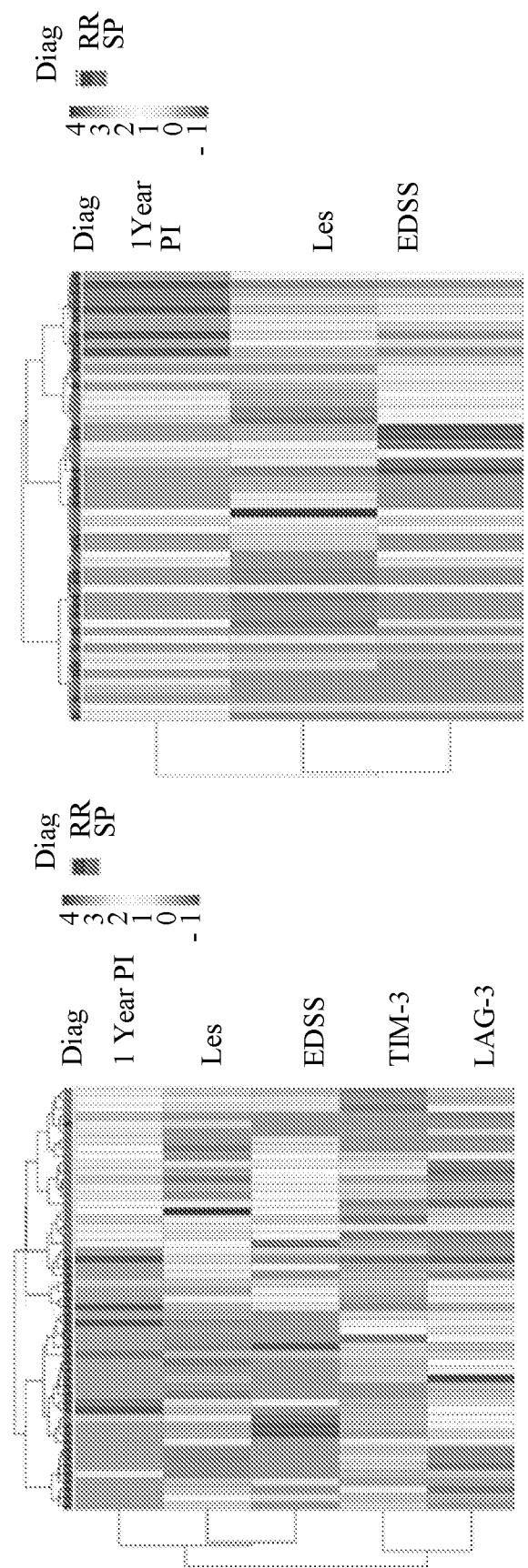

In FIGS. 5A, and 5C, Rows are centered; unit variance scaling were applied to rows. Both rows and columns were clustered using correlation distance and average linkage. Each row represents clinical or gene expression parameters (as indicated). Each column represents sample of one patient. The diagnostic clusters marked as "Diag", represent as follows: "Diag 1" and "Diag 3" in FIG. 5A correspond to benign and malignant MS patients, respectively; "RR" and "SP" in FIG. 5C correspond to RRMS and SPMS, respectively.

As shown in FIG. 5A, the unsupervised heat map demonstrated that the combined data of the LAG-3 and TIM-3 expression levels and the paraclinical and clinical parameters could distinguish/differentiate the patients into benign and malignant groups. Remarkably, the ability to cluster patients by unsupervised analysis based on their initial paraclinical and clinical parameters combined with the co-inhibitory receptor expression levels and to predict their disease severity (FIG. 5A; left panel) was superior to the clustering obtained by the values of the paraclinical and clinical parameters alone (FIG. 5A; right panel).

Figure 5D:
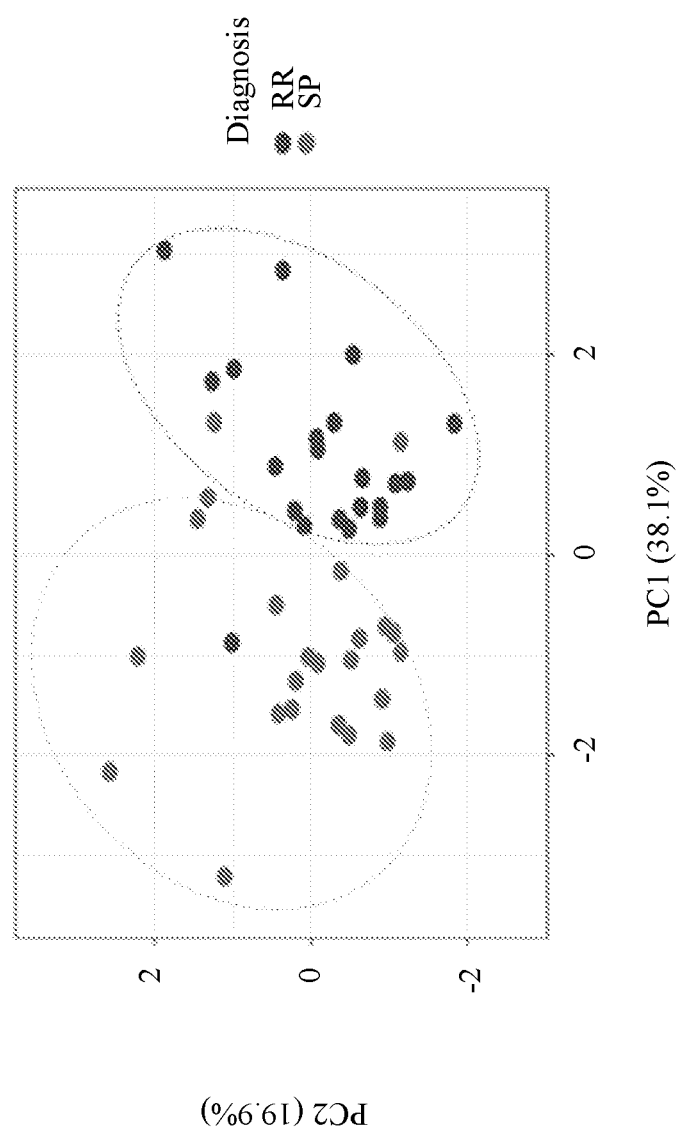

In FIGS. 5B and 5D, PCA analysis: SVD (singular value decomposition) with imputation was used to calculate the principal components. X-axis, principal component 1; Y-axis, principal component 2, which explain 50.1% and 20.6% of the total variance, respectively. Ellipses represent the 95% confidence interval. N=32 data points. Dark lines and circles (1, originally Red) represent benign outcome; bright lines and circles (3, originally blue) represent malignant outcome.

As shown in FIG. 5B, PCA, which is another unsupervised analysis method, validated these results. PCA clustering of the paraclinical and clinical data combined with the LAG-3 and TIM-3 expression levels distinguished the patients into two groups with differing disease severity (malignant and benign).

Disease outcome prediction using paraclinical and clinical parameters combined with baseline co-inhibitory receptor expression levels increased the sensitivity and specificity of the paraclinical and clinical parameters alone from 88% to 100% and from 89% to 100%, respectively.

As can be seen in FIGS. 5C-5D, unsupervised analysis of all patients revealed that the combined data of the LAG-3 and TIM-3 expression levels and the paraclinical and clinical parameters clearly separated the patients who still had RRMS from those who eventually progressed to SPMS. The combined data of the baseline co-inhibitory receptor expression levels and the paraclinical and clinical parameters were superior for predicting the patients that would progress to SPMS. The combined parameters had 95.24% sensitivity and 96.88% specificity compared to the paraclinical and clinical parameters alone, which had 66.67% sensitivity and 40% specificity.

Example 5—Expression Levels of Whole Blood Biomarkers for Predicting of MS Disease Outcome Patient population: A total of 39 MS patients were recruited and 16 HCs. For the first part of the study, the following are analyzed: 12 malignant patients (reached a significant level of disability, EDSS>6, in less than 5 years from their first MS symptoms) and 12 benign patients (after 10 years since diagnosis reached an EDSS of less or equal to 1.5).

A validation assay using RT PCR analysis of 39 patients is performed. Additional 11 patients are measured before and 6 months following induction therapy. Patients before and 6 months following Tysabri therapy are tested. The benign and malignant MS patients are identified from the blood samples obtained from untreated MS patients (right after diagnosis) who were followed for more than 10 years.

Samples: 1-3 blood samples of 10 cc blood are taken from each individual patients. The screening group includes MS patients according to the inclusion and exclusion criteria. Inclusion Criteria: For the malignant and benign study: The patients suffer from clinically definite MS, not treated with any MS therapy. The blood samples are collected no longer than 2 years from diagnosis and before the initiation of preventive therapy. Patients with at least 5 or 10 years of follow up clinical data, for the malignant and benign patients, respectively. Malignant patients are defined as patients who reached a significant level of disability, EDSS>6, in less than 5 years from their first MS symptoms. Benign patients are defined as patients that after 10 years since diagnosis reached an EDSS of less or equal to 1.5. For the effect of induction therapy study, patients give blood before and 6 months following therapy. All patients have to sign an informed consent. Exclusion criteria: Patients unable to sign an informed consent. Patients with other systemic autoimmune diseases. Female patients during pregnancy or having delivered during the last 3 months prior to the inclusion.

Measurements: The expression of human mRNA was analyzed using the nCounter® code set panel (NanoString, WA, USA). Gene expression array: A large-scale gene expression array is performed by utilizing NanoString nCounter technology (Nanostring Technologies Inc.). Total RNA is extracted from whole blood samples of patients and controls with Tri Reagent BD (Sigma-Aldrich). Samples are analyzed for 526 immunology genes with the nCounter code set panel (NanoString Technologies). The assay is based on direct digital detection of mRNA molecules of interest with the aid of target-specific, color-coded probe pairs, without the use of reverse transcription or amplification. Raw data (following control and reference gene normalization) is analyzed with nsolver analysis software. Following hierarchical clustering, GO pathway enrichment analysis are used to define pathways related to these genes.

Real time polymerase chain reaction (RT-PCR) validation assay: Total RNA was extracted from whole blood samples with Tri Reagent BD (Sigma-Aldrich). cDNA is prepared with a qScript cDNA synthesis kit (Quanta Biosciences). Gene amplification is carried out with the GeneAmp 7000 Sequence Detection System (Applied Biosystems). The gene expression results are normalized to the 2 housekeeping genes.

Figure 6A:
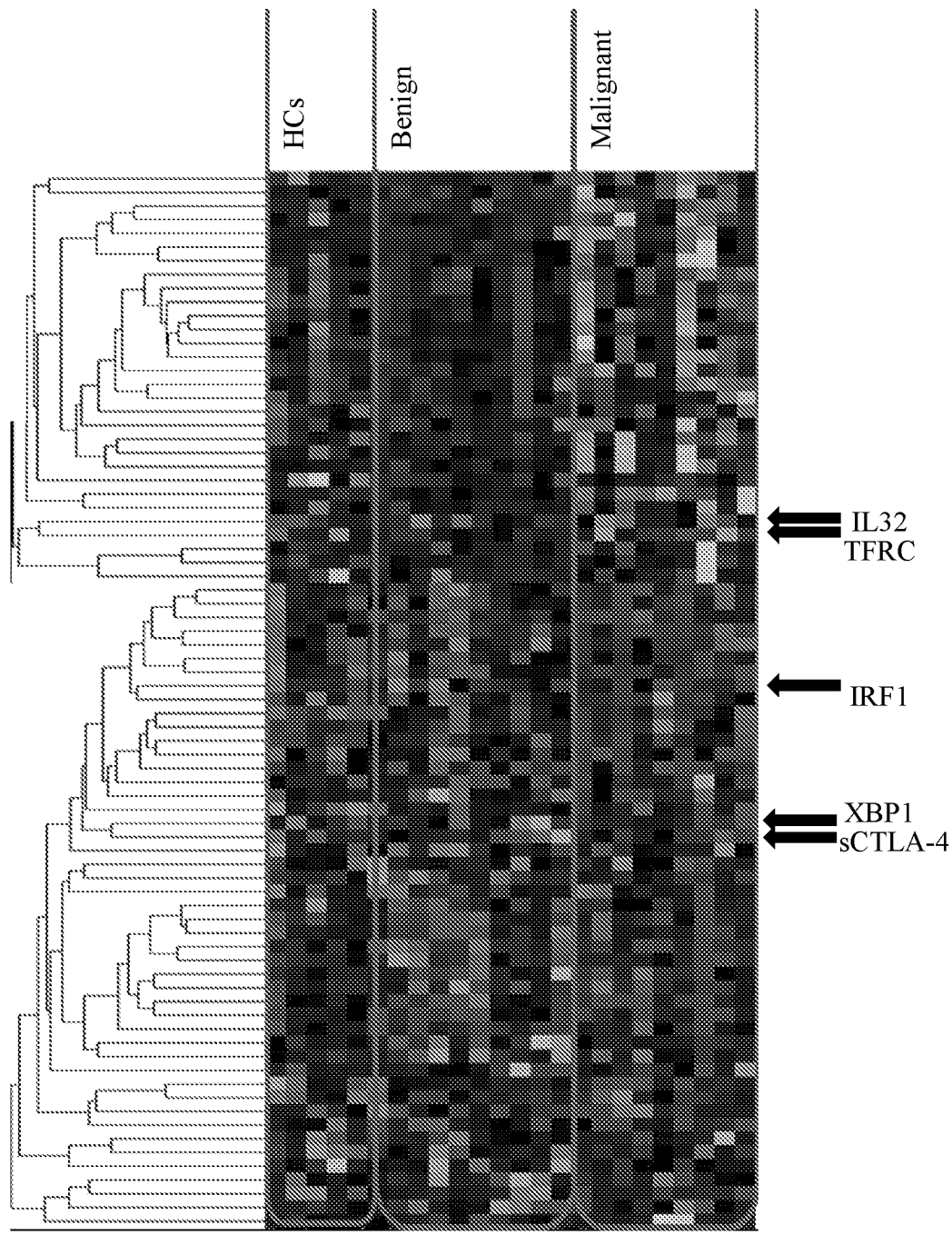
FIG. 6A—Heatmap analysis of various gene expression in whole blood samples obtained from healthy controls (HCs), benign MS patients ("benign") and malignant MS patients ("malignant"). The darker the shade (originally red vs green), the higher the expression; identified candidate markers are indicated by arrows.
Figure 6B:
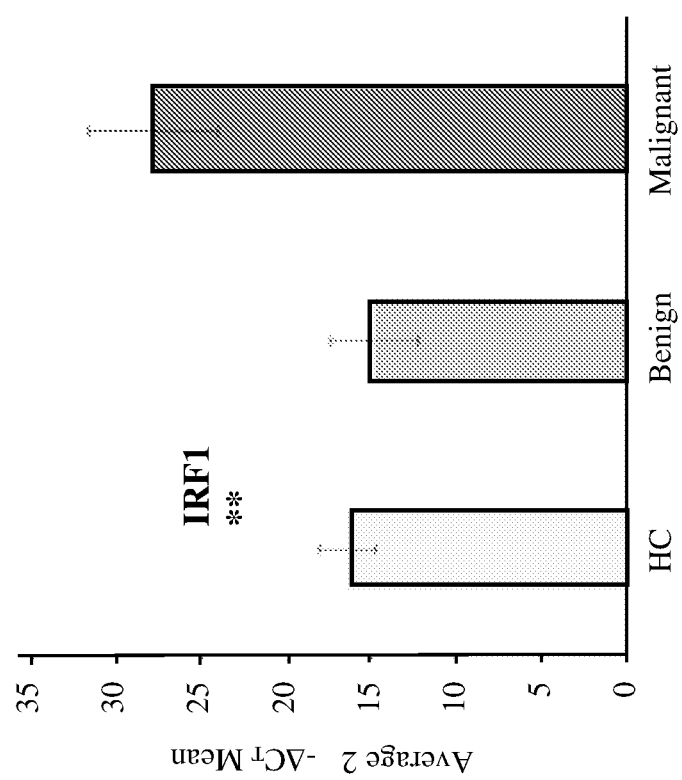
FIGS. 6B-G—Bar graphs of validation experiments showing expression levels of IRF1, XBP1 and TFRC.
Figures 6C, 6D:
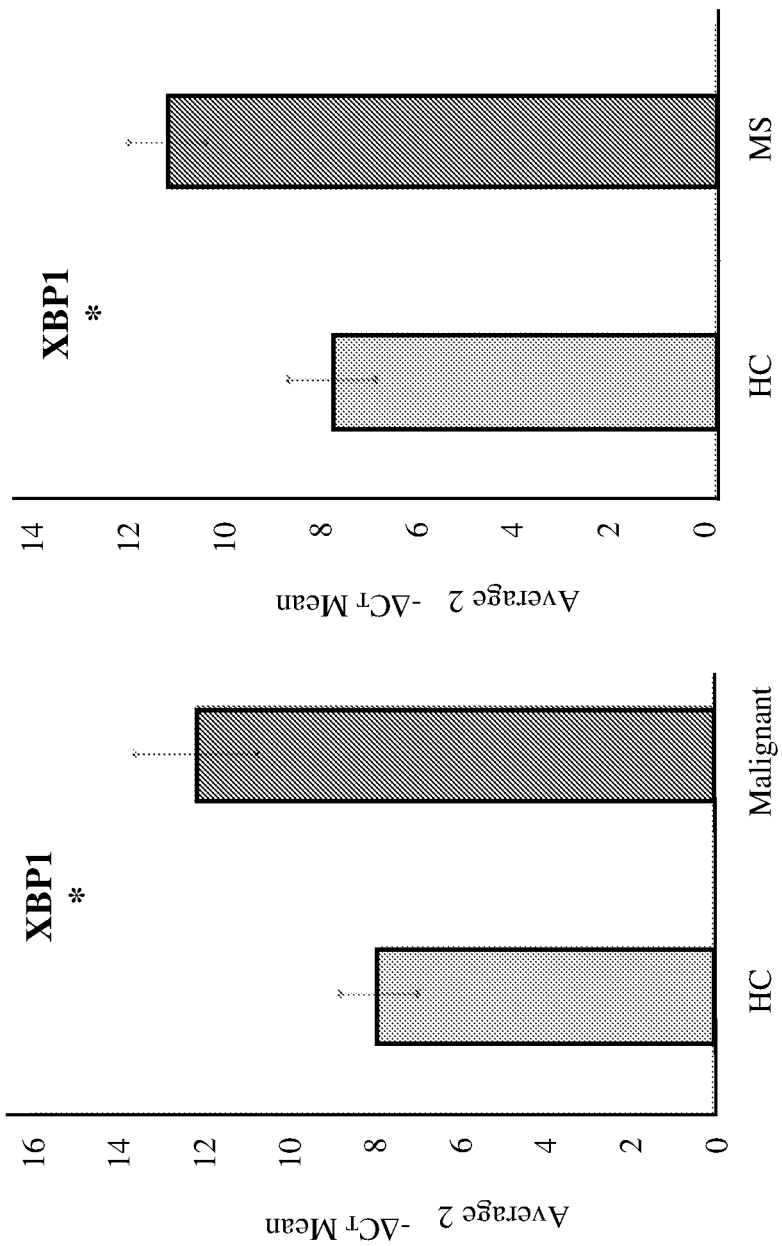
Figures 6E, 6F, 6G:
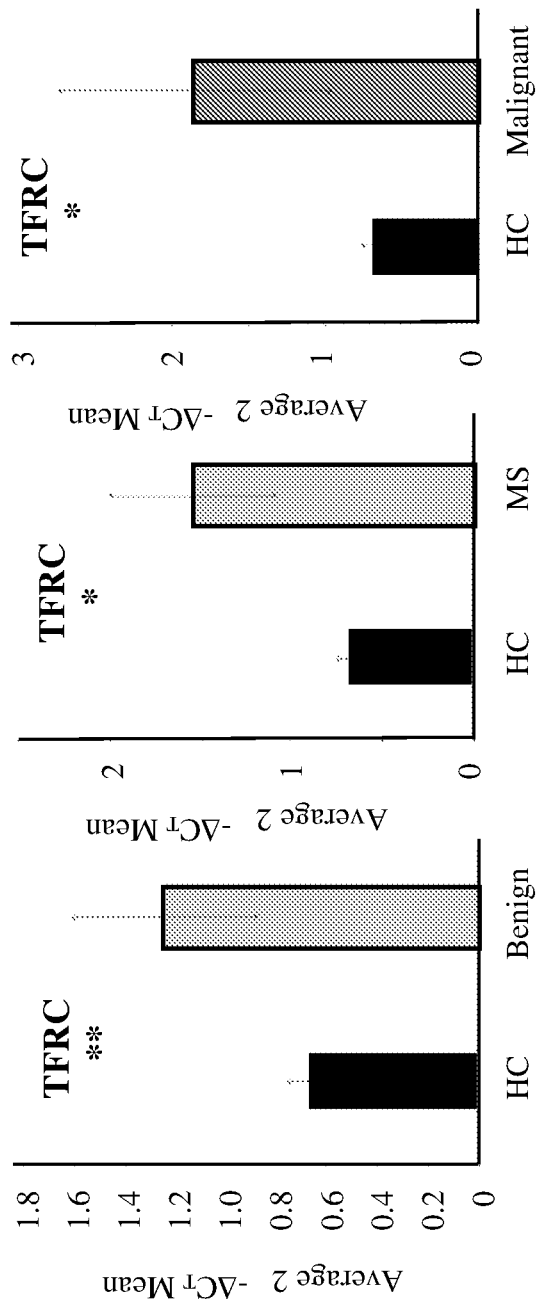

Results:

The results presented in FIG. 6A, show a heat map analysis of various gene expression in whole blood samples obtained from healthy controls (Ws), Benign MS patients ("benign") and malignant MS patients ("malignant"). The darker the shade, the higher is the expression. In this analysis, the genes IL32, TFRC, IRF1, XBP, and sCTLA4 (soluble CTLA4 isoform) were identified (marked by arrows) as markers for identification between malignant and benign patients (P=0.02, P<0.05, P=0.03, P=0.04, P=0.04, respectively.) XBP1 and IL32 were found to differentiate malignant patients and healthy controls.

The results presented in FIGS. 6B-G, show exemplary validation experiment of expression levels of IRE1, XBP1 and TFRC in whole blood of 19 MS patients, as determined by real time PCR. Each column represent the Average $2\text{-}\Delta C_T$ Mean of each of the genes in the various experimental groups: healthy controls (HC/HCs), benign MS patients (benign), malignant MS patients (malignant) and all MS patients (MS). The results demonstrate that IRF 1 (FIG. 6B) can be used as a marker for malignant MS. XBP1 (FIGS. 6C-D) can be used to differentiate between malignant MS patients and healthy control as well as between healthy controls and MS patients. TFRC (FIGS. 6E-G) can be used to differentiate between benign MS patients and healthy control, between MS patients and healthy controls and between Malignant MS patients and healthy controls.

Further analysis revealed that modulation in expression of one or more of the following biomarkers obtained from whole blood samples, can be predictive to disease severity and/or to disease state: CSF1R, PTAFR, PSMB10, TAP2, RAF1, NFKB1, IFIT2, MAPKAPK2, NT5E, CTNNB1, IRF1, BST2, ICAM2, XBP1, NFKBIA, NFKB2, TFRC, STAT2, IL32, IRF7, TNFAIP3 and STAT5A.

REFERENCES

1. Roxburgh et al. Neurology. 2005; 64(7):1144-1151.
2. Ziemssen T, et al. Journal of Neurology. 2016; 263:1053-1065.
3. Zhang Q, Vignali D A. Immunity. 2016; 44(5):1034-1051.
4. Norio C. Clinical and Experimental Neuroimmunology. 2018; 9(S1):20-29.
5. Anderson A C, et al. Immunity. 2016; 44(5):989-1004.
6. Nishimura H, et al. Science. 2001; 291(5502):319-322.
7. Okazaki T, et al. J Exp Med. 2011; 208(2):395-407.
8. Gholipour T, et al. Neurology. 2011; 76(23):1996-2001.
9. Backner Y et al. JAMA Neurol. (2018) 75:287-95.
10. Monney L et al. Nature. 2002; 415(6871):536-541.
11. Koguchi K et al. J Exp Med. 2006; 203(6):1413-1418.
12. Yang L et al. J Immunol. 2008; 180(7):4409-4414.
13. Kadowaki A, et al. Nat Commun. 2016; 7:11639.
14. Joller N et al. J Immunol. 2011; 186(3):1338-1342.
15. Burton B R et al. Nat Commun. 2014; 5:4741.
16. Camisaschi C et al. J Immunol. 2010; 184(11):6545-6551.
17. Kroner A et al. Ann Neurol. 2005; 58(1):50-57.
18. Carter L L et al. J Neuroimmunol. 2007; 182(1-2):124-134.
19. Tocut M et al. Autoimmun Rev. 2018; 17(6):610-616.
20. Gettings E J et al. Mult Scler. 2015; 21(5):670.
21. Yshii L M et al. Nat Rev Neurol. 2017; 13(12):755-763.
22. Popescu V, et al. J Neurol Neurosurg Psychiatry. 2013; 84(10):1082-1091.
23. Healy B C et al. J Neuroimaging. 2017; 27(5):481-485.

The invention claimed is:

1. A method for evaluating, at a first time point, the projected severity of multiple sclerosis (MS) at a second, subsequent time point at least ten years after the first time point, comprising:
   a) obtaining a peripheral blood mononuclear cells (PBMC)-containing sample from a subject afflicted with MS at the first time point,
   b) determining the RNA expression level of TIM-3 in the sample,
   c) comparing the RNA expression levels determined in b) to the respective levels corresponding to a non-malignant negative control, and
   d) determining the projected severity of MS at the second time point,
   wherein a statistically significant reduction in the RNA expression level of TIM-3 in said sample compared to the respective control level is indicative of increased disease severity associated with a predicted malignant MS outcome in said subject at the said second time point compared to said first time point, wherein lack of a statistically significant reduction in said RNA expression level of TIM-3 in said sample compared to the respective control level is indicative of a predicted benign MS outcome in said subject at said second time point compared to said first time point, wherein said method further comprises the step of administering to said subject, based on the projected severity at said second time point, a suitable treatment selected from the group consisting of:

natalizumab, alemtuzumab, ocrelizumab, and/or cladribine if the predicted MS outcome is malignant; or glatiramer acetate, interferon beta-1A, peginterferon beta-1A, interferon beta-1b, teriflunomide, and/or dimethyl fumarate if the predicted MS outcome is benign.

2. The method of claim 1, wherein said negative control is indicative of benign MS.

3. The method of claim 1, wherein said first time point is within one- to two years of MS diagnosis in the subject and is prior to commencement of MS treatment in said subject.

4. The method of claim 1, which further comprises determining the RNA expression level of LAG-3 in said sample, and wherein reduced levels of LAG-3 and TIM-3 compared to said control levels are indicative of increased disease severity in said subject at the second time point compared to said first time point.

5. The method of claim 1, wherein said subject is diagnosed with relapsing-remitting multiple sclerosis (RRMS) at said first time point, and reduced level of TIM-3 compared to said control level is indicative of progression from RRMS to secondary progressive multiple sclerosis (SPMS) at said second time point.

6. The method of claim 1, which further comprises determining the RNA expression level of LAG-3, TIGIT, CTLA-4, PD-1, or combinations thereof.

7. The method of claim 1, wherein the sample is a PBMC sample.

8. The method of claim 1, wherein step c) is performed using a learning and pattern recognition algorithm, or an analyzer comprising same, that compares the levels determined in a) to their respective control levels, to thereby compare the prognostic pattern of said subject to the pattern corresponding to the negative control, wherein the prognostic pattern further comprises the levels of one or more additional parameters characteristic of MS, and said algorithm or analyzer further compares the levels of said parameters in said subject to their respective levels characteristic of said negative control, wherein said parameters comprise clinical and/or paraclinical parameters providing clinical evaluation of the level of MS severity or disability in said subject and/or magnetic resonance imaging (MRI) evaluation of brain lesions in said subject.

9. The method of claim 8, which further comprises determining the RNA expression level of LAG-3 in said sample, and wherein the prognostic pattern further comprises the levels of LAG3.

10. The method of claim 8, wherein said parameters are selected from the group consisting of: MRI baseline T2 hyperintense lesion volume (T2LV), EDSS score at diagnosis, and MS one-year progression index.

* * * * *